(12) United States Patent
Fukunaga et al.

(10) Patent No.: US 6,559,962 B1
(45) Date of Patent: *May 6, 2003

(54) PRINTER CONTROL SYSTEM AND METHOD USING A CONTROL I/O COMMAND FROM A HOST COMPUTER, AND SCANNER CONTROL SYSTEM AND METHOD OF USING A CONTROL I/O COMMAND FROM A HOST COMPUTER

(75) Inventors: Koji Fukunaga, Tokyo (JP); Kiyoshi Katano, Chiba (JP); Jiro Tateyama, Yokohama (JP); Hisatsugu Naito, Toyko (JP); Atsushi Nakamura, Kawasaki (JP); Makoto Kobayashi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,108

(22) Filed: Oct. 15, 1997

(30) Foreign Application Priority Data

Oct. 15, 1996 (JP) .............................................. 8-272310
Aug. 20, 1997 (JP) .............................................. 9-223597

(51) Int. Cl.[7] ................................................. G06K 1/00
(52) U.S. Cl. .................................... 358/1.15; 358/1.16
(58) Field of Search .................... 395/114–116; 358/1.1, 358/1.15, 1.16, 1.6

(56) References Cited

U.S. PATENT DOCUMENTS 3,753,246 A * 8/1973 Kiffmeyer et al. .......... 395/114
4,452,136 A * 6/1984 Boynton et al. .......... 101/93.05
4,760,406 A * 7/1988 Sato et al. .................... 346/33
4,818,127 A * 4/1989 Babsch et al. ......... 400/124.07
4,837,635 A * 6/1989 Santos ........................ 358/401
4,972,341 A * 11/1990 Hanagami et al. ............. 710/5
5,477,238 A * 12/1995 Aharanson et al. ......... 345/168
5,530,554 A * 6/1996 Maehara ..................... 358/296
5,566,278 A * 10/1996 Patel et al. .................. 395/114
5,619,622 A * 4/1997 Audi et al. .................. 395/108
5,699,494 A * 12/1997 Colbert et al. .............. 395/114
5,752,075 A * 5/1998 Kikinis ........................... 710/1
5,790,279 A * 8/1998 Sakellaropoulos .......... 358/472
5,845,144 A * 12/1998 Tateyama et al. ....... 395/800.01

OTHER PUBLICATIONS

Davies, The Digital Imaging A–Z, Focal Press, p. 108, 1998.*

* cited by examiner

Primary Examiner—Yon J. Couso
(74) Attorney, Agent, or Firm—Fitzpatrick, Cella, Harper & Scinto

(57) ABSTRACT

In a printer control method, image-data processing which has previously been performed in a printer (printer unit) is performed by a host computer (host unit), so that the cost of the printer is reduced. More specifically, the printer unit includes a holding unit for holding control commands from the host unit, and an execution unit for executing the control commands. The host unit includes an analysis unit for analyzing printer commands, control-command forming unit for forming control commands from the printer commands, and a transmission unit for transmitting the control commands to the printer unit. The printer unit is controlled by converting printer commands into control commands in accordance with printing instructions provided from host-unit application software and transmitting the obtained control commands to the printer unit.

15 Claims, 84 Drawing Sheets

FIG.4

| ADDRESS | DEVICE |
| --- | --- |
| 0000H-001FH | DMA CONTROLLER |
| 0020H-0021H | INTERRUPT CONTROLLER |
| 0040H-0043H | TIMER |
| 0060H-0064H | KEYBOARD |
| 0070H-0071H | REAL TIME CLOCK |
| 0080H-008FH | DMA BANK REG. |
| 00A0H-00A1H | DMA CONTROLLER |
| 00C0H-00DFH | INTERRUPT CONTROLLER |
| 00F0H-00FFH | FPU |
| 0100H-0107H | SETUP REG. [SET/IO] |
| 01F0H-01FFH | HDD CONTROLLER |
| 0278H-027FH | PARALLEL PORT3 [PIO/IO3] |
| 02F8H-02FFH | SERIAL PORT2 |
| 0378H-037FH | PARALLEL PORT2 [PIO/IO2] |
| 03B0H-03BBH | VIDEO CONTROLLER |
| 03BCH-03BFH | PARALLEL PORT1 [PIO/IO1] |
| 03C0H-03DFH | VIDEO CONTROLLER |
| 03F0H-03F7H | FDD CONTROLLER |
| 03F8H-03FFH | SERIAL PORT1 |
| 0XXXH-0XXXH | PRINTER BLOCK-PORT [PRT/IO] |

SETUP REGISTER2 [102H]

→ ENABLE PRINTER BLOCK PORT
  0 : DISABLE
  1 : ENABLE

SETUP REGISTER3 [103H]

→ BIT 3 (PRT/IO BASE ADDRESS)
→ BIT 4 (PRT/IO BASE ADDRESS)
→ BIT 5 (PRT/IO BASE ADDRESS)
→ BIT 6 (PRT/IO BASE ADDRESS)
→ BIT 7 (PRT/IO BASE ADDRESS)

SETUP REGISTER4 [104H]

→ BIT 8 (PRT/IO BASE ADDRESS)
→ BIT 9 (PRT/IO BASE ADDRESS)

FIG.6A

SUPERVISOR COMMAND ADDRESS REGISTER
[BASE ADDRESS + 0]

| 7 | 6 | 5 | 4 | 3 | 2 | 1 | 0 |
|---|---|---|---|---|---|---|---|
| PA7 | PA6 | PA5 | PA4 | PA3 | PA2 | PA1 | PA0 |

FIG.6B

SUPERVISOR COMMAND DATA REGISTER
[BASE ADDRESS + 1]

| 15 | 14 | 13 | 12 | 11 | 10 | 9 | 8 |
|---|---|---|---|---|---|---|---|
| PD7 | PD6 | PD5 | PD4 | PD3 | PD2 | PD1 | PD0 |

FIG.6C

BATCH COMMAND DATA REGISTER
[BASE ADDRESS + 2]

| 7 | 6 | 5 | 4 | 3 | 2 | 1 | 0 |
|---|---|---|---|---|---|---|---|
| MD7 | MD6 | MD5 | MD4 | MD3 | MD2 | MD1 | MD0 |

| 15 | 14 | 13 | 12 | 11 | 10 | 9 | 8 |
|---|---|---|---|---|---|---|---|
| MD15 | MD14 | MD13 | MD12 | MD11 | MD10 | MD9 | MD8 |

FIG.9

| ADDRESS | | SYMBOL | | R/W | | NAME | |
|---|---|---|---|---|---|---|---|
| U | L | UPPER | LOWER | U | L | UPPER | LOWER |
| **01 | **00 | CRES | BPSTART | W | R/W | RESET REGISTER | CONTROL-I/O-COMMAND CONTROL |
| **03 | **02 | | | | | | |
| **05 | **04 | | | | | | |
| **07 | **06 | | | | | | |
| **09 | **08 | MRALH | MRALL | R/W | R/W | MEMORY READ ADDRESS (LH) | MEMORY READ ADDRESS (LL) |
| **0B | **0A | | MRAHL | | R/W | | MEMORY READ ADDRESS (HL) |
| **0D | **0C | MWALH | MWALL | R/W | R/W | MEMORY WRITE ADDRESS (LH) | MEMORY WRITE ADDRESS (LL) |
| **0F | **0E | | MWAHL | | R/W | | MEMORY WRITE ADDRESS (HL) |
| **11 | **10 | | BPEND | | W | | CONTROL-I/O-COMMAND END TRIGGER |
| **13 | **12 | RWA | REGWR | W | W | REGISTER WRITE ADDRESS | REGISTER WRITE TRIGGER |
| **15 | **14 | WAITH | WAITL | W | W | WAIT REGISTER (H) | WAIT REGISTER (L) |
| **17 | **16 | | | | | | |
| **19 | **18 | BRALH | BRALL | R/W | R/W | COMMAND READ ADDRESS (LH) | COMMAND READ ADDRESS (LL) |
| **1B | **1A | | BRAHL | | R/W | | COMMAND READ ADDRESS (HL) |
| **1D | **1C | BWALH | BWALL | R/W | R/W | COMMAND WRITE ADDRESS (LH) | COMMAND WRITE ADDRESS (LL) |
| **1F | **1E | | BWAHL | | R/W | | COMMAND WRITE ADDRESS (HL) |

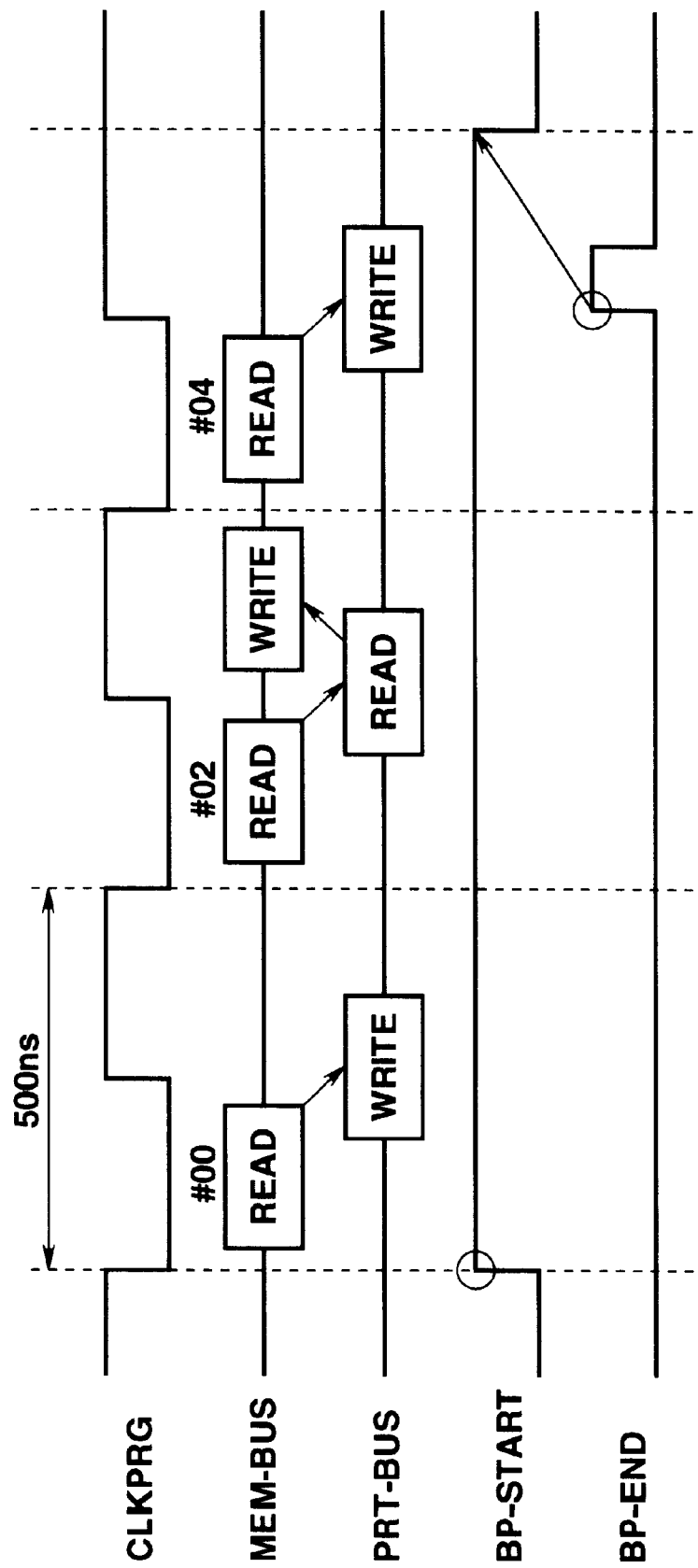

FIG.18

| ADDRESS | | SYMBOL | | R/W | | NAME | |
|---|---|---|---|---|---|---|---|
| U | L | UPPER | LOWER | U | L | UPPER | LOWER |
| **21 | **20 | PORTB | PORTA | R/W | R/W | GENERAL-PURPOSE PORT B | GENERAL-PURPOSE PORT A |
| **23 | **22 | SUBH | | R/W | | SUB-HEAT REGISTER | |
| **25 | **24 | FNCPRTB | PSTATUS | R/W | R | PORT-B FUNCTION REGISTER | SENSOR-STATUS PORT |
| **27 | **26 | ADCNVCNT | POWER | R/W | R/W | A/D-CONVERTER CONTROL REGISTER | POWER-SUPPLY CONTROL REGISTER |
| **29 | **28 | SWITCH | LED | R | R/W | SWITCH REGISTER | LED REGISTER |
| **2B | **2A | | | | | | |
| **2D | **2C | | ADDATA | | R | | A/D-DATA REGISTER |
| **2F | **2E | | | | | | |
| **31 | **30 | HDRUN | | R/W | | HEAT-SCANNING DRIVING TRIGGER | |
| **33 | **32 | | HDR | | W | | HEAT-DATA REGISTER |
| **35 | **34 | HCR1 | HCR0 | R/W | R/W | HEAT-CONTROL REGISTER 1 | HEAT-CONTROL REGISTER 0 |
| **37 | **36 | HCR3 | HCR2 | R/W | R/W | HEAT-CONTROL REGISTER 3 | HEAT-CONTROL REGISTER 2 |
| **39 | **38 | | HCR4 | | R/W | | HEAT-CONTROL REGISTER 4 |
| **3B | **3A | SDRH | SDRL | R | R | SCANNING-DATA REGISTER (H) | SCANNING-DATA REGISTER (L) |
| **3D | **3C | SCR1 | SCR0 | R/W | R/W | SCANNER-CONTROL REGISTER 1 | SCANNER-CONTROL REGISTER 0 |
| **3F | **3E | | SCCLR | | W | | SCANNER-BUFFER CLEAR REGISTER |
| **41 | **40 | BDTH | BDTL | R/W | R/W | BLOCK-DELAY TIME (H) | BLOCK-DELAY TIME (L) |
| **43 | **42 | BLTH | BLTL | R/W | R/W | BLOCK TIME (H) | BLOCK TIME (L) |
| **45 | **44 | MHT | SUT | R/W | R/W | MAIN HEATING TIME | SETUP TIME |
| **47 | **46 | IVT | PHT | R/W | R/W | INTERVAL TIME | PREHEATING TIME |
| **49 | **48 | CMHT | CSUT | R/W | R/W | COL MAIN HEATING TIME | COL SETUP TIME |
| **4B | **4A | CIVT | CPHT | R/W | R/W | COL INTERVAL TIME | COL PREHEATING TIME |
| **4D | **4C | | | | | | |
| **4F | **4E | | | | | | |
| **61 | **60 | CMRUN | | R/W | | CMPWM TRIGGER | |
| **63 | **62 | CMASF | CMCTL1 | R/W | R/W | CM/ASF SELECT REGISTER | CM CONTROL_1 |
| **65 | **64 | TCMCB | TCMCA | R/W | R/W | CMB-PHASE PWM TIME | CMA-PHASE PWM TIME |
| **67 | **66 | CMSHFT | CMPAT | R/W | R/W | CM SHIFT TRIGGER | CM-PHASE SWITCHING |
| **69 | **68 | SELTCM | | R/W | | PWM/PHASE SELECTING REGISTER | |
| **6B | **6A | SFTCMDIR | | R/W | | CM SHIFT DIRECTION | |
| **6D | **6C | | | | | | |
| **6F | **6E | | | | | | |
| **71 | **70 | LFRUN | | R/W | | LFPWM TRIGGER | |
| **73 | **72 | | LFCTL1 | | R/W | | LF CONTROL_1 |
| **75 | **74 | TLFCB | TLFCA | R/W | R/W | LFB-PHASE PWM TIME | LFA-PHASE PWM TIME |
| **77 | **76 | LFSHFT | LFPAT | R/W | R/W | LF SHIFT TRIGGER | LF-PHASE SWITCHING |
| **79 | **78 | SELTLF | | R/W | | PWM/PHASE SELECTING REGISTER | |
| **7B | **7A | SFTLFDIR | | R/W | | LF SHIFT DIRECTION | |
| **7D | **7C | | | | | | |
| **7F | **7E | | | | | | |

FIG.24

| FUNCTION | PHASE SELECTION /REVOLUTION DIRECTION | PWMA /PWMRUN | PWMB | PREGISTER WRITE ADDRESS /TRIGGER | WAITH 64μsec | WAITL 0.5μsec |
|---|---|---|---|---|---|---|
| INITIAL SETTING | 6B01 | 6101 | | 1324 | 1508 | 1455 |
| UNIFORM REVOLUTION 1-1 | 6901 | 6401 | 6528 | 1200 | 1508 | 1455 |
| UNIFORM REVOLUTION 1-2 | | 6406 | 6526 | 1200 | 1508 | 1455 |
| UNIFORM REVOLUTION 1-3 | | 6414 | 6523 | 1200 | 1508 | 1455 |
| UNIFORM REVOLUTION 1-4 | | 6419 | 6519 | 1200 | 1508 | 1455 |
| UNIFORM REVOLUTION 1-5 | | 6423 | 6514 | 1200 | 1508 | 1455 |
| UNIFORM REVOLUTION 1-6 | | 6426 | 6506 | 1200 | 1508 | 1455 |
| UNIFORM REVOLUTION 2-1 | 6901 | 6428 | 6501 | 1200 | 1508 | 1455 |
| UNIFORM REVOLUTION 2-2 | | 6426 | 6506 | 1200 | 1508 | 1455 |
| UNIFORM REVOLUTION 2-3 | | 6423 | 6514 | 1200 | 1508 | 1455 |
| UNIFORM REVOLUTION 2-4 | | 6419 | 6519 | 1200 | 1508 | 1455 |
| UNIFORM REVOLUTION 2-5 | | 6414 | 6523 | 1200 | 1508 | 1455 |
| UNIFORM REVOLUTION 2-6 | | 6406 | 6526 | 1200 | 1508 | 1455 |
| UNIFORM REVOLUTION 3-1 (UNIFORM REVOLUTION1-1) | 6901 | 6401 | 6528 | 1200 | 1508 | 1455 |

FIG.25

| FUNCTION | CR PHASE SELECTION /REVOLUTION DIRECTION | CRPWMA /PWMRUN | CRPWMB | WAITH 64μsec | WAITL 0.5μsec |
|---|---|---|---|---|---|
| INITIAL SETTING | 6B01 | 6101 | | | |
| MOTOR'S OWN PHASE | | 6401 | 6528 | 159C | 1400 |
| ACCELERATION 1-1 | 6901 | 6401 | 6528 | 1519 | 14D3 |
| ACCELERATION 1-2 | | 6406 | 6526 | 1518 | 14B3 |
| ACCELERATION 1-3 | | 6414 | 6523 | 1516 | 14E0 |
| ACCELERATION 1-4 | | 6419 | 6519 | 1514 | 14E6 |
| ACCELERATION 1-5 | | 6423 | 6514 | 1513 | 1400 |
| ACCELERATION 1-6 | | 6426 | 6506 | 1511 | 145A |
| ACCELERATION 2-1 | 6901 | 6428 | 6501 | 150F | 14ED |
| ACCELERATION 2-2 | | 6426 | 6506 | 150E | 14B3 |
| ACCELERATION 2-3 | | 6423 | 6514 | 150D | 14A6 |
| ACCELERATION 2-4 | | 6419 | 6519 | 150C | 14C0 |
| ACCELERATION 2-5 | | 6414 | 6523 | 150B | 14FA |
| ACCELERATION 2-6 | | 6406 | 6526 | 150B | 14A0 |
| ACCELERATION 3-1 | 6901 | 6401 | 6528 | 150A | 1453 |
| ACCELERATION 3-2 | | 6406 | 6526 | 150A | 140D |
| ACCELERATION 3-3 | | 6414 | 6523 | 1509 | 14CD |
| ACCELERATION 3-4 | | 6419 | 6519 | 1509 | 148D |
| ACCELERATION 3-5 | | 6423 | 6514 | 1508 | 145A |
| ACCELERATION 3-6 | | 6426 | 6506 | 1508 | 1426 |
| ACCELERATION 4-1 | 6901 | 6428 | 6501 | 1508 | 14F3 |
| ☐ | | | | | |
| ☐ | | | | | |
| ACCELERATION 22-1 | 6901 | 6428 | 6501 | 1503 | 1433 |
| ACCELERATION 22-2 | | 6426 | 6506 | 1503 | 1433 |
| ACCELERATION 22-3 | | 6423 | 6514 | 1503 | 1433 |
| ACCELERATION 22-4 | | 6419 | 6519 | 1503 | 1433 |
| ACCELERATION 22-5 | | 6414 | 6523 | 1503 | 1433 |
| ACCELERATION 22-6 | | 6406 | 6526 | 1503 | 1433 |

FIG.26

| FUNCTION | CR PHASE SELECTION /REVOLUTION DIRECTION | CRPWMA /PWMRUN | CRPWMB | WAITH 64μsec | WAITL 0.5μsec |
|---|---|---|---|---|---|
| UNIFORM REVOLUTION 1-1 | 6901 | 6401 | 6528 | 1503 | 1433 |
| UNIFORM REVOLUTION 1-2 | | 6406 | 6526 | 1503 | 1433 |
| UNIFORM REVOLUTION 1-3 | | 6414 | 6523 | 1503 | 1433 |
| UNIFORM REVOLUTION 1-4 | | 6419 | 6519 | 1503 | 1433 |
| UNIFORM REVOLUTION 1-5 | | 6423 | 6514 | 1503 | 1433 |
| UNIFORM REVOLUTION 1-6 | | 6426 | 6506 | 1503 | 1433 |
| UNIFORM REVOLUTION 2-1 | 6901 | 6428 | 6501 | 1503 | 1433 |
| UNIFORM REVOLUTION 2-2 | | 6426 | 6506 | 1503 | 1433 |
| UNIFORM REVOLUTION 2-3 | | 6423 | 6514 | 1503 | 1433 |
| UNIFORM REVOLUTION 2-4 | | 6419 | 6519 | 1503 | 1433 |
| UNIFORM REVOLUTION 2-5 | | 6414 | 6523 | 1503 | 1433 |
| UNIFORM REVOLUTION 2-6 | | 6406 | 6526 | 1503 | 1433 |
| UNIFORM REVOLUTION 3-1 | 6901 | 6401 | 6528 | 1503 | 1433 |

FIG.27

| FUNCTION | CR PHASE SELECTION /REVOLUTION DIRECTION | CRPWMA /PWMRUN | CRPWMB | WAITH 64μsec | WAITL 0.5μsec |
|---|---|---|---|---|---|
| DECELERATION 1-1 | 6901 | 6401 | 6528 | 1503 | 1433 |
| DECELERATION 1-2 | | 6406 | 6526 | 1503 | 1433 |
| DECELERATION 1-3 | | 6414 | 6523 | 1503 | 1433 |
| DECELERATION 1-4 | | 6419 | 6519 | 1503 | 1433 |
| DECELERATION 1-5 | | 6423 | 6514 | 1503 | 1433 |
| DECELERATION 1-6 | | 6426 | 6506 | 1503 | 1433 |
| DECELERATION 2-1 | 6901 | 6428 | 6501 | 1503 | 1433 |
| DECELERATION 2-2 | | 6426 | 6506 | 1503 | 1433 |
| DECELERATION 2-3 | | 6423 | 6514 | 1503 | 143A |
| DECELERATION 2-4 | | 6419 | 6519 | 1503 | 143A |
| DECELERATION 2-5 | | 6414 | 6523 | 1503 | 143A |
| DECELERATION 2-6 | | 6406 | 6526 | 1503 | 143A |
| DECELERATION 3-1 | 6901 | 6401 | 6528 | 1503 | 143A |
| DECELERATION 3-2 | | 6406 | 6526 | 1503 | 143A |
| DECELERATION 3-3 | | 6414 | 6523 | 1503 | 143A |
| DECELERATION 3-4 | | 6419 | 6519 | 1503 | 1430 |
| DECELERATION 3-5 | | 6423 | 6514 | 1503 | 1430 |
| DECELERATION 3-6 | | 6426 | 6506 | 1503 | 1430 |
| DECELERATION 4-1 | 6901 | 6428 | 6501 | 1503 | 1430 |
| ☐ | | | | | |
| ☐ | | | | | |
| DECELERATION 22-1 | 6901 | 6428 | 6501 | 1511 | 145A |
| DECELERATION 22-2 | | 6426 | 6506 | 1513 | 1400 |
| DECELERATION 22-3 | | 6423 | 6514 | 1514 | 14E6 |
| DECELERATION 22-4 | | 6419 | 6519 | 1516 | 14E0 |
| DECELERATION 22-5 | | 6414 | 6523 | 1518 | 14B3 |
| DECELERATION 22-6 | | 6406 | 6526 | 1519 | 14D3 |
| MOTOR'S OWN PHASE | | 6401 6100 | 6528 | 1527 | 1400 |

FIG.28

| FUNCTION | LF PHASE SELECTION /REVOLUTION DIRECTION | LFPWMA /PWMRUN | LFPWMB | WAITH 64μsec | WAITL 0.5μsec |
|---|---|---|---|---|---|
| INITIAL SETTING | 7B01 | 7101 | | | |
| MOTOR'S OWN PHASE | | 7401 | 7528 | 159C | 1400 |
| ACCELERATION 1-1 | 7901 | 7401 | 7528 | 1505 | 1424 |
| ACCELERATION 1-2 | | 7406 | 7526 | 1505 | 141C |
| ACCELERATION 1-3 | | 7414 | 7523 | 1505 | 140C |
| ACCELERATION 1-4 | | 7419 | 7519 | 1505 | 1400 |
| ACCELERATION 1-5 | | 7423 | 7514 | 1504 | 14F0 |
| ACCELERATION 1-6 | | 7426 | 7506 | 1504 | 14E4 |
| ACCELERATION 2-1 | 7901 | 7428 | 7501 | 1504 | 14D4 |
| ACCELERATION 2-2 | | 7426 | 7506 | 1504 | 14C8 |
| ACCELERATION 2-3 | | 7423 | 7514 | 1504 | 14BC |
| ACCELERATION 2-4 | | 7419 | 7519 | 1504 | 14B0 |
| ACCELERATION 2-5 | | 7414 | 7523 | 1504 | 14A4 |
| ACCELERATION 2-6 | | 7406 | 7526 | 1504 | 1498 |
| ACCELERATION 3-1 | 7901 | 7401 | 7528 | 1504 | 148C |
| ACCELERATION 3-2 | | 7406 | 7526 | 1504 | 1480 |
| ACCELERATION 3-3 | | 7414 | 7523 | 1504 | 1478 |
| ACCELERATION 3-4 | | 7419 | 7519 | 1504 | 146C |
| ACCELERATION 3-5 | | 7423 | 7514 | 1504 | 1464 |
| ACCELERATION 3-6 | | 7426 | 7506 | 1504 | 1458 |
| ACCELERATION 4-1 | 7901 | 7428 | 7501 | 1504 | 1450 |
| ☐ | | | | | |
| ☐ | | | | | |
| ACCELERATION 22-1 | 7901 | 7428 | 7501 | 1503 | 1430 |
| ACCELERATION 22-2 | | 7426 | 7506 | 1503 | 142C |
| ACCELERATION 22-3 | | 7423 | 7514 | 1503 | 1428 |
| ACCELERATION 22-4 | | 7419 | 7519 | 1503 | 1424 |
| ACCELERATION 22-5 | | 7414 | 7523 | 1503 | 1424 |
| ACCELERATION 22-6 | | 7406 | 7526 | 1503 | 1420 |

FIG.29

| FUNCTION | LF PHASE SELECTION /REVOLUTION DIRECTION | LFPWMA /PWMRUN | LFPWMB | WAITH 64μsec | WAITL 0.5μsec |
|---|---|---|---|---|---|
| DECELERATION 1-1 | 7901 | 7401 | 7528 | 1503 | 1420 |
| DECELERATION 1-2 | | 7406 | 7526 | 1503 | 1424 |
| DECELERATION 1-3 | | 7414 | 7523 | 1503 | 1424 |
| DECELERATION 1-4 | | 7419 | 7519 | 1503 | 1428 |
| DECELERATION 1-5 | | 7423 | 7514 | 1503 | 142C |
| DECELERATION 1-6 | | 7426 | 7506 | 1503 | 1430 |
| DECELERATION 2-1 | 7901 | 7428 | 7501 | 1503 | 1434 |
| DECELERATION 2-2 | | 7426 | 7506 | 1503 | 1438 |
| DECELERATION 2-3 | | 7423 | 7514 | 1503 | 143E |
| DECELERATION 2-4 | | 7419 | 7519 | 1503 | 1440 |
| DECELERATION 2-5 | | 7414 | 7523 | 1503 | 1444 |
| DECELERATION 2-6 | | 7406 | 7526 | 1503 | 1448 |
| DECELERATION 3-1 | 7901 | 7401 | 7528 | 1503 | 144C |
| DECELERATION 3-2 | | 7406 | 7526 | 1503 | 1450 |
| DECELERATION 3-3 | | 7414 | 7523 | 1503 | 1458 |
| DECELERATION 3-4 | | 7419 | 7519 | 1503 | 145C |
| DECELERATION 3-5 | | 7423 | 7514 | 1503 | 1460 |
| DECELERATION 3-6 | | 7426 | 7506 | 1503 | 1464 |
| DECELERATION 4-1 | 7901 | 7428 | 7501 | 1503 | 1468 |
| ☐ | | | | | |
| ☐ | | | | | |
| DECELERATION 22-1 | 7901 | 7428 | 7501 | 1504 | 14E4 |
| DECELERATION 22-2 | | 7426 | 7506 | 1504 | 14F0 |
| DECELERATION 22-3 | | 7423 | 7514 | 1505 | 1400 |
| DECELERATION 22-4 | | 7419 | 7519 | 1505 | 140C |
| DECELERATION 22-5 | | 7414 | 7523 | 1505 | 141C |
| DECELERATION 22-6 | | 7406 | 7526 | 1505 | 1424 |
| MOTOR'S OWN PHASE STOPPING PROCESSING | | 7401 7100 | 7528 | 159C | 1400 |

FIG.30

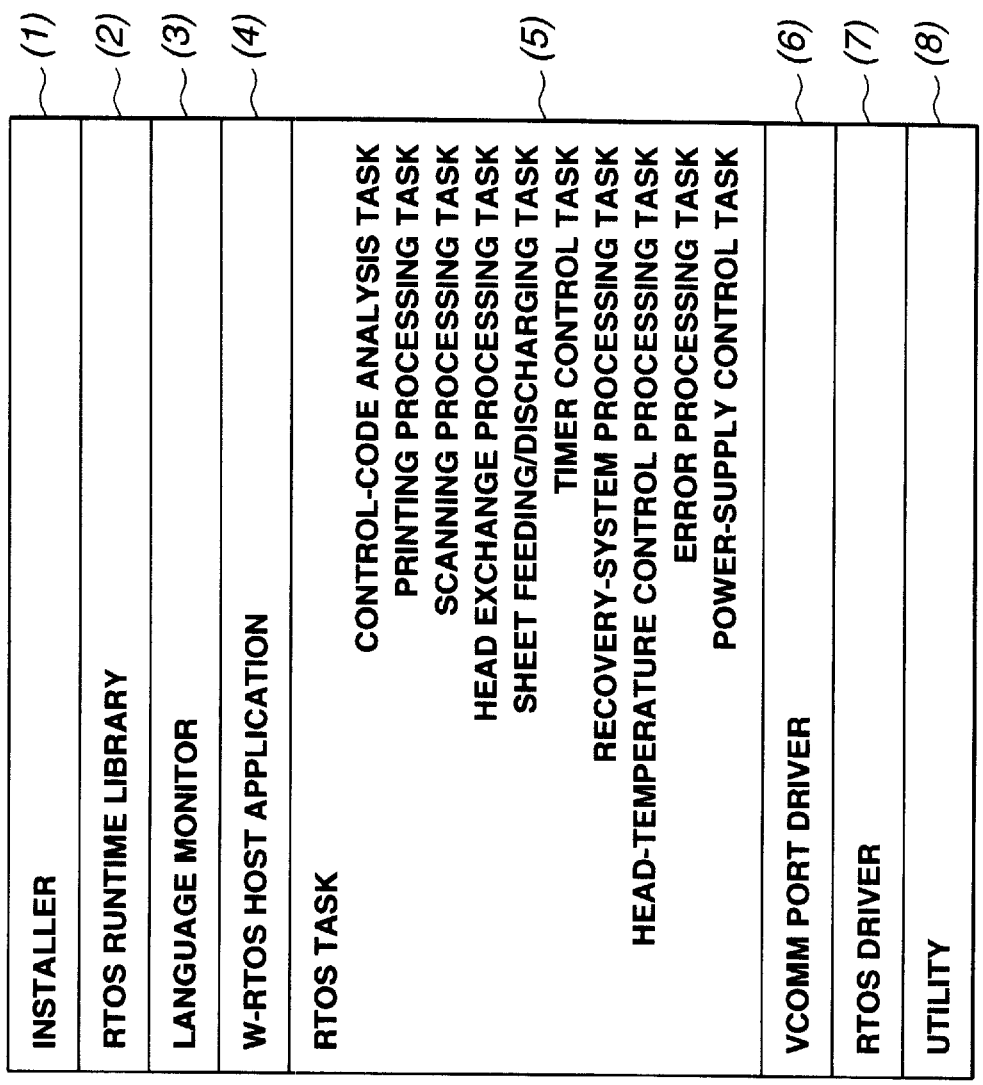

| | |
|---|---|
| INSTALLER | (1) |
| RTOS RUNTIME LIBRARY | (2) |
| LANGUAGE MONITOR | (3) |
| W-RTOS HOST APPLICATION | (4) |
| RTOS TASK<br>　CONTROL-CODE ANALYSIS TASK<br>　PRINTING PROCESSING TASK<br>　SCANNING PROCESSING TASK<br>　HEAD EXCHANGE PROCESSING TASK<br>　SHEET FEEDING/DISCHARGING TASK<br>　TIMER CONTROL TASK<br>　RECOVERY-SYSTEM PROCESSING TASK<br>　HEAD-TEMPERATURE CONTROL PROCESSING TASK<br>　ERROR PROCESSING TASK<br>　POWER-SUPPLY CONTROL TASK | (5) |
| VCOMM PORT DRIVER | (6) |
| RTOS DRIVER | (7) |
| UTILITY | (8) |

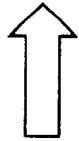
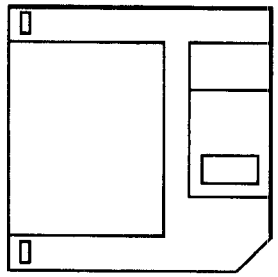

FIG.43

ESC  COMMAND  LENGTH  DATA

FIG.44

(1)  ESC  P  0
(2)  ESC  S  0
(3)  ESC  E  0
(4)  ESC  H  1  MODE
  MODE = 0 : START
  MODE = 1 : END
(5)  ESC  I  0
(6)  ESC  0  0
(7)  ESC  i  COLOR  LENGTH  DATA...
color = K : BLACK
color = C : CYAN
color = M : MAGENTA
color = Y : YELLOW
(8)  ESC  s  0
(9)  ESC  f  2  FEED
(10) ESC  r  0

FIG.45

ESC  i  K  LENGTH  DATA...
ESC  i  C  LENGTH  DATA...
ESC  i  M  LENGTH  DATA...
ESC  i  Y  LENGTH  DATA...
ESC  s  0

COLOR HEAD

MONOCHROMATIC HEAD

24 DOTS

24 DOTS

24 DOTS

64 DOTS

FIG.53
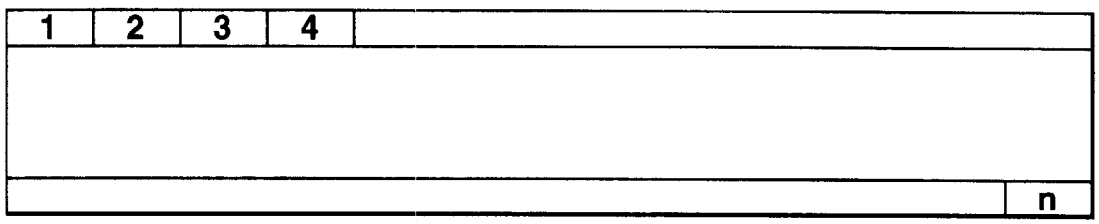
RASTER
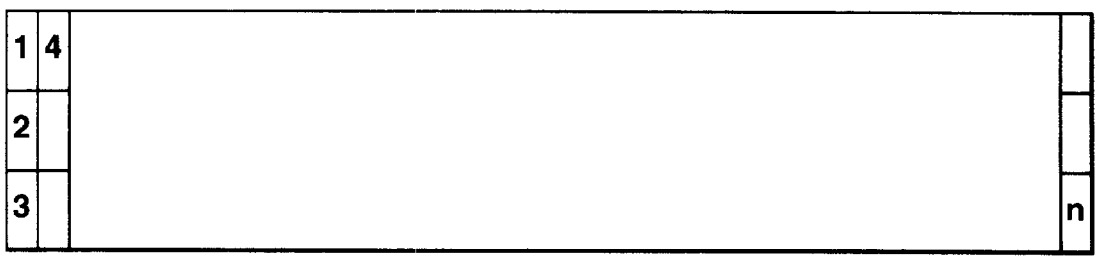
COLUMN

FIG.57

| | |
|---|---|
| K-DATA SETTING POINTER KSP | ~ 71 - 01 |
| C-DATA SETTING POINTER CSP | ~ 71 - 02 |
| M-DATA SETTING POINTER MSP | ~ 71 - 03 |
| Y-DATA SETTING POINTER YSP | ~ 71 - 04 |
| K-DATA GETTING POINTER KGP | ~ 71 - 05 |
| C-DATA GETTING POINTER CGP | ~ 71 - 06 |
| M-DATA GETTING POINTER MGP | ~ 71 - 07 |
| Y-DATA GETTING POINTER YGP | ~ 71 - 08 |
| RASTER COUNTER RCNT | ~ 71 - 09 |

FIG.74

| 1-1 | 2-1 | | n-1 |
|---|---|---|---|
| 1-2 | 2-2 | | n-2 |
| 1-3 | 2-3 | | n-3 |
| 1-17 | 2-17 | | n-17 |

FIG.77

| | | | |
|---|---|---|---|
| 1-1 | 2-1 | | n-1 |
| 1-2 | 2-2 | | n-2 |
| 1-3 | 2-3 | | n-3 |
| 1-16 | 2-16 | | n-16 |

PRINTER CONTROL SYSTEM AND METHOD USING A CONTROL I/O COMMAND FROM A HOST COMPUTER, AND SCANNER CONTROL SYSTEM AND METHOD OF USING A CONTROL I/O COMMAND FROM A HOST COMPUTER

BACKGROUND OF THE INVENTION

1. Field of the Invention

This invention relates to a printing control system or a scanner control system in which a printer or a scanner is connected to a personal computer (a host computer), and the host computer controls the printer or the scanner to perform printing or scanning, respectively.

2. Description of the Related Art

Conventionally, a host computer (a personal computer) and a printer are connected to each other via an interface (Centronics or the like), and the printer sequentially processes printing data and printing instructions transmitted from the host computer to perform printing. The printing data and the printing instructions are formed by a printer-driver in the form of control codes peculiar to the printer, and are transmitted to the printer.

The printer analyzes control codes transmitted from the host computer, and, in the case of printing data, stores an amount of printing data which can be printed. Some control codes for printing data are provided in the form of rasters. Stored printing data is subjected to image processing or conversion processing so as to be reconstructed into image data which can be printed by a print head mounted in the printer, and the obtained image data is transmitted to the print head in order to perform printing. Control codes relate to processing for various controls for sheet feeding/discharging, feeding, and the like. Printing procedures in a Windows system provided by Microsoft Coropration will be described with reference to FIG. 31.

Correspondingly, a host computer (a personal computer) and a scanner are connected to each other via an interface (an SCSI (small computer system interface) or the like). The scanner sequentially processes scanning control codes transmitted from the host computer, and performs scanning by transmitting scanned image data to the host computer. The scanning control codes are control codes peculiar to the scanner, which are formed by scanner application software and are transmitted to the scanner. The scanner analyzes control codes transmitted from the host computer to perform a scanning operation and transmission of image data. Scanning control codes relate to processing for various controls for sheet feeding/discharging, feeding, and the like.

In the above-described conventional approach, the host computer forms a printing image according to printing instructions from application software, and forms control codes for printing data and printing instructions to be transmitted to the printer from the printing image. Since the host computer and the printer are completely independent of each other, the printer has many resources, such as a CPU (central processing unit), a ROM (read-only memory) for storing processing procedures, a RAM (random access memory) for storing data, and the like, in order to perform processing of analyzing control codes for printing, processing of developing an image, image processing, and the like. However, the performance of the host computer has been greatly improved compared with that of the printer, and in many cases, it is more advantageous to perform processing which has previously been performed in the printer in the host computer.

SUMMARY OF THE INVENTION

The present invention has been made in consideration of the above-described background.

It is an object of the present invention to provide a printing control system in a printer and a host computer in which resources conventionally incorporated in the printer are simplified to reduce the production cost by performing processing which has previously been processed by the printer by the host computer having a higher performance than the printer.

Conventionally, a host computer only forms and transmits control codes for scanning. Since the host computer and a scanner are completely independent of each other, the scanner has many resources, such as a CPU, a ROM for storing processing procedures, a RAM for storing data, and the like, in order to perform processing of analyzing control codes for scanning, control of scanning operations, image-ata processing, and the like. However, the performance of the host computer has been greatly improved compared with that of the scanner, and in many cases, it is more advantageous to perform processing which has previously been performed in the scanner in the host computer.

It is another object of the present invention to provide a scanner control system in a scanner and a host computer in which resources conventionally incorporated in the scanner are simplified to reduce the production cost by performing processing which has previously been processed by the scanner by the host computer having a higher performance than the scanner.

In the above-described host-computer-based printing system, in order to realize the control of the printer by the host computer, it is necessary to change Windows of Microsoft Corporation, a Windows printing sytem and a printer driver.

It is still another object of the present invention to provide a method relating to printer control in a printer and a host computer in which resources previously incorporated in the printer are simplified to reduce the production cost by performing processing previously performed by the printer by the host computer having a higher performance than the printer.

It is yet another object of the present invention to provide a printing control system in which it is unnecessary to change Windows, a Windows printing system and a printer driver, because conventional control codes from the printer driver are utilized as inputs.

In the conventional system, it is necessary for a host computer to form a printing image according to printing instructions from application software and to form control codes for printing data and printing commands to be transmitted to a printer from the printing image.

The printer has many resources, such as a CPU, a ROM for storing processing procedures, a RAM for storing data, and the like, in order to perform processing of analyzing commands for printing, processing of developing an image, image processing, and the like. However, the performance of the host computer has been greatly improved compared with that of the printer, and in many cases, it is more advantageous to perform processing which has previously been performed in the printer in the host computer.

It is yet a further object of the present invention to provide a printer control (time control) system in a printer and a host computer in which resources conventionally incorporated in the printer are simplified to reduce the production cost by performing processing which has previously been processed by the printer by the host computer having a higher performance than the printer.

According to one aspect, the present invention which achieves these objectives relates to a printing control system for controlling a printer from a host unit. The host unit includes control-code analysis means for analyzing control codes transmitted from a printer driver, control-I/O-command forming means for forming control I/O commands from the control codes, control-I/O-command transmission means for transmitting the control I/O commands to the printer, and control-I/O-command-execution instruction means for instructing execution of the control I/O commands transmitted from the control-I/O-command transmission means to the printer. The host unit causes the printer to execute printing using the control I/O commands formed by the control-I/O-command forming means and the control-I/O-command-execution instruction means.

According to another aspect, the present invention which achieves these objectives relates to a scanner control system for controlling a scanner from a host unit. The host unit includes control-code analysis means for analyzing control codes transmitted from scanner application software, control-I/O-command forming means for forming control I/O commands from the control codes, control-I/O-command transmission means for transmitting the control I/O commands to the scanner, and control-I/O-command-execution instruction means for instructing execution of the control I/O commands transmitted from the control-I/O-command transmission means to the scanner. The host unit causes the scanner to execute scanning using the control I/O commands formed by the control-I/O-command forming means and the control-I/O-command-execution instruction means.

According to still another aspect, the present invention which achieves these objectives relates to a printing control system for controlling a printer from a host unit. The system includes control-code analysis means for analyzing control codes, control-I/O-command forming means for forming control I/O commands from the control codes, control-I/O-command transmission means for transmitting the control I/O commands formed by the control-I/O-command forming means to the printer, control-I/O-command-execution instruction means for instructing execution of the control I/O commands transmitted from the control-I/O-command transmission means to the printer, and control-code transfer means for transferring control codes transmitted from a printer driver to the control-code analysis means.

According to yet another aspect, the present invention which-achieves these objectives relates to a printing control system for controlling a printer from a host unit. The system includes a printing control unit for controlling the printer. The printing control unit includes interface means for exchanging commands and data with the host unit, control-I/O-command holding means for holding control I/O commands transmitted from the host unit via the interface means, control-I/O-command control means for reading the control I/O commands held in the control-I/O-command holding means, and control-I/O-command execution means for controlling the printer according to the read control I/O commands. The printing control unit controls the printer using the control I/O command formed by the host unit.

According to yet a further aspect, the present invention which achieves these objectives relates to a printing control system for controlling a printer from a host unit in a real-time OS (operating system) environment. The system includes a printing control unit for controlling the printer. The printing control unit includes interface means for exchanging direct control I/O commands with the host unit, command control means for performing read/write access to a register at an arbitrary address in response to the direct control I/O commands from the host unit via the interface means, and command execution means for controlling the printer by performing read/write access to the arbitrary register. The host unit performs real-time control of the printer using the direct control I/O commands.

According to still a further aspect, the present invention which achieves these objectives relates to a printing. control system for controlling a printer from a host unit in which a printing control unit controls the printer using control I/O commands formed by the host unit. The printing control unit includes interface means for exchanging commands and data with the host unit, control-I/O-command holding means for holding control I/O commands transmitted from the host unit via the interface means, control-I/O-command control means for reading the control I/O commands held in the control-I/O-command holding means, and control-I/O-command execution means for controlling the printer according to the read control I/O commands. The control I/O commands transmitted from the control-I/O-command control means are configured in a form of the addresses of registers in the control-I/O-command execution means and data stored in the registers.

The foregoing and other objects, advantages and features of the present invention will become more apparent from the following description of the preferred embodiments taken in conjunction with the accompanying drawings.

BRIEF DESCRIPTION OF THE DRAWINGS

FIG. 4 is an I/O address map of the host unit;

FIGS. 6(a)–6(c) are diagrams, each illustrating the configuration of a PRT/IO register;

FIG. 9 is a register map within the state machine controller;

FIG. 10 is a timing chart when executing control I/O commands;

FIG. 18 is a register map of the printer I/O controller IC;

FIG. 24 is a table illustrating a group of self-staring-region uniform-revolution-operation control I/O commands during a carriage initializing operation;

FIG. 25 is a table illustrating a group of control I/O commands during a one-way printing operation (an accelerating portion);

FIG. 26 is a table-illustrating a group of control I/O commands during a one-way printing operation (a uniform-revolution portion);

FIG. 27 is a table illustrating a group of control I/O commands during a one-way printing operation (a decelerating portion);

FIG. 28 is a table illustrating a group of control I/O commands during a sheet feeding operation (an accelerating portion);

FIG. 29 is a table illustrating a group of control I/O commands during a sheet feeding operation (a decelerating portion);

FIG. 30 is a diagram illustrating the configuration of a medium;

FIG. 43 is a diagram illustrating the basic configuration of a control code;

FIG. 44 is a diagram illustrating a summary of control codes;

FIG. 45 is a diagram illustrating the sequence of image control codes;

FIGS. 47 through 53 are diagrams, each illustrating the configuration of a buffer storage;

FIG. 57 is a diagram illustrating pointers and a counter;

Figure 74:
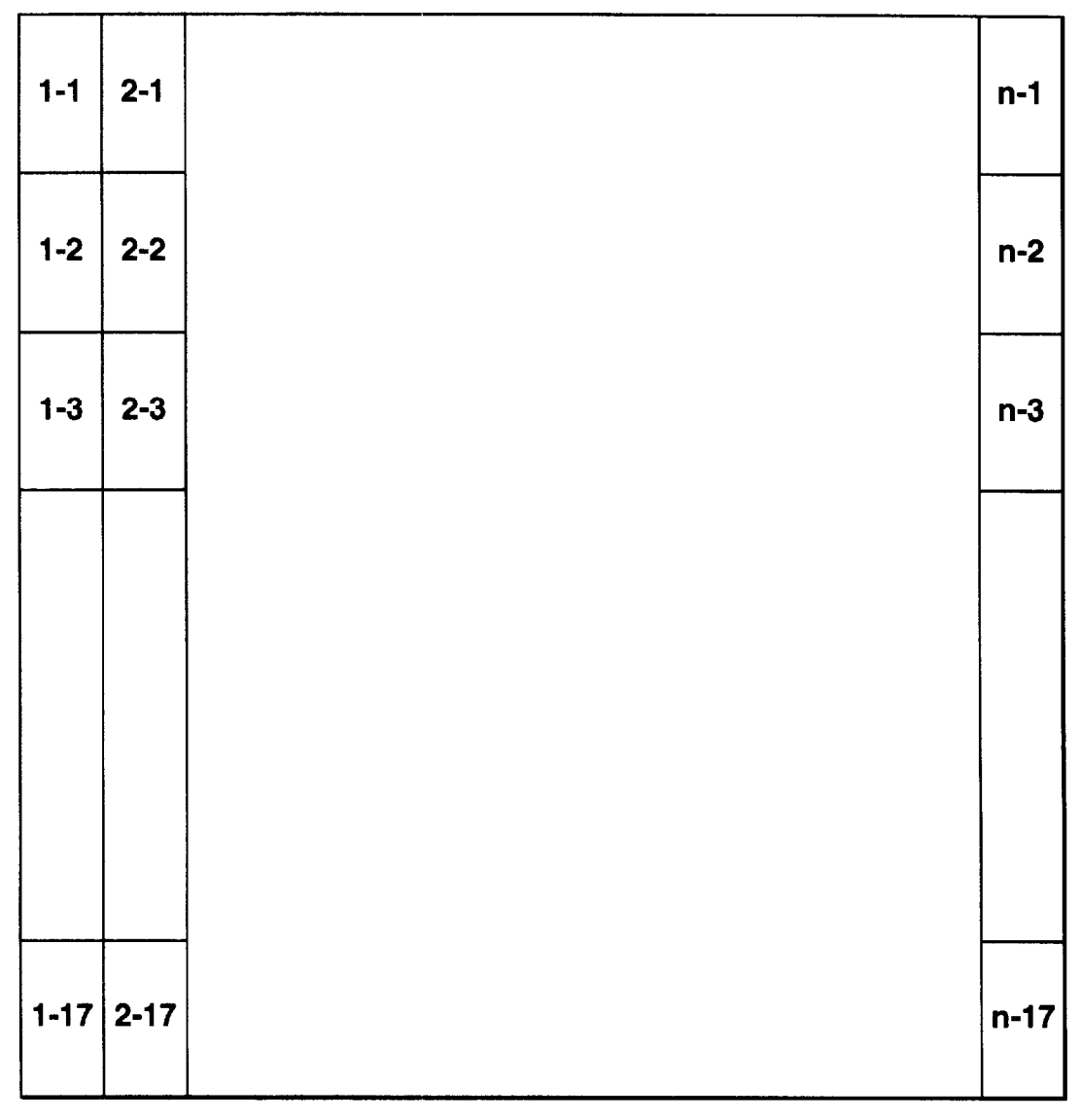

FIGS. 72 through 74 are diagrams illustrating the contents of a buffer storage which has received printing control I/O commands;

Figure 77:
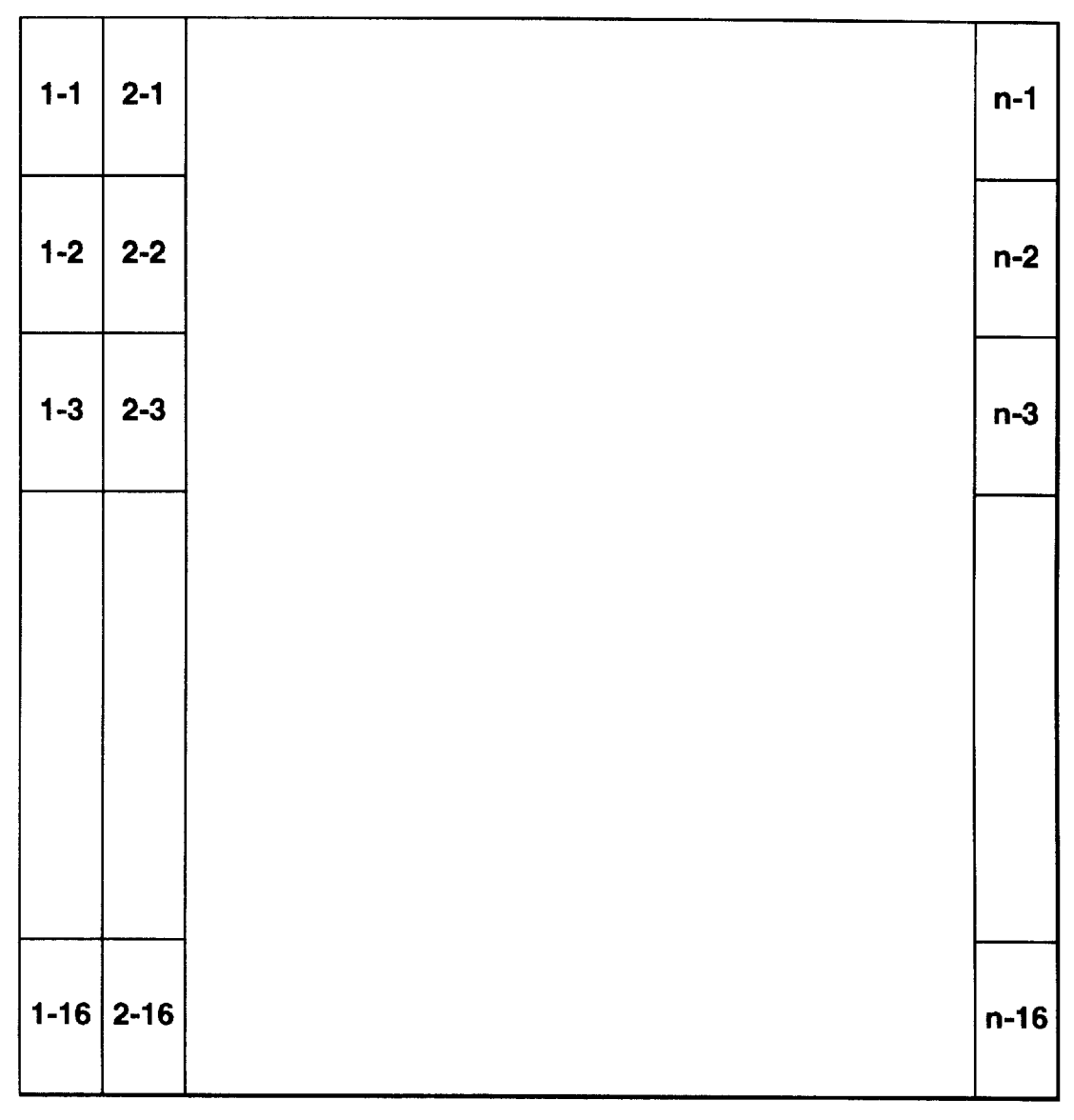

FIGS. 75 through 77 are diagrams illustrating the contents of a buffer storage which has received scanning control I/O commands;

DESCRIPTION OF THE PREFERRED EMBODIMENTS

First Embodiment

Figure 1:
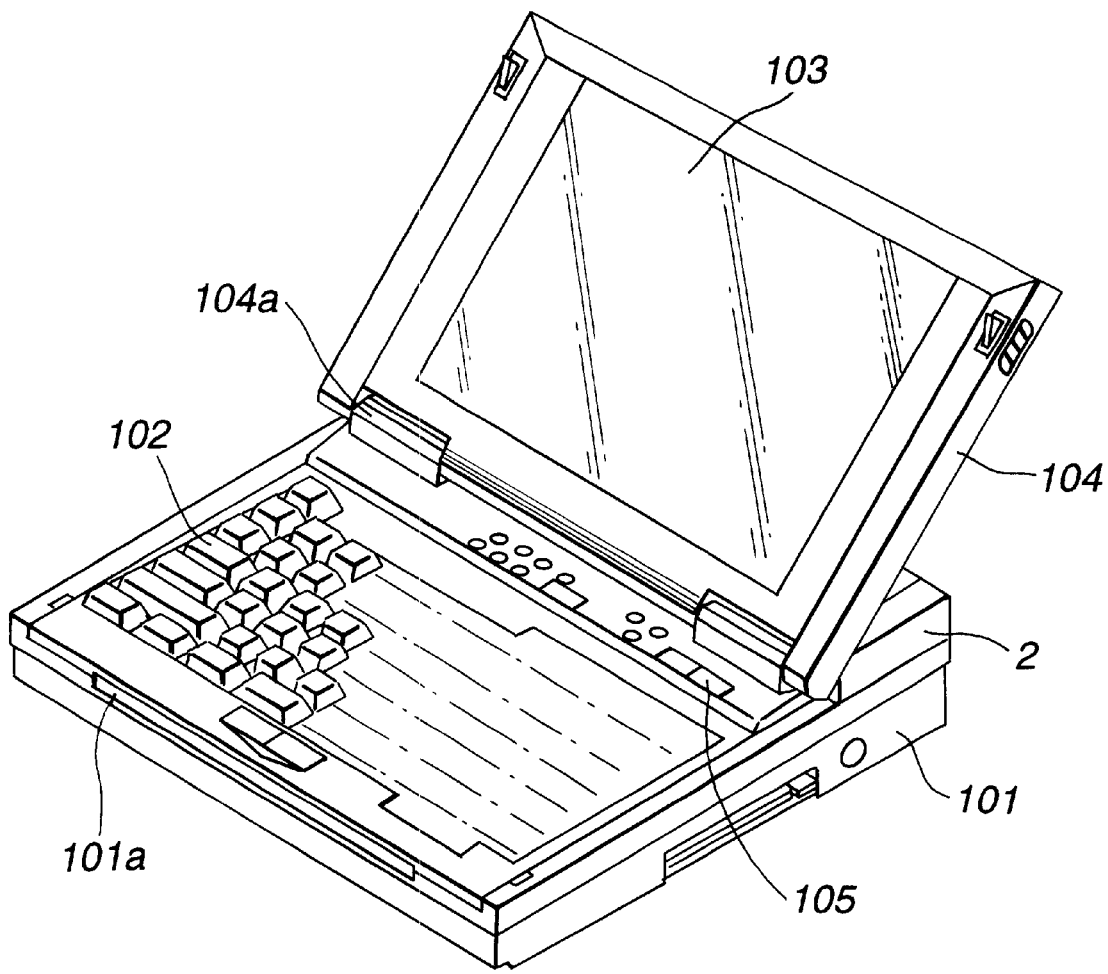
FIG. 1 is a perspective view illustrating a personal computer according to a first embodiment of the present invention.

FIG. 1 is a perspective view illustrating a portable personal computer (hereinafter termed a "PC") including a host-computer unit and a printer unit integrated therein according to a first embodiment of the present invention.

The PC is configured by a main body 101 of the PC, a keyboard 102, a display unit 103, and a printer unit 2.

An upper cover 104 is mounted on the main body 101 so as to be rotatable around hinges 104a provided at two ends of a rear portion of the main body 101. According to this configuration, the upper cover 104 is opened by being rotated to a position where the display unit 103 is easily observed when the PC is used, and is closed when the PC is not used, so that the cover 104 can function as a cover.

For example, a liquid-crystal display (LCD) is used for the display unit 103, because a thin display unit can be provided. The printer unit 2 has an opening which can be opened/closed by the user, so that the recording head can be exchanged.

Although not illustrated, a recording sheet is inserted from a sheet feeding port 101a provided below the keyboard 102, is then conveyed through a conveying path threaded through the main body 101, and is discharged from a sheet discharging port provided at a rear portion of the PC. The keyboard 102 is mounted so as to be rotatable around hinges 102a provided at both sides of the main body 101. Since the conveying path for the recording sheet is provided below the keyboard 102, the keyboard 102 or the display unit 102 can be operated even if the recording sheet is set.

Figure 2:
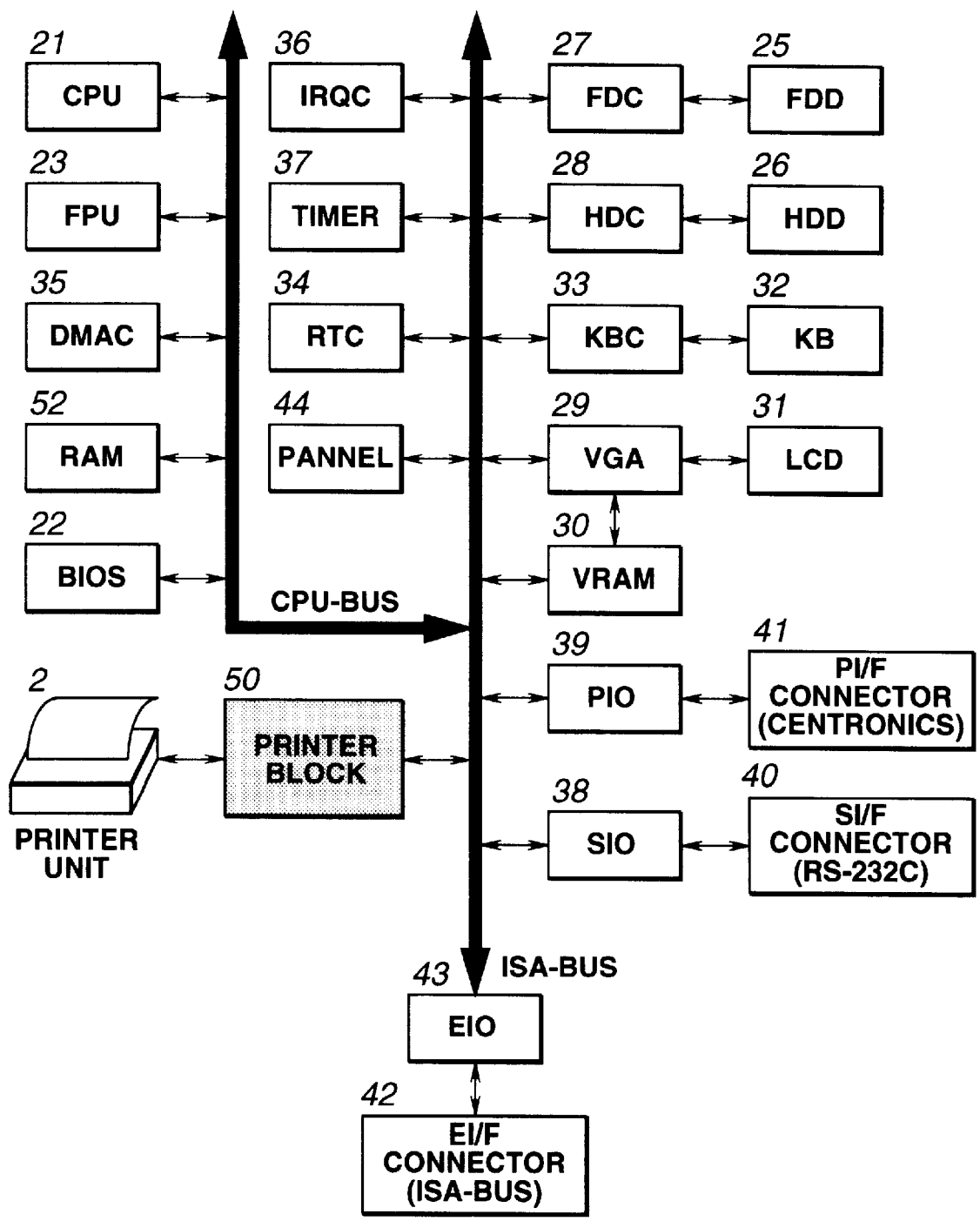
FIG. 2 is a schematic block diagram of the personal computer shown in FIG. 1.

FIG. 2 is a schematic block diagram illustrating the internal configuration of the PC. The host-computer unit (hereinafter termed a "host unit") in the first embodiment is configured by a system equivalent to a PC/AT compatible machine.

Main control in the host unit is executed by a CPU 21, and a BIOS(basic input/output system)-ROM 22 instructs the basic control of the CPU 21. A floating-point processing unit (FPU) 23 is connected to a CPU-bus, and expands an instruction for calculation, such as floating-point arithmetic, logarithmic calculation or the like.

An application program or a data file is read from a floppy-disk drive (FDD) 25 or a hard-disk drive (HDD) 26 via a floppy-disk controller (FDC) 27 or a hard-disk controller (HDC) 28, respectively, and the application program is executed utilizing a system memory (system RAM).

At that time, characters, graphics or the like are displayed on an LCD 31 using a video controller (VGA (Video Graphics Array) 29 and a display memory (V(video)RAM) 30, and a key input from a keyboard (KB) 32 is received via a keyboard controller (KBC) 33.

A real-time clock (RTC) 34 is a timer indicating the current time. A DMA (direct memory access) controller (DMAC) 35 performs data transfer between memories, and between a memory and an I/O without intervention of the CPU 21. An interrupt controller (IRQC) 36 receives an interrupt from each I/O, and performs processing in accordance with the priority order. A system timer (TIMER) 37 has free-running timers of several channels, and performs various time controls.

There are also shown a serial port (SIO) 38 conforming to RS-232C, a parallel port (PIO) 39 conforming to Centronics, and an expansion port (EIO) 43 conforming to ISA (Industry Standard Architecture) as port blocks connected to external connectors, i.e., an SI/F connector 40, a PI/F connector 41, and an EI/F connector 42, respectively.

An LED output port for notifying the user of an operational state, and an operation-switch input port are connected to a PANEL 44.

In the first embodiment, the printer unit is directly connected to the host unit via an ISA-bus, so that data can be exchanged via an I/O register of the ISA-bus.

Figure 3:
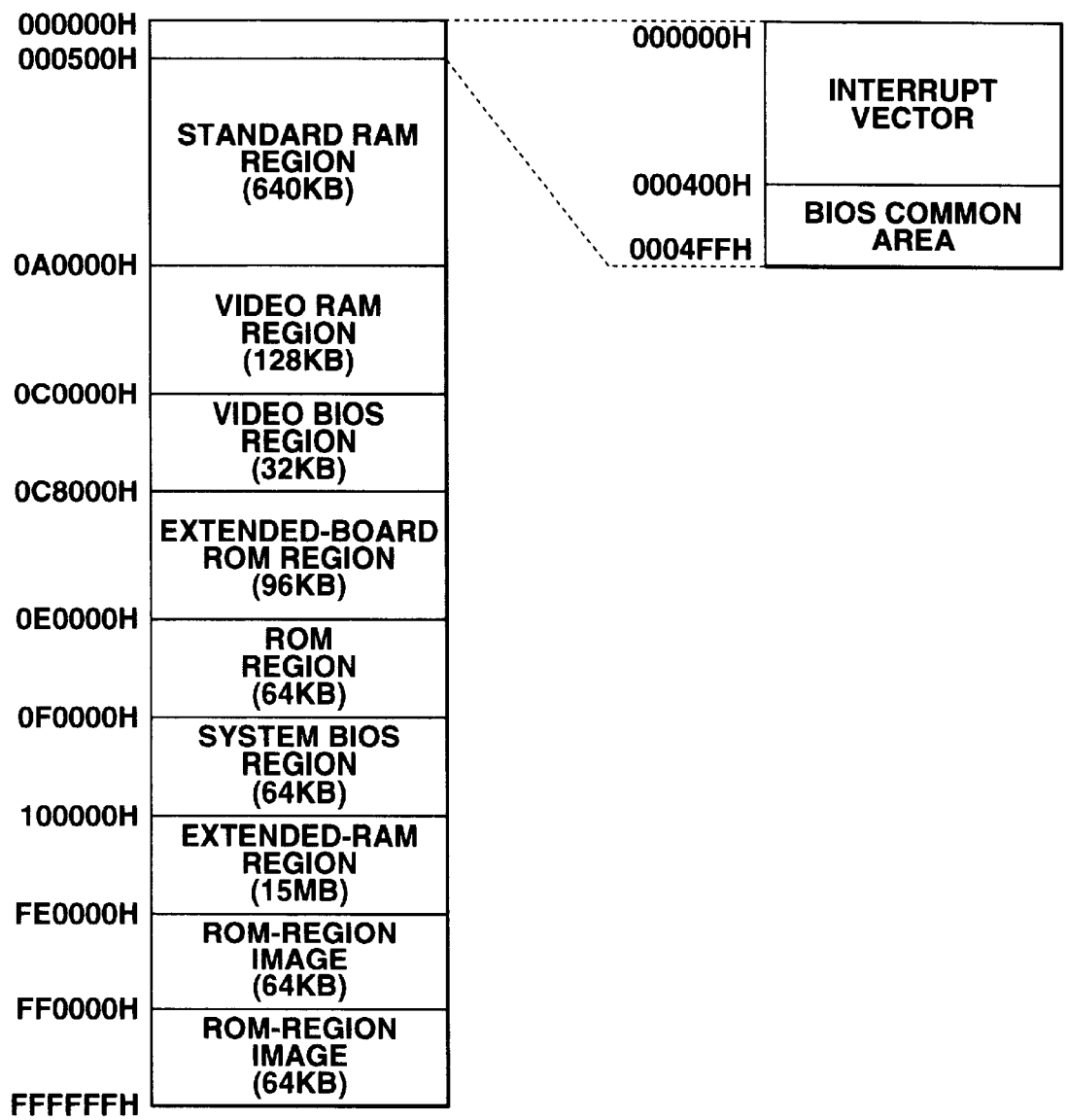
FIG. 3 is a memory-address map in a host unit of the personal computer.

FIG. 3 illustrates the arrangement of the memory map of the RAM of the host unit in the first embodiment.

The RAM has 640 KB of a standard region having addresses 00000H–BFFFFH, and 15 MB of an extended region having addresses 100000H–FDFFFFH, and is subjected to memory mapping so as to be arranged within these regions.

There is a region for storing interrupt vectors in the leading portion 00000H–003FFH of the standard region of the RAM, and an entry address for each processing for an interrupt is stored in this region. A video RAM region and a video BIOS region are arranged within the video controller. Programs for video control are stored in the video BIOS region, and video display data is stored in the video RAM region. An extended-board ROM region is arranged in a region having addresses C8000H–DFFFFH, and is used by devices on an extended board. A system BIOS region is arranged in a region having addresses F0000H–FFFFFH, and stores BIOS programs for performing various kinds of I/O processing.

FIG. 4 illustrates an I/O address map of the host unit in the first embodiment.

Each I/O address shown in FIG. 4 performs data exchange (read/write) between the host unit and each device via an I/O address register of the device set in the form of hardware. A description will now be provided of portions relating to the printer unit.

Each of parallel ports 1–3 (PIO/IO) is a register for transmitting general-purpose parallel data to an external device connected to the host unit via the PI/F connector.

Figure 20:
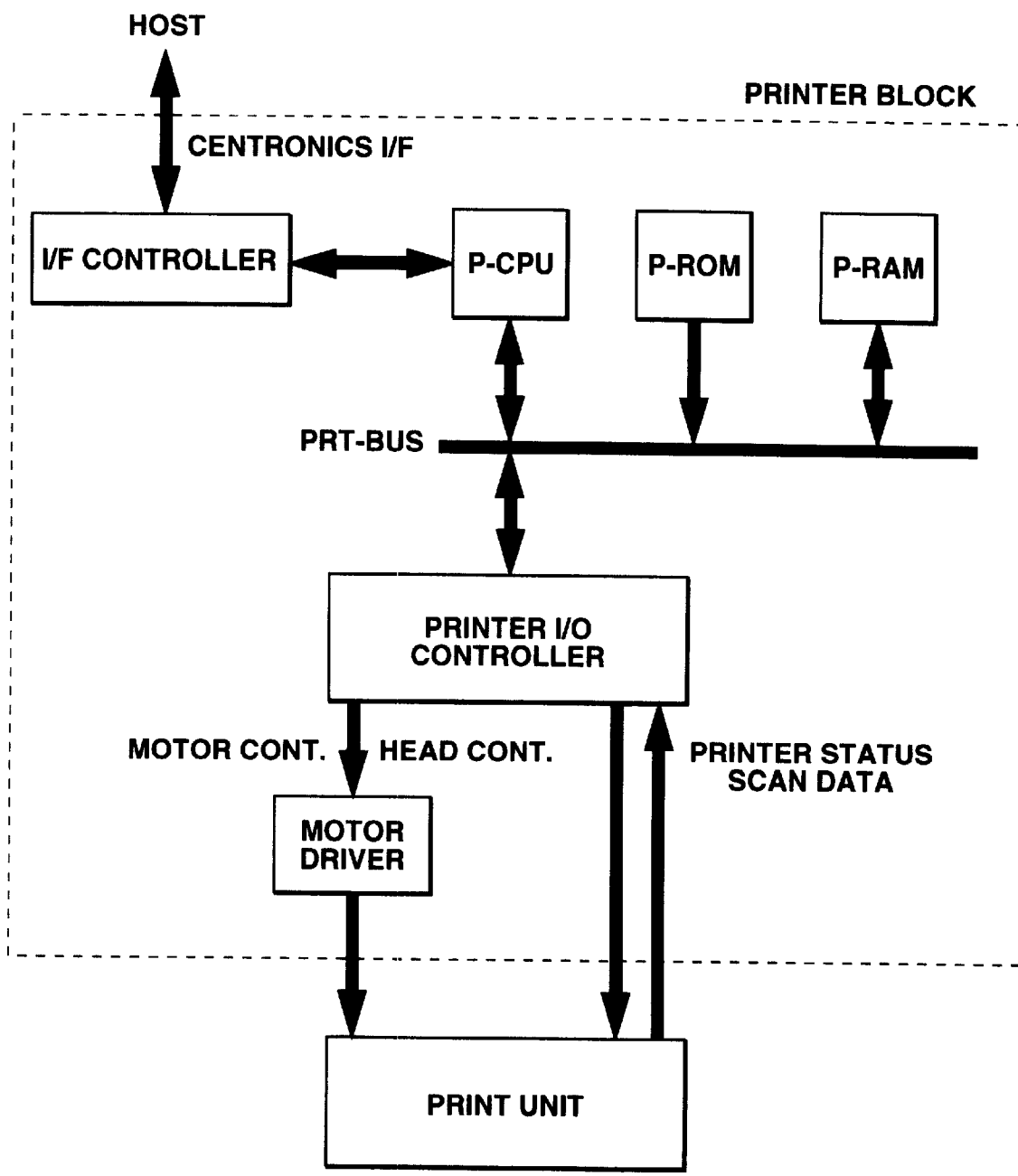
FIG. 20 is a block diagram of a conventional printer control unit.

FIG. 20 illustrates the system configuration of a conventional printer control unit.

In FIG. 20, an I/F controller is connected to a parallel port of the host unit via a cable, and receives control codes for performing a printing operation transmitted from the host unit. A P-CPU is a CPU for performing main control in the printer control unit, and performs control by performing a time-sharing operation between processing of receiving control codes from the I/F controller and processing of performing a printing operation for the printer.

A P-ROM is a ROM storing operation programs for the P-CPU. A P-RAM is a RAM which is used as a working memory when the P-CPU executes an operation program, or as a receiving memory for temporarily storing control codes transmitted from the I/F controller, or as a printing memory for temporarily storing image data obtained by converting control codes into the form of actual data to be transmitted to a print head.

A printer I/O controller is a control block for operating the printer unit, and, for example, performs phase switching of a carrier motor or a feeding motor of the printer unit or transfers image data to the print head, according to access processing of the P-CPU to a register at an arbitrary address allocated by the printer I/O controller via a PRT-bus.

That is, in printing processing of the conventional printer control unit, the P-CPU sequentially interprets control codes for printing transmitted from the host unit, and performs printing by transferring image data to the print head by horizontally scanning a carrier.

In image reading processing by the conventional printer control unit, upon reception of control codes for instructing execution of scanning from the host unit in a state in which a scanner head for image reading is mounted on the carrier of the printer unit instead of the print head, image data is read by the scanner head while scanning the carrier, and the obtained image data is sequentially transferred to the host unit utilizing, for example, a nibble node of a parallel interface.

In the printer control unit used in the first embodiment, however, a printing operation is performed using a dedicated port (PRT/IO) of the printer control unit instead of using a general-purpose parallel port.

Returning to FIG. 4, a setup register (SET/IO) having addresses 100H–107H performs, for example, address setting for the PRT/IO, and sets base addresses and port enable of a supervisor command register (SVA/IO.SVD/IO) and a control I/O command register (BAT/IO) constituting the PRT/IO.

Figure 5A:
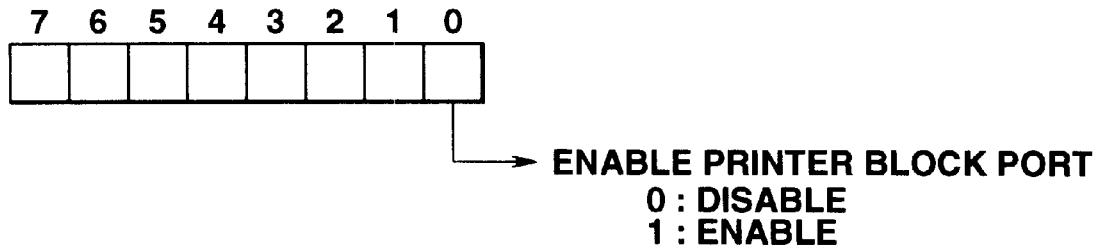
FIGS. 5(a)–5(c) are diagrams, each illustrating the configuration of a SET/IO register.
Figure 5B:
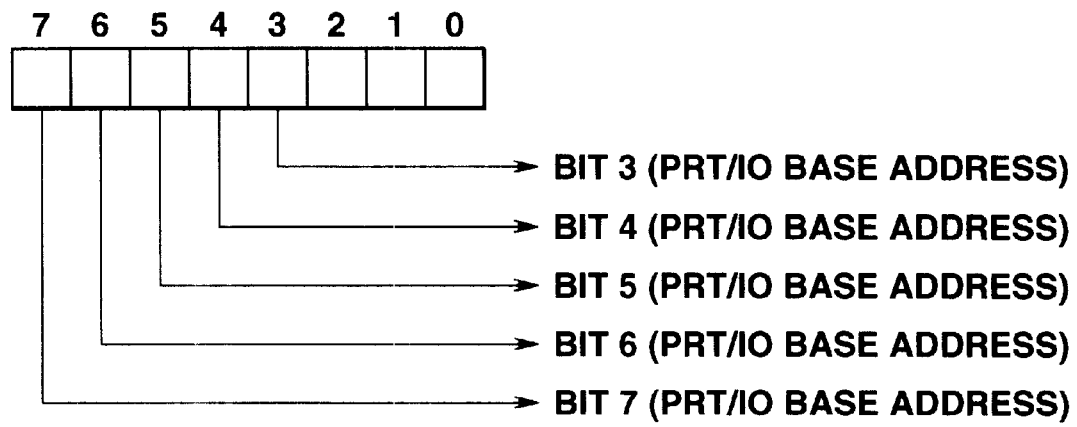
Figure 5C:
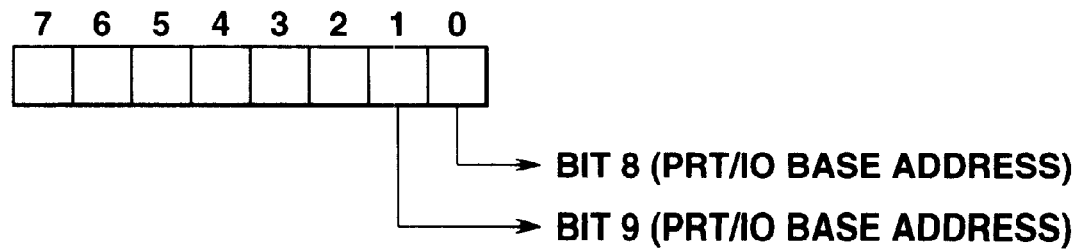

FIGS. 5(*a*)–5(*c*) are diagrams, each illustrating the configuration of a setup register (SET/IO).

In a setup register 2 having an address of 102H, an enable bit for the PRT/IO is provided at bit 0, so that access from the host unit to the pritner port can be allowed only when the enable bit is "1".

Each of setup registers 3 and 4 having addresses of 103H and 104H, respectively, sets base addresses of the PRT/IO, and sets exchange of data of consecutive 8 bytes from the set address between the host unit and the printer unit in the port.

Base addresses can be arbitrarily set within a range of 0000H–03F8H in units of 8 bytes.

FIGS. 6(*a*)–6(*c*) are diagrams, each illustrating the configuration of a printer unit port (PRT/IO).

In the configuration of the printer unit port, from among 8 consecutive bytes from the base address set by the setup register (SET/IO), the first byte constitutes a supervisor command address-register (SVA/IO), and the second byte constitutes a supervisor command data register (SVD/IO), both having the configuration of 8-bit access, and the third and fourth bytes constitute a control I/O command data register (BAT/IO) which is dedicated to 16-bit access.

A supervisor command can perform direct access to the PRT-bus of the printer control unit, and is also called a direct control I/O command.

The SVA/IO sets an access address to the PRT-bus, and arbitrarily sets 8 bits of PA (7:0). The SVD/IO performs data input/output relative to the PRT-bus, and performs an operation using 8 bits of PD (7:0). The BAT/IO performs data input/output relative to a MEM-bus, and performs access using 16 bits of MD (15:0).

Figure 7:
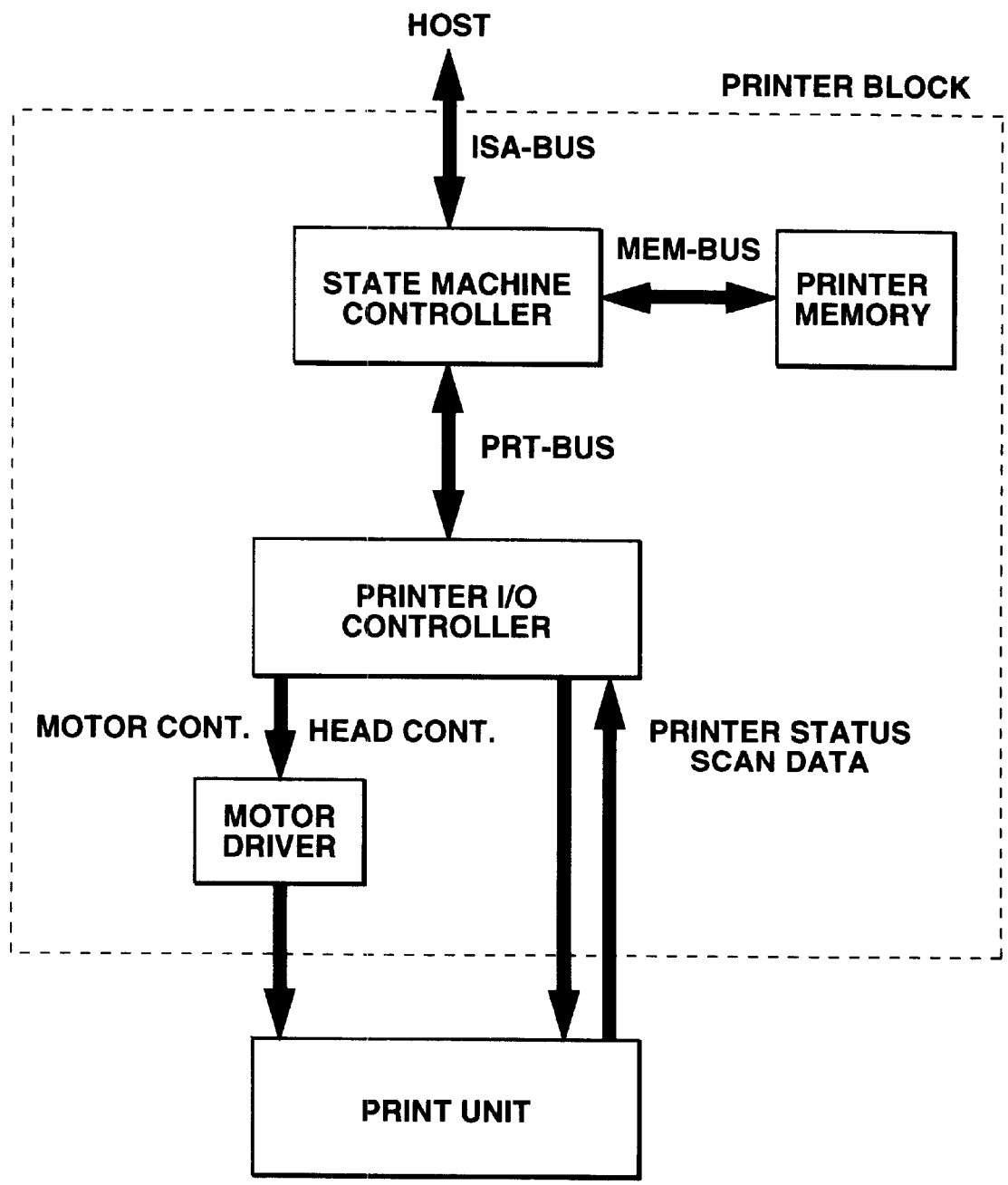
FIG. 7 is a block diagram of a printer control unit.

FIG. 7 is a block diagram illustrating the internal configuration of the printer control unit in the first embodiment.

The main logic of the printer unit is configured by a printer I/O controller which is connected a state machine controller via a printer bus (PRT-bus) and further to the host unit via an ISA-bus, and a printer memory connected to a memory bus (MEM-bus).

A printer-status signal (Printer Status) obtained by reading sensor information from the printer unit is input to an input side of the printer I/O controller connected to the printer unit, and a printing operation is performed by driving the motor and the ink head of the printer unit by a motor-control signal (Motor Cont.) and a head-control signal (Head Cont.), respectively, from the output side based on the information.

In a system in which a scanner head is mounted on the carrier of the printer unit, a scanning operation is performed by writing image data read by the scanner head in the printer memory via the printer I/O controller.

In comparison with the conventional printer control unit shown in FIG. 20, the configuration of the first embodiment has a feature in that a CPU and a ROM are absent at the printer side.

Figure 8:
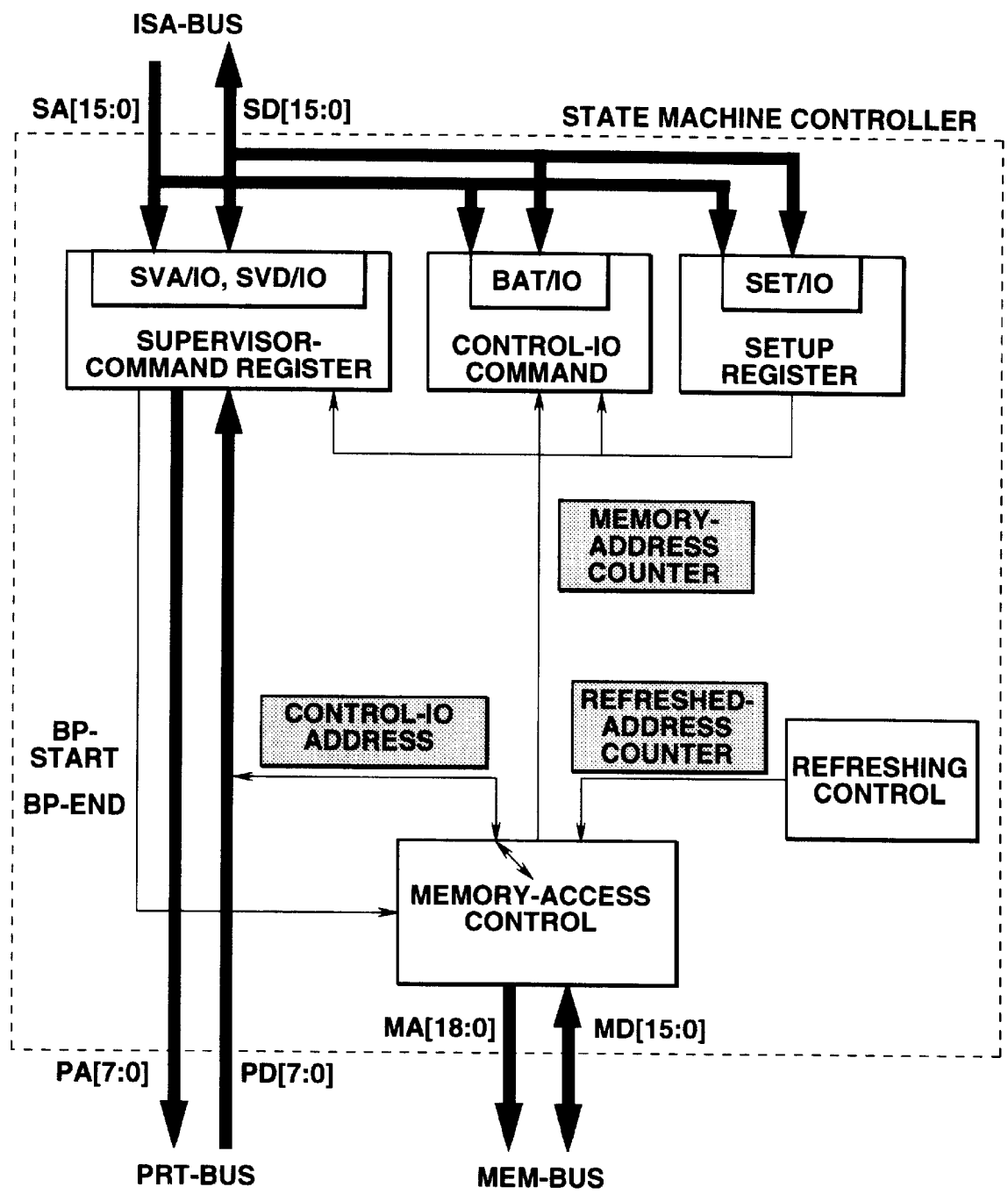
FIG. 8 is a block diagram of a state machine controller.

FIG. 8 is a block diagram illustrating the internal configuration of the state machine controller.

The state machine controller is a control block for controlling the operation of the printer unit via the ISA-bus of the host unit, and can perform accessing by each register of the printer unit port set by the setup register.

A supervisor command register performs an I/O access from the host unit to the printer I/O controller via the PRT-bus, or provides a start/stop command of the control I/O command, and performs read/write of data (PD) relative to the address (PA) of the PRT-bus set by the supervisor command address register (SVA/IO) using the supervisor command data register (SVD/IO).

A control I/O command data register (BAT/IO) is used for performing direct access from the host unit to the printer unit memory via the MEM-bus. When data writing operation is performed with a set of "address+data", two-byte data (MD) is written in the address (MA) of the printer unit memory corresponding to the write address of a memory-address counter, and the write address is incremented by +2 after every writing operation.

A data reading operation using the control I/O command data register is performed in the same manner. That is, two-byte data of the printer unit memory corresponding to the read address is read, the read address is incremented by +2 at every reading operation.

Data written in the memory by the control I/O command data register is used for executing a control I/O command. By writing "1" in BP-start as a start command of the control I/O command by the supervisor command register, data indicated by the read address of the control I/O address counter is read from the printer unit memory by two bytes. The lower-digit byte of the read data indicates the address, and the higher-digit byte of the read data indicates the data. Hence, the control I/O command is executed by outputting the read address and data to the PRT-bus and performing a data write access operation to the register of the printer I/O controller.

The read address read by the execution of the control I/O command is incremented by +2 at every time, and the execution of the control I/O command is repeated until BP-start becomes "0" by providing an end command (Bp-end) of the control-I/O command.

A refreshing control is a control block for performing a refresing operation of the D(dynamic)-RAM, and performs 512 refreshing accesses in 8 ms. A refreshed-address counter increments the address at every refreshing operation. A memory-address control is a control block for performing processing for the printer unit memory while providing each access request with a priority order. Execution of the control-I/O command has the first priority, refleshing has the second priority, and a memory access from the host unit has the third priority. This priority order is provided in order to prevent variations in the execution time period of the control-I/O command.

FIG. 9 is the address map of registers within the state machine controller required when the printer unit executes a supervisor command or a control-I/O command.

From among these registers having addresses 00H–1FH, registers having addresses 00H–0FH, and 18H–1AH are used only for a supervisor command required when executing a control-I/O command, and registers having addresses 10H–15H, and 1CH–1EH are used only for a control-I/O command. Registers having addresses 20 and more perform an access to the printer I/O controller according to a supervisor command or a control I/O command. A detailed description thereof will be provided later.

The function of each of registers having addressess 00H–1FH will now be described. A register having an address 00H is a controller-I/O-command control register (BP-start) for instructing the start of execution of a control-I/O command, and is executed by a write access of a supervisor command. This register always assumes "1" while a control-I/O command is executed. Hence, by reading and confirming if this register assumes "0" by a supervisor command, this register can be used for detecting if the execution of the control I/O command has been completed at the host side.

A register having an address 01H operates as a reset trigger (CRES) for resetting all registers within the system, and is executed by a write access of a supervisor command.

Registers having addresses 08H–0AH are registers for setting a read address (MRA) of the printer memory, and are set by a supervisor command. The values of these registers are incremented by +2 according to reading of memory data from the host unit.

Registers having addresses 0CH–0EH are registers for setting a write address (MWA) from the host unit to the printer memory, and are set by a supervisor command. The values of these registers are incremented by +2 according to writing of memory data from the host unit.

A register having an address 10H operates as a command end trigger (BP-end) for instructing the end of execution of the control-I/O command, and is executed by a control I/O command. A register having an address 12H operates as a register write trigger (REGWR) for performing an operation of writing register data in the memory by a control I/O command, and is executed by a control I/O command.

A register having an address 13H is a register for setting a register address (RWA) when writing register data in the memory by a control I/O command, and is executed by a control I/O command. A register having an address 14H is a register for setting a lower-digit byte (WAITL) of a timer register for performing waiting processing, and is used when inserting waiting processing in units of 0.5 µs during execution of a control I/O command. Waiting processing can be set between 0.5 µs (01H) and 127.5 µs (FFH). A register having an address 15H is a register for setting an upper-digit byte (WAITH) of the timer register for performing waiting processing, and is used when inserting waiting processing in units of 128 µs during execution of a control I/O command. Waiting processing can be set between 128 µs (01H) and 32.640 µs (FFH).

Registers having addresses 18H–1AH are registers for setting an execution read address (BRA) of a control I/O command from the priter memory. After setting of an execution start address of a control I/O command by a supervisor command, the value of each of these registers is incremented by +2 at every reading operation of memory data during execution of a control I/O command.

Registers having addresses 1CH–1EH are registers for setting a write address (BWA) of register data in the printer memory. The value of each of these registers is incremented by +2 by a writing operation of register data in the memory by a register write trigger at the address 13.

FIG. 10 is a timing chart illustrating the operation of control I/O commands.

The cycle of execution of control I/O commands is synchronized with the basic clock signal (CLKPRG) of the program counter, and the control I/O command are executed at a predetermined time interval. In the first embodiment, respective control I/O command are executed in units of 500 ns.

In a state in which a series of control I/O commands are written in the printer memory, when "1" has been written in BP-start by a supervisor command as a starting command, the CLKPRG starts to operate.

The first clock pulse (BRA: #00) represents a case in which the address of the control I/O command read from the MEM-bus is accessed to an ordinary printer I/O controller (having an address 20 or more). In this case, processing of writing data in the PRT-bus for the read address is performed, and the value of the read-address counter (BRA) for the control I/O command is incremented by +2 in synchronization with the rise of the CLKPRG.

The second clock pulse (BRA: #02) represents a case in which the address and data of the control I/O command read from the MEM-bus is not an action to the PRT-bus but is a register write command (address 12H) for performing memory writing processing. In this case, the data of a desired register is written in the memory address (MRA) corresponding to the register write address of the control-I/O-command-address counter. Then, the value of the read-address counter (BRA) for the control I/O command is incremented by +2 in synchronization with the rise of the CLKPRG.

The third clock pulse (#04) represents a case in which the control I/O command read from the MEM-bus is a command-end trigger (BP-end:address 10H). In this case, the status controller detects that the BP-end has been provided in writing processing in an address 1OH of the PRT-bus, the CLKPRG is stopped by setting the BP-start to "0" at the timing of the fall of the next CLKPRG, and the execution of the operation of the control I/O command is completed by incrementing the value of the read-address counter by +2 of the-control I/O command.

Figure 21:
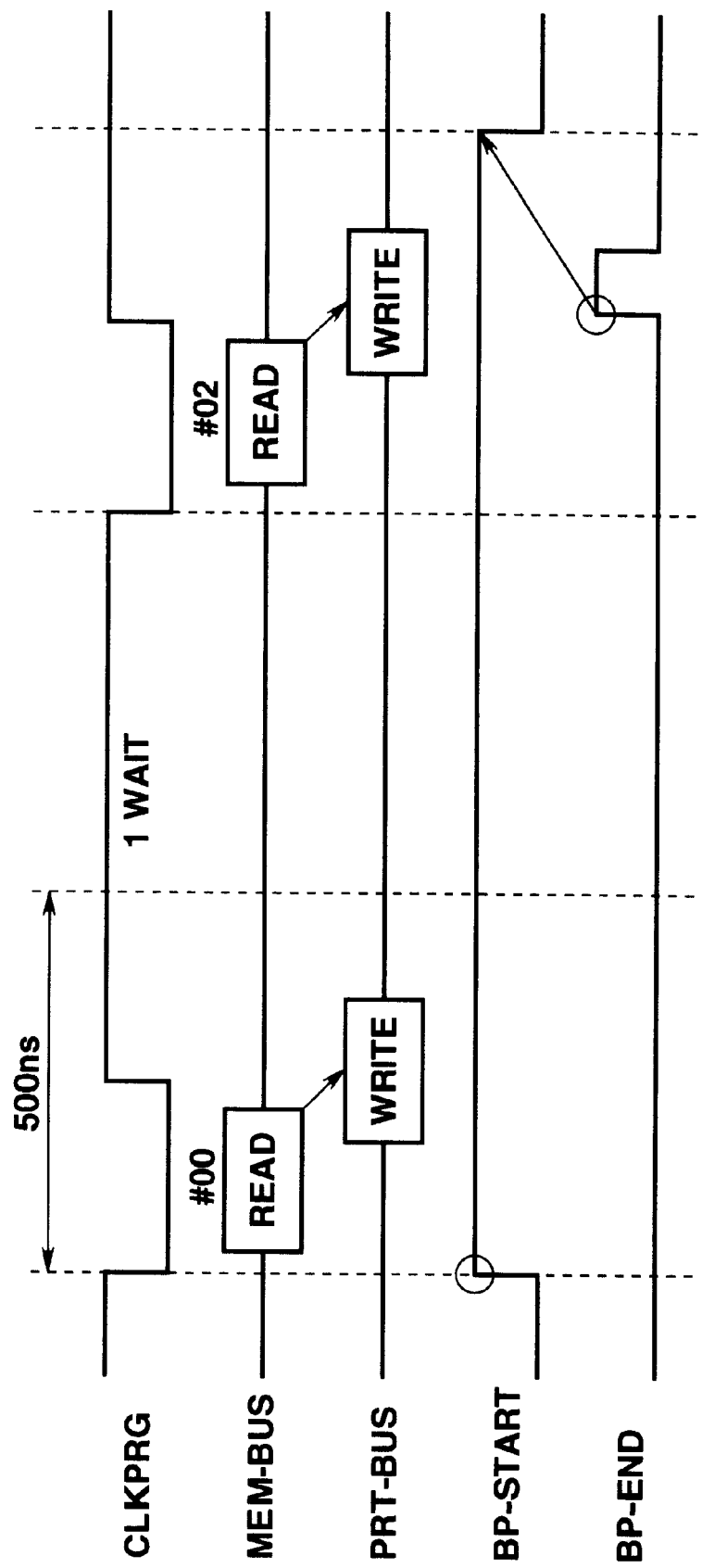
FIG. 21 is a timing chart when executing a waiting command.

FIG. 21 is a timing chart illustrating the operation of a waiting command in control I/O commands.

The first clock pulse (BRA: #00) represents a case in which the control I/O command read from the MEM-bus is a command to write 01H in address 14H, i.e., a waiting command. When 01H has been written in address 14H of the PRT-bus, waiting for one clock pulse of the CLKPRG is performed. After the lapse of 500 ns, the value of the read-address counter (BRA) of the control I/O command is incremented by +2 in synchronization with the rise of the CLKPRG.

The second clock pulse (BRA: #2) after the waiting represents a case in which the control I/O command read from the MEM-bus is a command-end trigger (BP-end:address 10H). The status controller detects that BP-end has been provided in processing of writing data in address 10H of the PRT-bus, the BP-start is set to "0" at the timing of the fall of the next CLKPRG to stop the CLKPRG, and the execution of the operation of the control-I/O command is completed by incrementing the value of the read-address counter for the control I/O command by +2.

Configuration of the Printer Unit

Figure 11:
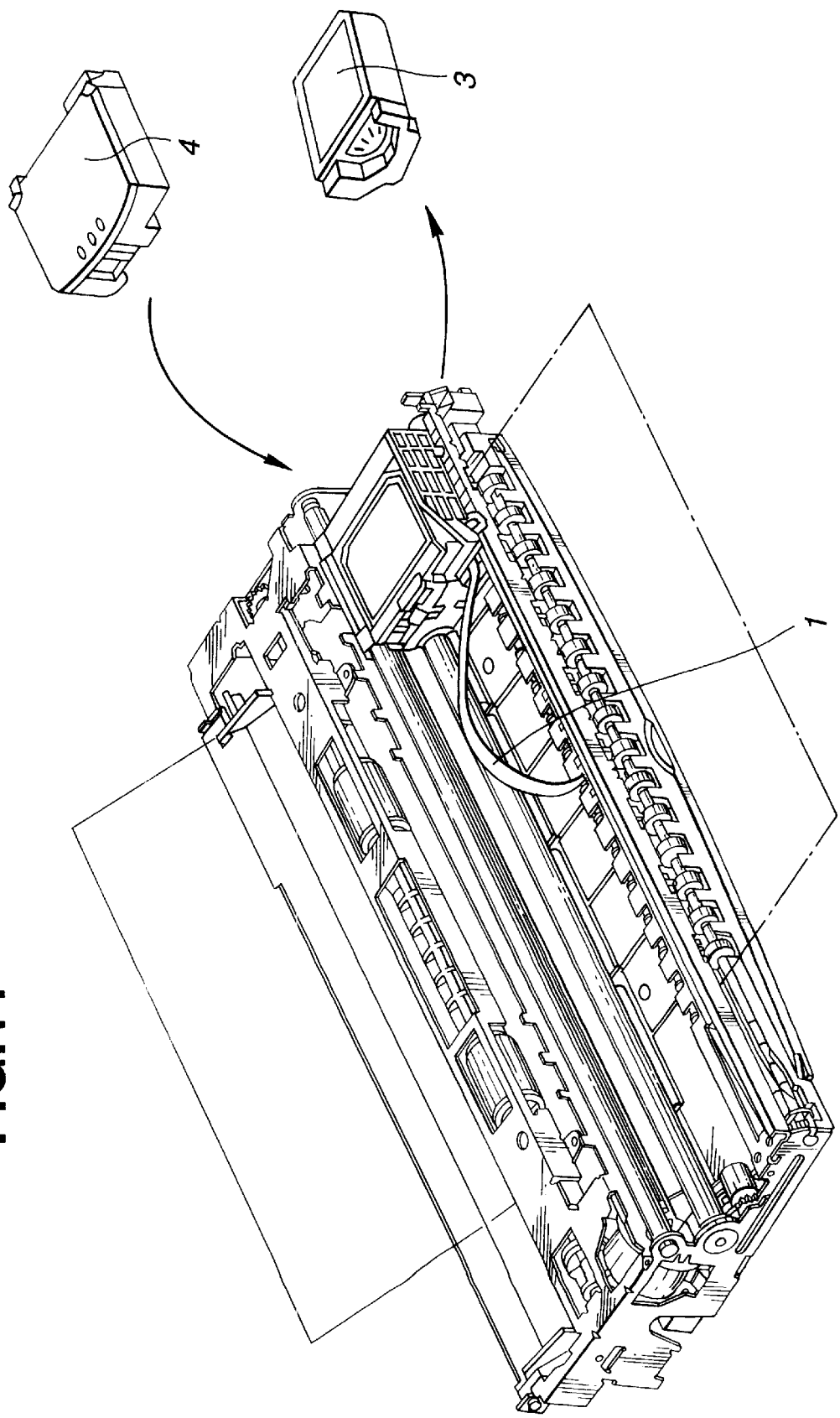
FIG. 11 is a perspective view illustrating a printer unit of the personal computer shown in FIG. 1.
Figure 12:
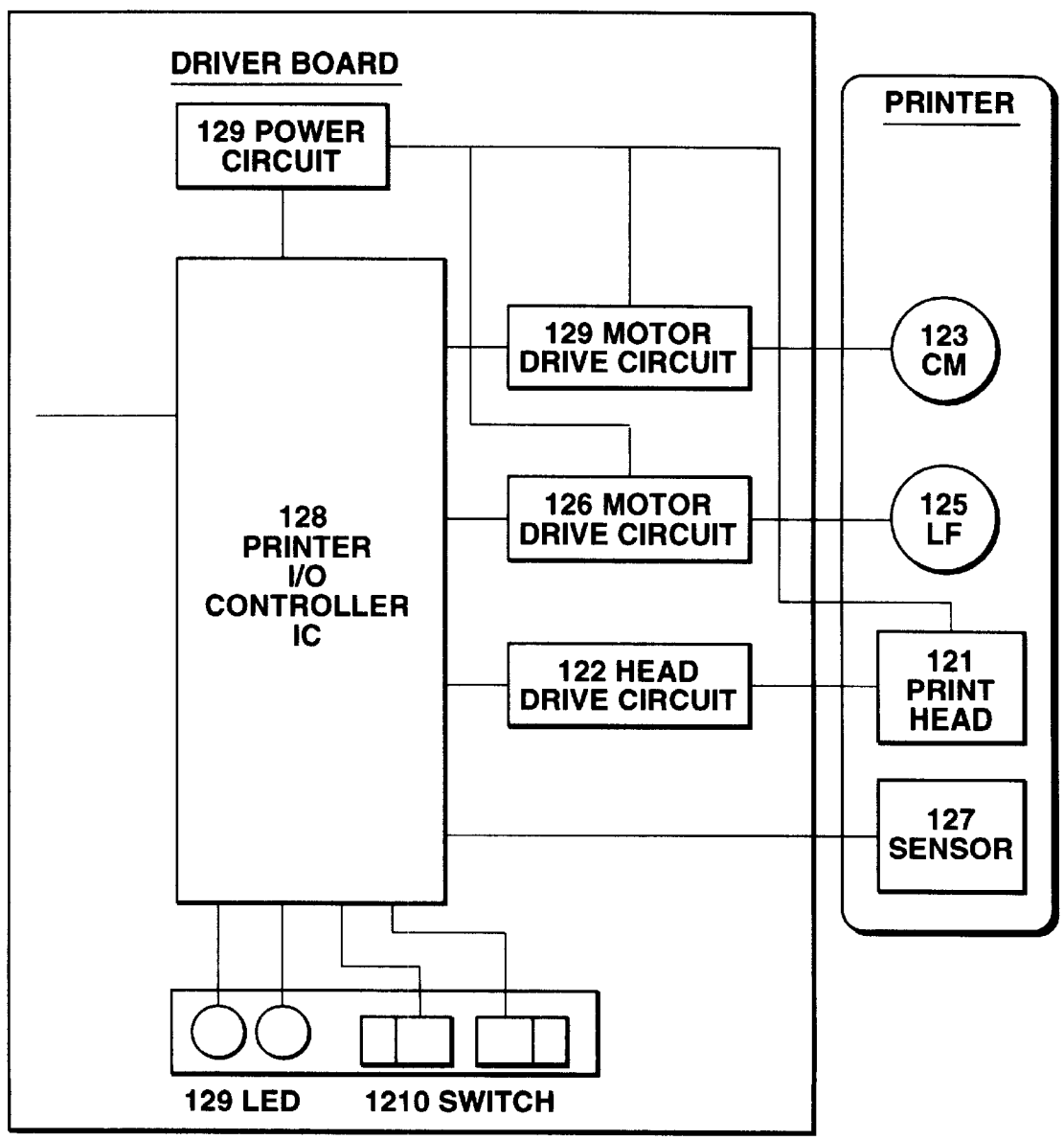
FIG. 12 is a block diagram of a printer control device.

FIG. 11 is a diagram illustrating an external appearance of the printer unit. FIG. 12 illustrates the configuration of an actuator and a driver circuit thereof of the printer.

In FIG. 11, reference numeral 1 represents a main body of the-printer unit. A detachable printing recording head unit 3, and a scanner head unit 4, having the same shape as the printing recording head unit 3, for receiving an image are mountable in a carriage 2 of the printer unit. One of two kinds of printing head units, i.e., a monochromatic printing head unit having 128-dot discharging ports, and a color printing head unit having 136-dot discharging ports, is mountable as the printing recording head unit.

As shown in FIG. 12, the printer grossly includes a recording head 121 and a driving system 122 thereof, a carriage 123 and a driving system 124 thereof, a sheet feeding mechanism 125 and a driving system 126 thereof, and various kinds of sensors 127. A printer I/O controller IC 128 for controlling a printing operation by driving these driving systems is also provided. In addition, a power supply circuit 129, an LED (light-emitting diode) 129 for notifying the user of the status, and a switch 1210 which can be controlled by the user are provided.

Figure 13:
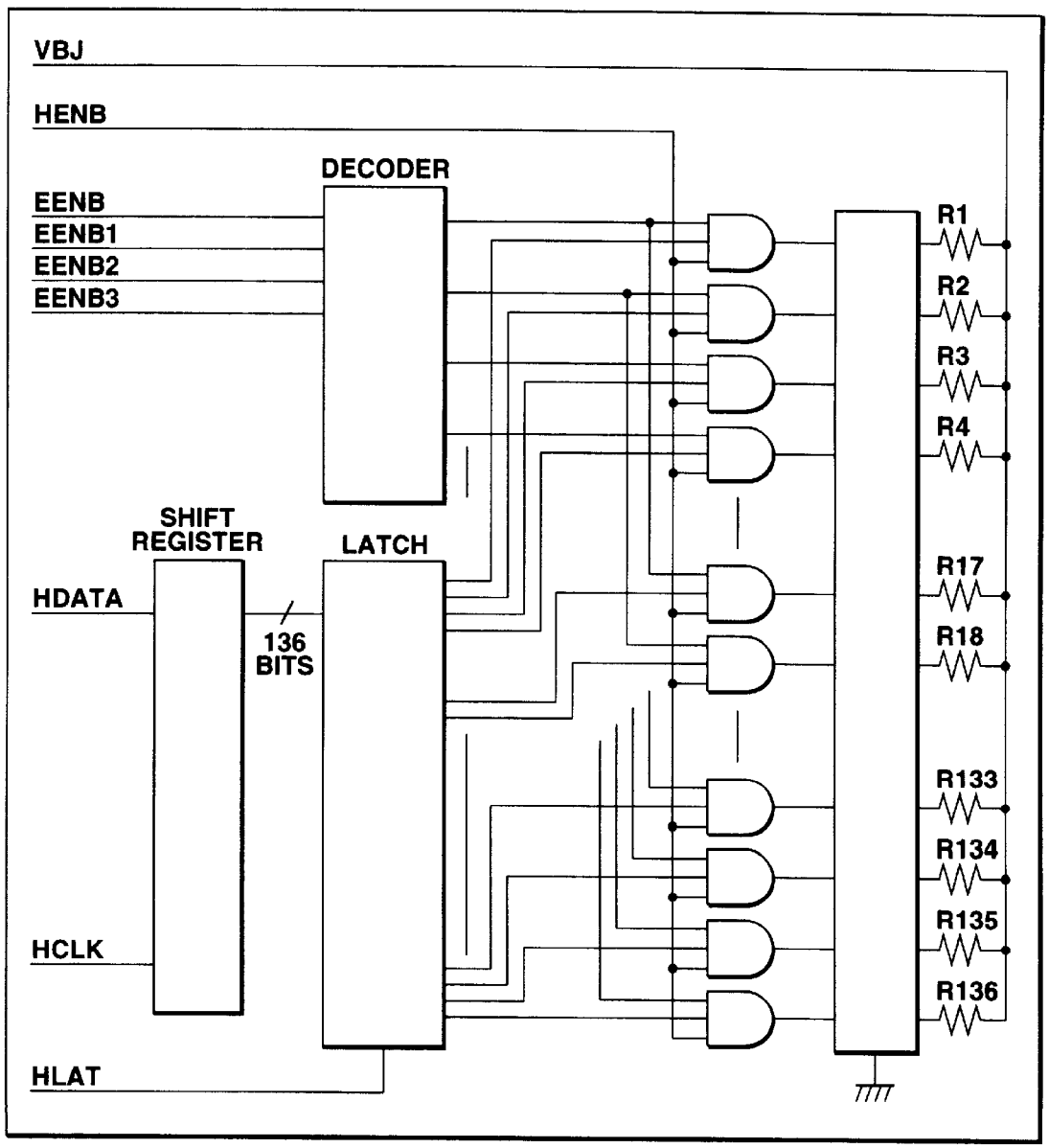
FIG. 13 is a circuit diagram illustrating the internal configuration of a recording head for color printing.

FIG. 13 illustrates the configuration of the recording head and the head driver circuit. Although in the first embodiment, a color printing head unit is described as a printing head unit, the operational principle of a monochromatic printing head unit is basically the same.

In this embodiment, a discharging unit has 136 discharging ports, and #1–#136 represent numbers corresponding to the positions of discharging ports provided in the discharging unit.

R1–R136 are heating resistors, serving as discharging-energy generating elements, provided so as to correspond to the discharging ports #1–#136, respectively. The heating resistors R1–R136 are divided into blocks in units of 16 resistors. The current path is subjected to on/ff control by a common enable signal for each block generated by decoding 4-bit enable signals EEBN, and BENB1–3 (hereinafter termed "block enable signals") output form the printer I/O controller IC.

A segment enable signal, for performing on/off control of the current path of the resistor at a position corresponding to data in accordance with discharging data serially transmitted from the printer I/O controller IC to the recording head via a signal line HDATA in synchronization with a tranfer clock signal HCLK, and latched at a predetermined timing in a data latch within the head after serial-parallel conversion, is connected to each of the heating resistors. The current path of a heating resistor is turned on, i.e., a heating state is provided, when both of the block enable signal and the segment enable signal are in an enable state.

A control signal HENB (heat enable) for controlling the timing of a pulse for heating the selected resistor is connected to each of the heating resistors. Heating by current supply of each of the heating resistors R1–R136 is performed in accordance with a heating pulse determined in the above-described manner.

Figure 14:
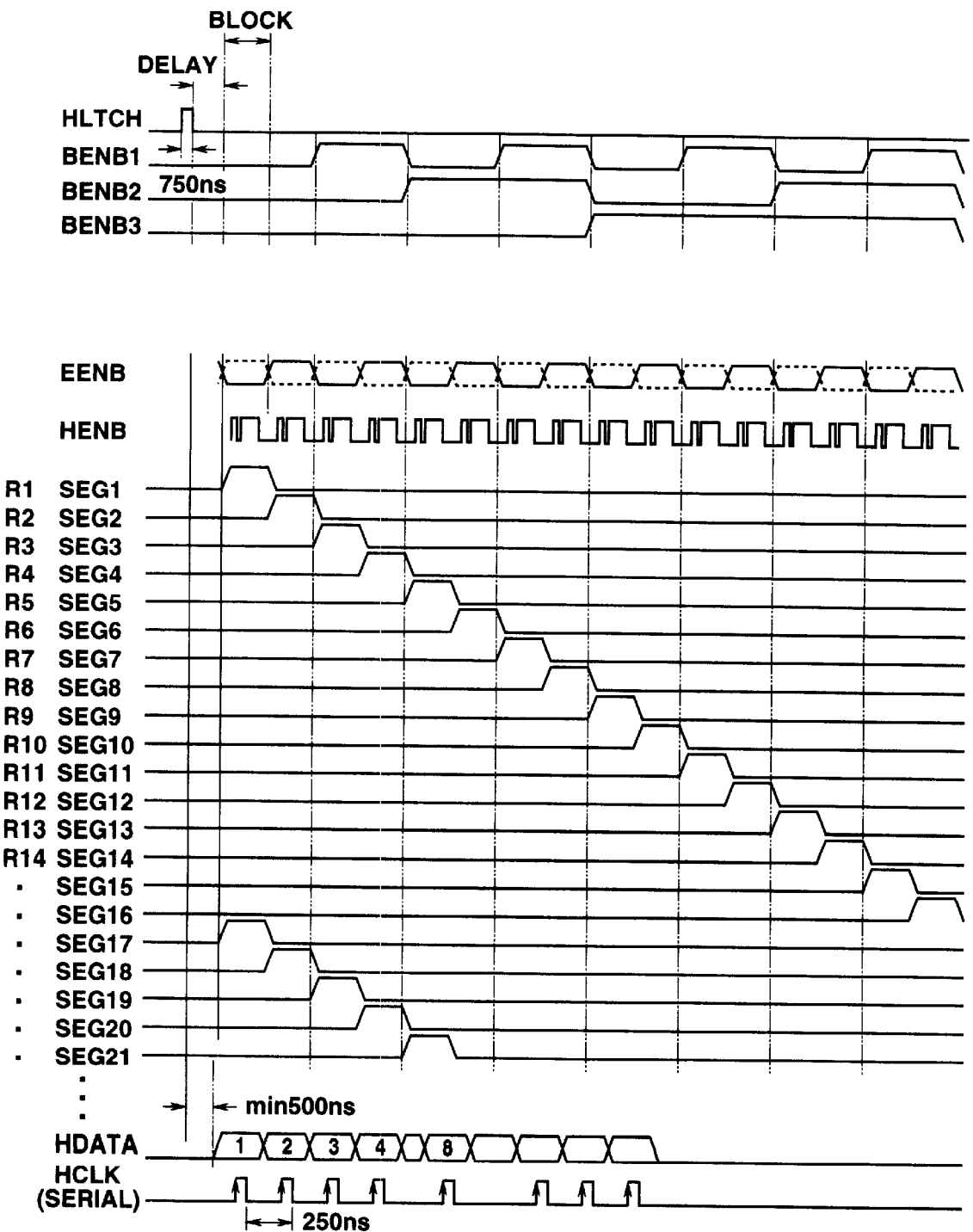
FIG. 14 is a timing chart for controlling the recording head.

FIG. 14 is a timing chart for head driving in the above-described configuration. A common enable signal is sequentially turned on in accordance with the input of a block enable signal at a position in the head scanning direction. A corresponding block becomes in a current-supply state by being selected by turning-on of the common enable signal. Currents are supplied to heating resistors within the selected block, which are selected by making segment signals to be in enable/disable states in accordance with transferred image data, at a given pulse timing, and ink is discharged in accordance with heating to perform dot recording.

Figure 15:
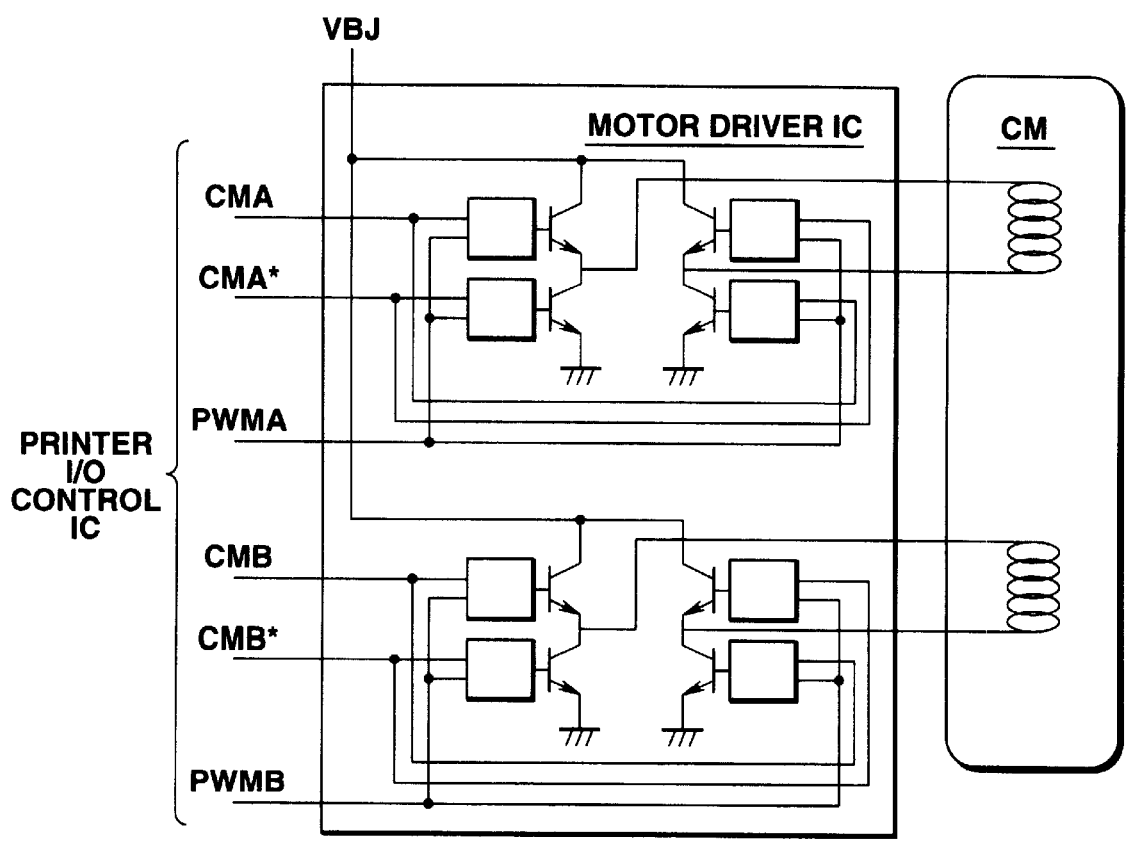
FIG. 15 is diagram illustrating the configuration of a a circuit for controlling a carriage motor.
Figure 16:
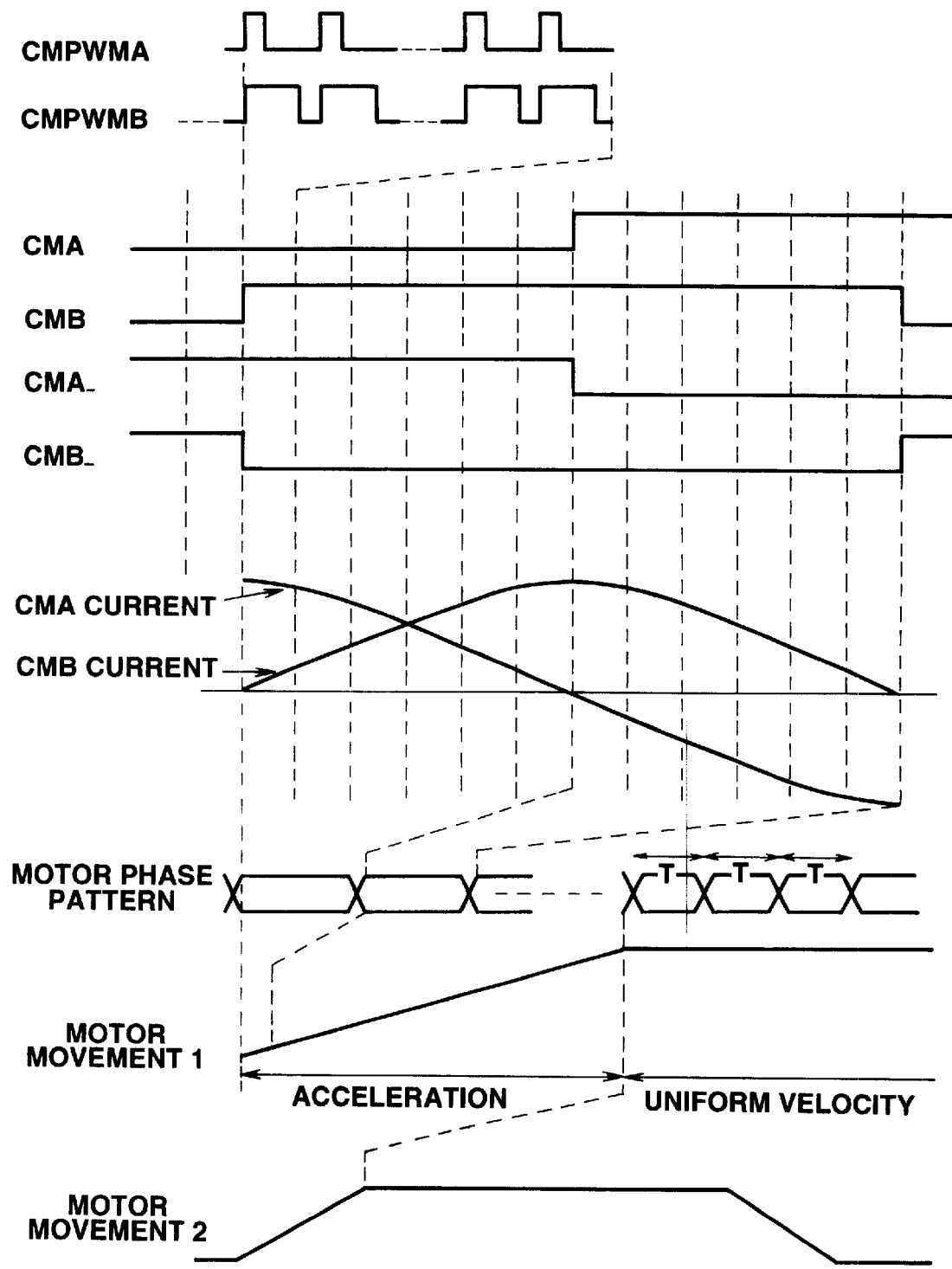
FIG. 16 is a timing chart for controlling the carriage motor.

FIG. 15 is a diagram illustrating the configuration of a carriage motor and a motor driver for performing a scanning operation of a carriage mounting the head. FIG. 16 illustrates driving timings for these components.

In the first embodiment, a stepping motor having coils $\phi1$–$\phi4$ is used as the carriage motor, which is driven by the motor driver providing driving signals CMa, CMa_, CMb and CMb_, and current cotrol signals PWMA and PWMB. A line feeding motor having a sheet feeding function has a similar configuration, and is driven by driving signals LFa, LFa_, LFb and LFb_.

In the first embodiment, a home-position sensor for detecting that the carriage is placed at a predetermined position at the left end of the scanning range, and a sheet sensor for detecting a sheet, serving as recording material, are provided for providing a sensor function, and printer control based on sensor information is performed. Information relating to the temperature of the system, and the driving voltage for the motor are detectable via an A/D conversion function (to be described later).

The printer includes a printing stopping/resuming switch which can be operated by the user, and a line feeding switch for executing sheet feeding for a determined number of lines according to one depressing operation.

A power supply unit of the printer supplies electric power to respective actuators of the printer. The printer I/O controller IC performs on/off control of a power supply for driving the motor, a logic power supply for driving the head, and a driving voltage for the heating resistors for discharging ink (hereinafter termed a head-driving power supply).

Configuration of the Printer I/O Control IC

Figure 17:
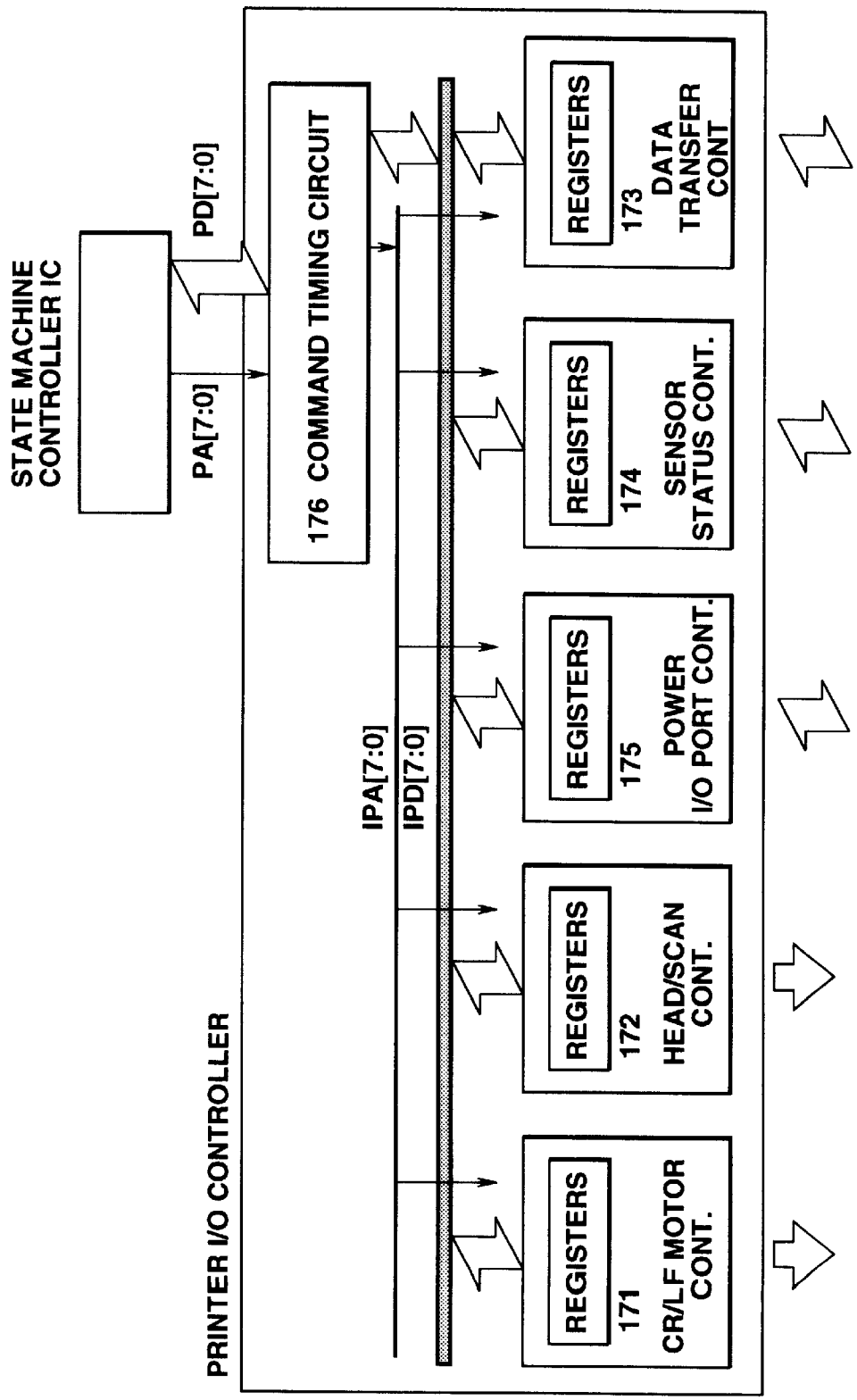
FIG. 17 is a block diagram of a printer I/O controller IC (integrated circuit)

FIG. 17 is a block diagram of the printer I/O controller IC. This IC performs printer control based on given control I/O commands. As shown in FIG. 17, the controller IC includes a motor control block 171, a recording-head control block 172, a data transfer block 173, a sensor status block 174, a power I/O port block 175, and a control-I/O-command-timing control circuit 176. This IC is connected to the state machine controller via an address bus PA(7:0) and a data bus PD (7:0), which are called printer buses, according to a timing control signal. Each of the control blocks has the following function, and is basically configured by a group of input registers for storing control I/O commands and a control circuit. FIG. 18 illustrates a register map of the controller IC. In the following description, the name of each register is expressed using a corresponding address in the table.

Control-I/O-command-executing-timing Control Circuit

The printer buses PA(7:0) and PD (7:0) connected to the printer-I/O controller IC are connected to the control-I/O-command-executing-timing control circuit. The printer buses are connected to a group of registers of each of the control blocks via this circuit as a register address bus IPA (7:0) and a register data bus IPD (7:0).

Figure 19:
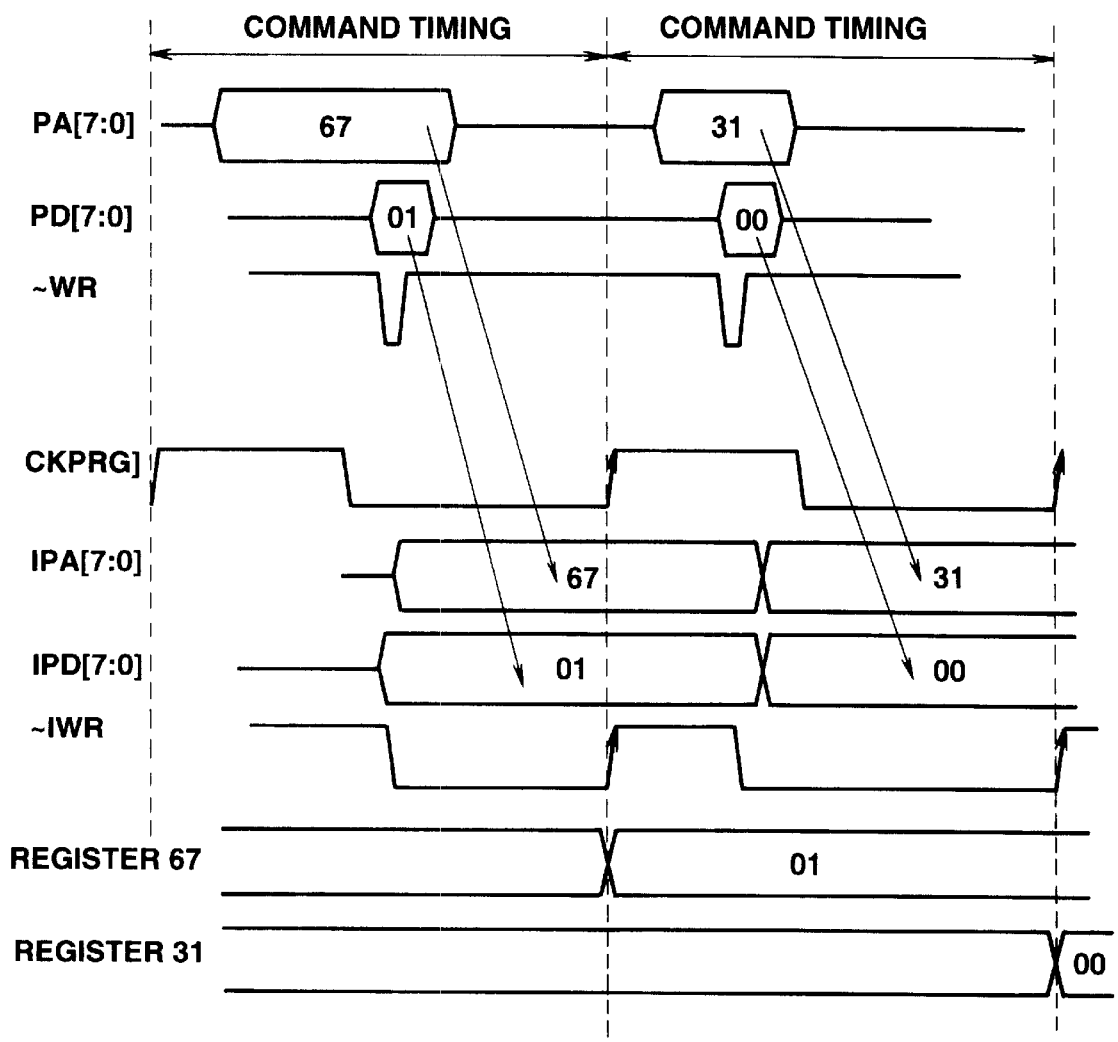
FIG. 19 is a timing chart for a control-I/O-command-execution-timing control circuit of the printer I/O controller IC.
Figure 22:
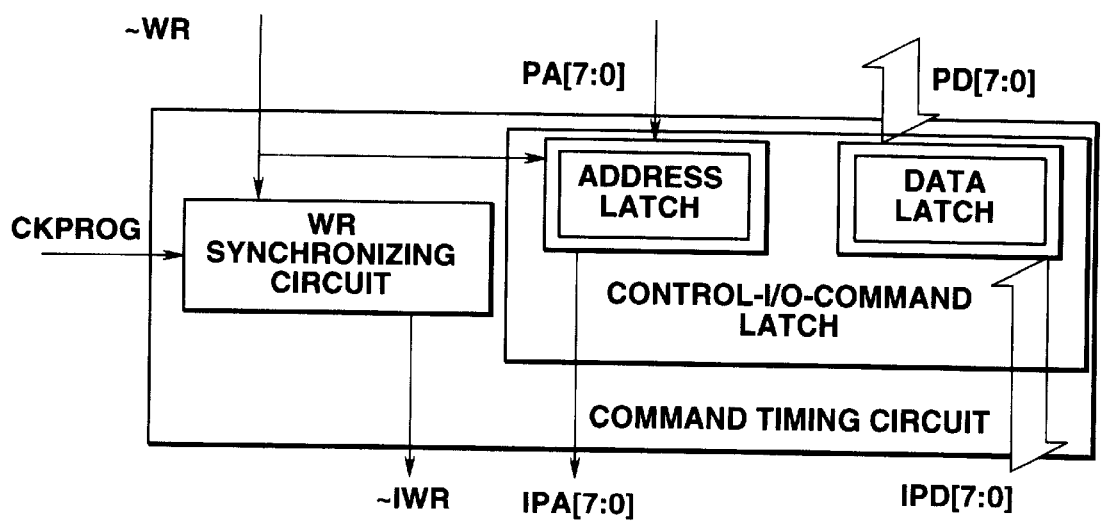
FIG. 22 is a diagram illustrating the configuration of the control-I/O-execution-timing control circuit of the printer I/O controller IC.

This circuit holds, when each control-I/O command divided into a register address and register data by the state machine controller IC is transmitted via the printer bus, the register address and data within the circuit, and controls the function of unifying the time period to execute the control I/O command from reading to execution of the control I/O command in processing of consecutive control I/O commands by making the timing to store the data in a resister assigned by an address within the printer controller, i.e., by making the timing to start execution of the control I/O command, to be constant. More specifically, the data of the printer bus is latched by a control-I/O-command latch provided as holding means, and the data is stored in a corresponding register at a timing synchronized with the rising edge of a command execution reference clock signal CKPRG. The data latched in the register address bus and the register data bus at this timing are output as write signals using a write control signal ~IWR. FIG. 22 illustrates the configuration of this circuit. FIG. 19 illustrates timings in this circuit.

In FIG. 19, data are written in registers 67h and 31h at different timings via the PA and PD buses. The timing signal ~IWR written in a corresponding register is always output at a timing synchronized with the CKPRG.

Carriage Motor (CM)/line Feeding Motor (LF) Control Block

This block controls four driving phase signals for performing 4-phase 2-excitation driving of each of stepping motors CM and LF having coils $\phi1$–$\phi4$ and two PWM output signals for performing current control. The output of a phase signal is controlled by shift trigger of setting a phase shift output pattern by registers 66h and 76h, and then accessing the registers 67h and 77h. A PWM output based on the set value is performed by shift trigger of storing a set value of PWM in registers 64h, 65h, 74h and 75h, and accessing the registers 67h and 77h.

Recording-head Control (Heat Scanning) Block

This block controls discharge of the recording head when the print head or the scanner head is mounted on the printer.

Registers 34h–38h are registers for setting a heating mode, and controls, for example, switching between resetting, printing and scanning operations of the head and sets various kinds of options when performing a heating operation. Registers 3Ah–3Fh are registers for setting a scanning mode, and sets an option when performing a scanning operation, and control of transmission of control I/O commands to the scanning head.

Registers 40h–4Bh are a group of registers for setting a timing of heating pulses, serving as the output of a heat enable signal. A part of the above-described registers for settng a pulse timing are also used for setting of a timing during a scanning operation.

When a heating/scanning trigger control I/O command is recognized by writing of data 01H in the register 31h, discharge control for one column for the recording head is started, and heating/scanning control based on the set value of the register is performed.

Data Transfer Block

This block has the function of performing parallel-serial conversion of predetermined data and transmitting the obtained data from the controller to the head as discharging data in synchronization with a serial transfer clock signal during recording-head control processing. When 1-byte discharging data has been stored in 8-bit register 32h, a transfer operation is performed.

When a scanner control mode is assigned by setting of register 34h, scanned image data serially transmitted from the scanner unit together with a transfer clock signal is subjected to serial-parallel conversion, and is then stored in registers 3A and 3B as 16-bit data.

Sensor Status Block

This block makes the level of a sensor provided in the printer driving circuit to be readable as register information. This information is stored in register 24h. A signal which is an analog output/input of the sensor and is connected to an A/D input terminal is subjected to A/D conversion by this block by accessing an A/D conversion trigger bit of register 27h and is then stored in register 2C as digital data. Control corresponding to the state of the printer can be performed by performing feedback of the sensor information.

Power I/O Port Block

This block controls the power supply for printer driving. More specifically, the power supply for motor driving, the logic power supply for head driving, and the driving voltage for the heating resistors for discharging ink (hereinafter termed a "head driving power supply") are controlled by setting register 26h. The input/output port, comprising switches for start/stop of the printer and for line feeding, LED for displaying the status, and the like, is controlled using registers 20h, 21h, 28h and 29h.

A description will now be provided of the configuration of control I/O commands for driving the printer with reference to FIGS. 23–29.

In the first embodiment, bipolar stepping motors are used as the carriage motor and the line feeding motor, which are subjected to microstep driving by PWM (pulse-width modulation) according to a constant-current chopper method (driven by being divided into six portions per phase).

Since the number of revolutions of the carriage motor during a carrige initializing operation is within a self starting region (300 pps (pulses per second)), uniform-revolution driving is performed.

The number of revolutions (766 pps) of each motor during a printing operation and a carriage returing operation is higher than that in the stepping motor's self stating region. Hence, in order to provide a printing (carriage returning) speed, it is necessary to gradually reduce (acceleration) the phase switching time period, to drive the motor with the final phase switching time period of the acceleration during a uniform-revolution region, and to gradually increase (deceleration) the phase switching time period until the motor is stopped, driving of the motor is performed grossly in three portions, i.e., an acceleration operation portion, a uniform-revolution portion and a deceleration-operation portion.

Figure 23:
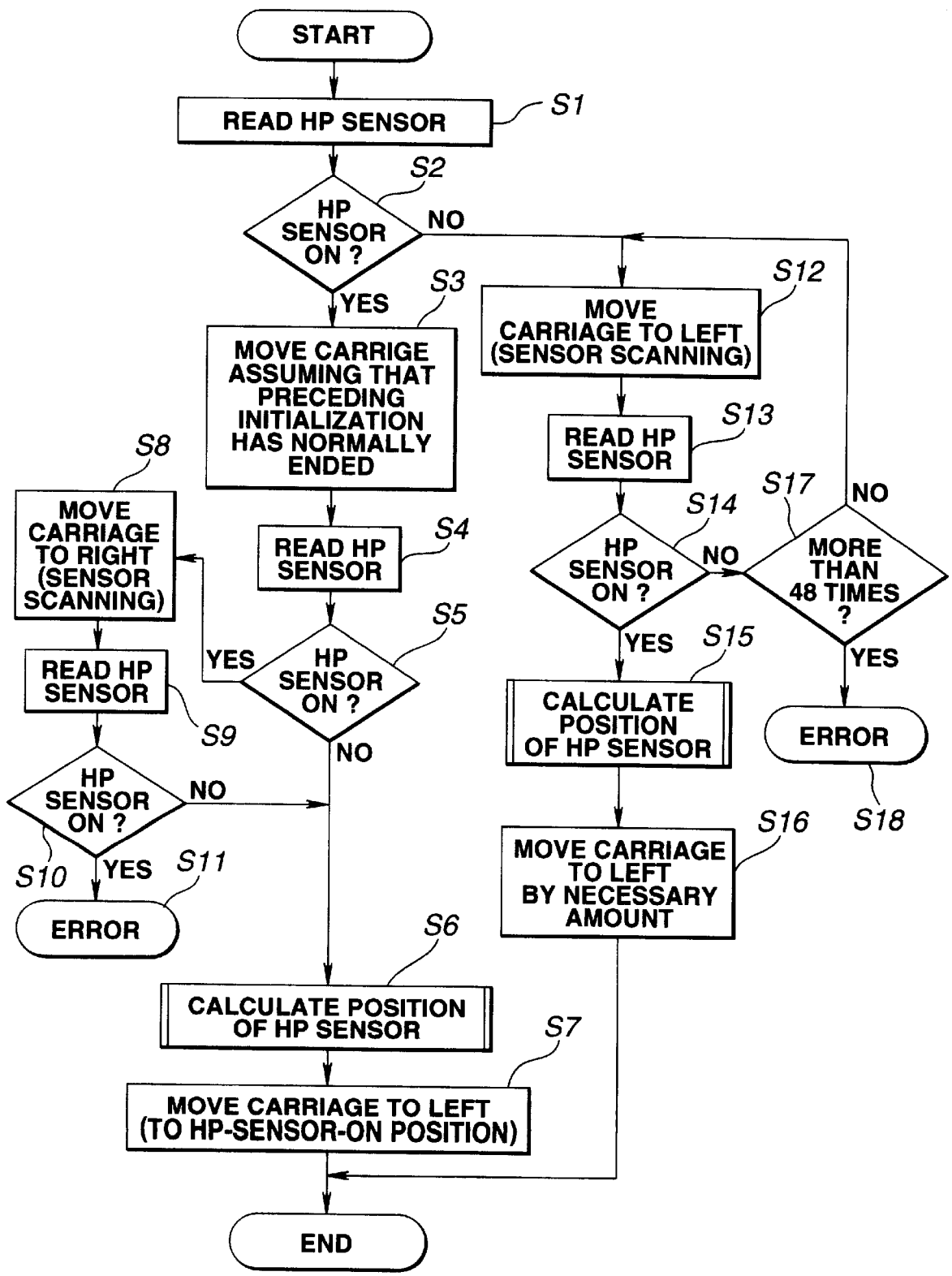
FIG. 23 is a flowchart when initializing a printer.

FIG. 23 is a flowchart illustrating a carriage initializing operation (home-position detecting-operation) for the actual printer. In the system of this embodiment, in constrast to the case of a conventional printer, it is impossible to monitor the changing state of a sensor while operating an actuator, such as a carriage motor or the like, and to change control I/O commands for the operating actuator according to changes in the state. Hence, the following configuration is adopted. That is, in step S1 of FIG. 23, the. state of an HP (home position) sensor is read using a supervisor command. In step S2, the state of the HP sensor is determined from the read value. If the HP sensor is ON as the result of the determination in step S2, it is determined that the preceding initialization has been normally ended (the carriage is at an initialized position), and the process proceeds to step S3, where the carriage is moved by 120 pulses to the right (toward a printing direction from the carriage-initialized position) while dumping sensor information in a buffer storage at every pulse. Then, in step S4, the state of the HP sensor after the carriage has stopped is again read using a supervisor command. In step S5, the state of the HP sensor is determined from the value read in step S4. If the HP sensor is OFF as the result of the determination in step S5, the process proceeds to step S6, where the position where the HP sensor has changed from ON to OFF from the sensor information dumped in the buffer storage at every pulse is determined. In step S7, the carriage is moved to the left (toward the carriage-initialized position from the printing position) making a position corresponding to 54 pulses from the position of the switching in the direction of ON to be the initialized position, and initialization is terminated. If the HP sensor is ON as the result of the determination in step S5, it indicates that the preceding initialization has not been completed and the carriage is probably present to the left of the initialized position. Hence, the process proceeds to step S8, where the carriage is further moved to the right by 120 pulses (while dumping sensor information in the buffer storage at every pulse). In step S9, the state of the HP sensor after the carriage has stopped is again read using a supervisor command. In step S10, the state of the HP sensor is determined from the value read in step S9. If the HP sensor is OFF as the result of the determination in step S10, the process proceeds to step S6 and then to step S7, and the initialization is termined as described above. If the HP sensor is OFF as the result of the determination in step S10, the possibility that the sensor is broken or the carriage does not physically operate is high. Hence, the process proceeds to step S11, where an error is announced.

If the HP state is OFF as the result of the determination in step S2, it indicates that the preceding initialization has not been normally completed, and the carriage is present in the vicinity of the printing position. Hence, the process proceeds to step S12, where the carriage is moved to the left (toward the carriage-initialized position from the printing position) by 10 pulses while dumping sensor information in the buffer storage at every pulse. Then, in step S13, the state of the HP sensor after the carriage has stopped is read using a supervisor command. In step S14, the state of the HP sensor is determined from the value read in step S13. If the HP sensor is OFF as the result of the determination in step S14, the process proceeds to step S15, where the position where the HP sensor has switched from OFF to ON from the sensor information dumped in the buffer storage at every pulse is determined. In step S18, the carrige is moved to the left to the initialized position (a position corresponding to 54 pulses in the direction of ON from the position where the HP sensor has switched from OFF to ON) by an insufficient amount.

If the HP sensor is ON as the result of the determination in step S14, the process proceeds to step S17, where the number of scanning operations toward the left is checked. If the number is equal to or less than 48, the process returns to step S12, and the above-described processing is repeated. If the number exceeds 48, there is the possibility that the sensor is broken or the carriage does not physically operate because the length between the right wall and the left wall corresponds to 480 pulses in this printer. Hence, the process proceeds to step S18, where an error is announced.

FIG. 24 illustrates a group of carriage-motor-driving control I/O commands when actually operating the carrige during the above-described initializing operation. Control I/O commands start from the line of initial setting, and proceed from the left to the right, and from an upper line to a lower line (6B01, 6101, 6901, 6401, 6528, 1200, 1508, 1455, 6406, . . . ).

Each of the control-I/O commands is configured by address data, deals with two bytes as one group, and is expressed by a hexadecimal notation (for example, control-I/O command 6B01 writes data 01h in address 6Bh).

If the operational speed (phase switching time period) during initialization of the carrige (the home-position detection operation) is 300 pps, the switching time period per phase is 3.3333 msec=3,333 μsec, and the switching time period per 1/6 phase is 555 μsec. If the basic unit of a waiting-timer control I/O command is 0.5 μsec and 64 μsec, 645 μsec×8+0.5=512.5 μsec, 0.5 μsec×85+0.5=43 μsec, and 512.5+μsec=555.5 μsec. Hence, waiting-timer control I/O commands become WAITH (units of 64 μsec) 1508 H, and WAITL (units of 0.5 μsec)=1455 H.

Actually, however, since a time period of about 0.5 μsec is required for processing each control I/O command other than the waiting-timer control I/O command, it is necessary to set the value of the wating-timer control I/O command by taking into consideration of control I/O commands other than the waiting-timer control I/O command in order to perform exact time control.

In this description, for the sake of convenience, processing time periods other than the processing time period of the waiting-timer-control-I/O command are not taken into consideration. Actually, the time period is again calculated in consideration of the processing time periods of other control I/O commands when providing a group of control I/O commands.

The uniform-revolution portion is realized basically by repeating processing from the second line to the 13th line by a number of necessary pulses. The processing from the second line to the 13th line is made to be one period because a table of changes in current of microstep driving by PWM provides one period for pulses corresponding to two phases of the motor.

The contents of each of the control I/O commands will now be described. Initial setting in the first line comprises setting of the direction of revolution of the carriage motor before an operation (01 in the case of movement of the carriage to the right (00 in the case of the movement to the left)) (6B01), a control I/O command for setting of a register address for instructing the contents to be dumped in the buffer storage (the contents of sensor port (24H)) (1324), and a carriage motor PWM currrent ON control-I/O command (6101).

The second line comprises a control I/O command for the first phase sihft (excitation of the phase next to the starting phase (6901), a carriage motor PWM current (A phase) writing control I/O command (6401), a carriage motor PWM current (B phase) writing control I/O command (6528), a register write trigger control I/O command for dumping sensor information (1200), a waiting timer control I/O command H for realizing an operational speed of 300 pps (a switching time period per 1/6 phase of 555 μsec) (in units of 64 μsec) (1508), and a waiting timer control I/O command L (in units of 0.5 μsec) (1455).

The third line comprises a carrige motor PWM current (A phase) writing control-I/O command at a position advanced by 1/6 phase from the starting phase (6406), a carrige motor PWM current (B phase) writing control I/O command (6526), a register write trigger control I/O command for dumping sensor information (1200), a waiting timer control I/O command H for realizing an operational speed of 300 pps (with a switching time period per 1/6 phase of 555 μsec) (in units of 64 μsec) (1508), and a waiting timer control I/O command L (in units of 0.5 μsec) (1455).

Similarly, the fourth line, the fifth line, the sixth line and the seventh line represent control I/O commands at positions advanced from the starting phase by 2/6 phase, 3/6 phase, 4/6 phase and 5/6 phase, respectively.

Basically, in the third through seventh lines, the contents of processing are the same, and only a current value written in A phase/B phase of the carriage motor PWM current sinusoidally changes in order to realize microstepping. Actually, the current flow is directional both in A phase and B phase. In this case, however, only the absolute value of the current is written, and the direction of the current does not have a negative value because the direction is changed at the driver side.

The eighth line represents a position advanced from the staring phase by 6/6 phase, i.e., the phase next to the starting phase. Hence, it comprises a control I/O command for a phase shift (excitation of the phase next but one from the starting phase) (6901), a carriage motor PWM current (A phase) writing control I/O command (6401), a carriage motor PWM current (B phase) writing control I/O command (6528), a register trigger control I/O command for dumping sensor information (1200), a waiting timer control I/O command H for realizing an operational speed of 300 pps (a switching time period per 1/6 phase of 555 μsec) (in units of 64 μsec) (1508), and a waiting timer control I/O command L (in units of 0.5 μsec) (1455).

FIGS. 25–29 illustrate groups of contol I/O commands when actually performing a one-way printing operation (a carriage returning operation) and a sheet feeding operation (line feeding) sequentially.

FIGS. 25–27 illustrate groups of control I/O commands during a one-way printing operation (a carriage returning operation). The number of revolutions of the carriage motor during a printing operation is 813 pps, which is higher than the value in the self starting region of an ordinary stepping motor. Hence, acceleration and deceleration operations are required. The operation of the motor grossly comprises three portions, i.e., an acceleration-operation portion, a uniform-revolution portion (including a printing operation), and a deceleration-operation portion.

FIG. 25 represents an acceleration portion during a one-way printing operation (a carrige returing operation). Control I/O commands start from the line of initial setting, and proceed from the left to the right, and from an upper line to a lower line (6B01, 6101, 6401, 6528, 159C, 1400, 6901, . . . ).

Initial setting in the first line comprises setting of the direction of revolution of the carriage motor before an operation (01 in the case of movement of the carriage to the right (00 in the case of the movement to the left)) (6B01), and a carriage motor PWM currrent ON control I/O command (6101).

The second line comprises a carriage motor PWM current (A phase) writing control I/O command for exciting a starting phase (6401), a carriage motor PWM current (B phase) writing control I/O command (6528), a waiting timer control I/O command H for setting an exciting (holding) time period for the starting phase (in units of 64 μsec) (159C), and a waiting timer control I/O command L (in units of 0.5 μsec) (1400).

The third line comprises a control I/O command for the first phase shift (excitation of the phase next to the starting phase) (6901), a carriage motor PWM current (A phase) writing control I/O command (6401), a carriage motor PWM current (B phase) writing control I/O command (6528), a waiting timer control I/O command H for realizing an acceleration operation (in units of 64 μsec) (1519), and a waiting timer control I/O command L (in units of 0.5 μsec) (14D3).

The fourth line comprises a carrige motor PWM current (A phase) writing control I/O command at a position advanced from the starting phase by 1/6 phase (6406), a carrige motor PWM current (B phase) writing control I/O command (6526), a waiting timer control I/O command H for realizing an acceleration operation (in units of 64 μsec) (1518), and a waiting timer control I/O command L (in units of 0.5 μsec) (14B3).

Similarly, the fifth line, the sixth line, the seventh line and the eighth line represent control I/O commands at positions advanced from the starting phase by 2/6 phase, 3/6 phase, 4/6 phase and 5/6 phase, respectively.

Basically, in the fourth through eighth lines, the contents of processing are the same, and only a current value written in A phase/B phase of the carriage motor PWM current sinusoidally changes in order to realize microstepping. In addition, the set value of the waiting timer control I/O command gradually decreases for realizing an acceleration operation.

In an ordinary acceleration operation, the time interval is gradually reduced at a timing of phase switching. In the first embodiment, however, since microstep control is performed, it is necessary to gradually change the time period even within the same phase (changed, for example, even within the range of acceleration 1-1-1-6).

Actually, the current flow is directional both in A phase and B phase. In this case, however, only the absolute value of the current is written, and the direction of the current does not have a negative value because the direction is changed at the driver side.

The ninth line represents a position advanced from the staring phase by 6/6 phase, i.e., the phase next to the starting phase. Hence, it comprises a control I/O command for a phase shift (excitation of the phase next but one from the starting phase) (6901), a carriage motor PWM current (A phase) writing control I/O command (6428), a carriage motor PWM current (B phase) writing control I/O command (6501), a waiting timer control I/O command H for realizing an acceleration operation (in units of 64 μsec) (150F), and a waiting timer control I/O command L (in units of 0.5 μsec) (14ED).

In the first embodiment, the acceleration operation is repeated for 22 steps in the same manner. When the acceleration operation has been completed, a uniform-revolution portion is executed.

FIG. 26 illustrates a uniform-revolution portion during a one-way printing operation.

The first line comprises a control I/O command for the first phase shift (excitation of the phase next to the uniform-revolution-operation starting phase) (6901), a carriage motor PWM current (A phase) writing control I/O command (6401), a carriage motor PWM current (B phase) writing control I/O command (6528), a waiting timer control I/O command H for realizing a uniform revolution of 813 pps (with a switching time period per 1/6 phase of 205 μsec) (in units of 64 μsec) (1508), and a waiting timer control I/O command L (in units of 0.5 μsec) (1433).

The second line comprises a carrige motor PWM current (A phase) writing control I/O command at a position advanced from the starting phase by 1/6 phase (6406), a carrige motor 1PWM current (B phase) writing control I/O command (6526), a waiting timer control I/O command H for realizing a uniform revolution of 813 pps (with a switching time period per 1/6 phase of 205 μsec) (in units of 64 μsec) (1508), and a waiting timer control I/O command L (in units of 0.5 μsec) (1433).

Similarly, the third line, the fourth line, the fifth line and the sixth line represent control I/O commands at positions advanced from the starting phase by 2/6 phase, 3/6 phase, 4/6 phase and 5/6 phase, respectively.

Basically, in the second through sixth lines, the contents of processing are the same, and only a current value written in A phase/B phase of the carriage motor PWM current sinusoidally changes in order to realize microstepping. Actually, the current flow is directional both in A phase and B phase. In this case, however, only the absolute value of the current is written, and the direction of the current does not have a negative value because the direction is changed at the driver side.

The seventh line represents a position advanced from the staring phase by 6/6 phase, i.e., the position of the phase next to the uniform-revolution-operation starting phse. Hence, it comprises a control I/O command for a phase shift (excitation of the phase next but one from the uniform-revolution-operation starting phase) (6901), a carriage motor PWM current (A phase) writing control I/O command (6428), a carriage motor PWM current (B phase) writing control I/O command (6501), a waiting timer control I/O command H for realizing a uniform revolution of 813 pps (with a switching time period per 1/6 phase of 205 μsec) (in units of 64 μsec) (1508), and a waiting timer control I/O command L (in units of 0.5 μsec) (1433).

The uniform-revolution portion is realized basically by repeating processing from the first line to the 12th line by a number of necessary pulses. The processing from the first line to the 12th line is made to be one period because a table of changes in current of microstep driving by PWM provides one period for pulses corresponding to two phases of the motor.

In the first embodiment, the carriage is moved by 1/6 inch by one pulse (for one phase) of the carriage motor. Since one phase is divided into six portions in order to perform microstep control, the amount of movement per microstep is 1/60 inch÷6=1/360 inch.

In a recording head having a printing resolution of 360 dpi (dots per inch), each microstep corresponds to printing for one column. Hence, when actually performing printing of 360 dpi, a printing-data transfer control I/O command for one column, a heating scanning trigger control I/O command and the like are added in each line (microstep) in FIG. 26. This will be described later.

When the uniform-revolution operation has been completed, a deceleration-operation portion is executed.

FIG. 27 illustrates a deceleration-operation portion during a one-way printing operation. Control I/O commands start from the first line, and proceed from the left to the right, and from an upper line to a lower line (6901, 6401, 6528, 1503, 1433, 6406, . . . ).

The first line comprises a control I/O command for the first phase shift (excitation of the phase next to the deceleration starting phase) (6901), a carriage motor PWM current (A phase) writing control I/O command (6401), a carriage motor PWM current (B phase) writing control I/O command (6528), a waiting timer control I/O command H for realizing a deceleration operation (in units of 64 μsec) (1503), and a waiting timer control I/O command L (in units of 0.5 μsec) (1433).

The second line comprises a carrige motor PWM current (A phase) writing control I/O command at a position advanced from the starting phase by 1/6 phase (6406), a carrige motor PWM current (B phase) writing control I/O command (6526), a waiting timer control I/O command H for realizing a deceleration operation (in units of 64 μsec) (1503), and a waiting timer control I/O command L (in units of 0.5 μsec) (1433).

Similarly, the third line, the fourth line, the fifth line and the sixth line represent control I/O commands at positions advanced from the starting phase by 2/6 phase, 3/6 phase, 4/6 phase and 5/6 phase, respectively.

Basically, in the second through sixth lines, the contents of processing are the same, and only a current value written in A phase/B phase of the carriage motor PWM current sinusoidally changes in order to realize microstepping. In addition, the setting of the waiting timer control I/O command is gradually increased in order to realize the deceleration operation, but is not yet changed greatly at 1–3 pulses for deceleration.

In an ordinary deceleration operation, the time interval is gradually reduced at a timing of phase switching. In the first embodiment, however, since microstep control is performed, it is necessary to gradually change the time period even within the same phase (changed, for example, even within the range of deceleration 3-1–3-6).

Actually, the current flow is directional both in A phase and B phase. In this case, however, only the absolute value of the current is written, and the direction of the current does not have a negative value because the direction is changed at the driver side.

The seventh line represents a position advanced from the deceleration staring phase by 6/6 phase, i.e., the position of the phase next to the deceleration starting phse. Hence, it comprises a control I/O command for a phase shift (excitation of the phase next but one from the deceleration starting phase) (6901), a carriage motor PWM current (A phase) writing control I/O command (6428), a carriage motor PWM current (B phase) writing control I/O command (6501), a waiting timer control I/O command H for realizing a deceleration operation (in units of 64 μsec) (1503), and a waiting timer control I/O command L (in units of 0.5 μsec) (1433).

In the first embodiment, the deceleration operation is repeated for 22 steps in the same manner. When deceleration has been completed, the last phase of deceleration (stopping phase) is excited. Then, the current is interrupted at the last line.

Basically, the same control I/O commands as in the above-described cases of acceleration, uniform revolution and deceleration are used for a carriage returning operation, except that the direction of revolution differs at initial setting of acceleration (6B01>6b00), and control I/O commands for printing data, heating trigger and the like are not added in a uniform-revolution portion.

FIGS. 28 and 29 illustrate groups of control I/O commands for acceleration and deceleration in a sheet feeding operation (in this case, feeding by 24 pulses). The highest value of the number of revolution of the line feeding motor during feeding by 24 pulses is 801 pps, which is higher than the value in the self starting region of an ordinary stepping motor. Hence, acceleration and deceleration operations are required.

In the first embodiment, 20 pulses are required for each of acceleration and deceleration of the sheet feeding motor. In this case, however, since sheet feeding is performed by 24 pulses, 12 pulses are used from each table for both of acceleration and deceleration, and no uniform-revolution portion is present. Accordingly, the operation of the motor grossly comprises two portions, i.e., an acceleration-operation portion and a deceleration-operation portion.

FIG. 28 represents an acceleration portion during a 24-pulse sheet feeing operation. Control I/O commands start from the line of initial setting, and proceed from the left to the right, and from an upper line to a lower line (7B01, 7101, 7401, 7528, 159C, 1400, 7901, . . . ).

Initial setting in the first line comprises setting of the direction of revolution of the sheet feeding motor before an operation (01 in the case of sheet feeding in the forward direction (00 in the case of sheet feeding in the reverse direction)) (7B01), and a sheet feeding motor PWM currrent ON control I/O command (7101).

The second line comprises a sheet feeding motor PWM current (A phase) writing control I/O command for exciting a starting phase (7401), a sheet feeding motor PWM current (B phase) writing control I/O command (7528), a waiting timer control I/O command H for setting an exciting (holding) time period for the starting phase (in units of 64 μsec) (159C), and a waiting timer control I/O command L (in units of 0.5 μsec) (1400).

The third line comprises a control I/O command for the first phase shift (excitation of the phase next to the starting phase) (7901), a sheet feeding motor PWM current (A phase) writing control I/O command (7401), a seet feeding motor PWM current (B phase) writing control I/O command (7528), a waiting timer control I/O command H for realizing an acceleration operation (in units of 64 μsec) (1505), and a waiting timer control I/O command L (in units of 0.5 μsec) (1424).

The fourth line comprises a sheet feeding motor PWM current (A phase) writing control I/O command at a position advanced from the starting phase by 1/6 phase (7406), a sheet feeding motor PWM current (B phase) writing control I/O command (7526), a waiting timer control I/O command H for realizing an acceleration operation (in units of 64 μsec) (1505), and a waiting timer control I/O command L (in units of 0.5 μsec) (141C).

Similarly, the fifth line, the sixth line, the seventh line and the eighth line represent control I/O commands at positions advanced from the starting phase by 2/6 phase, 3/6 phase, 4/6 phase and 5/6 phase, respectively.

Basically, in the fourth through eighth lines, the contents of processing are the same, and only a current-value written in A phase/B phase of the sheet feeding motor PWM current sinusoidally changes in order to realize microstepping. In addition, the set value of the waiting timer control I/O command gradually decreases for realizing an acceleration operation.

In an ordinary acceleration operation, the time interval is gradually reduced at a timing of phase switching. In the first embodiment, however, since microstep control is performed, it is necessary to gradually change the time period even within the same phase (changed, for example, even within the range of acceleration 1-1–1-6).

Actually, the current flow is directional both in A phase and B phase. In this case, however, only the absolute value of the current is written, and the direction of the current does not have a negative value because the direction is changed at the driver side.

The ninth line represents a position advanced from the staring phase by 6/6 phase, i.e., the phase next to the starting phase. Hence, it comprises a control I/O command for a phase shift (excitation of the phase next but one from the starting phase) (7901), a sheet feeding motor PWM current (A phase) writing control I/O command (7428), a sheet feeding motor PWM current (B phase) writing control I/O command (7501), a waiting timer control I/O command H for realizing an acceleration operation (in units of 64 μsec) (150F), and a waiting timer control I/O command L (in units of 0.5 μsec) (14ED).

In the first embodiment, the acceleration operation is repeated for 12 steps in the same manner. When the acceleration operation has been completed, a deceleration-operation portion is executed.

FIG. 29 illustrates a deceleration-operation portion during a 24-pulse sheet feeing operation. Control I/O commands start from the first line, and proceed from the left to the right, and from an upper line to a lower line (7901, 7401, 7528, 1503, 1420, 7406, . . . ).

The first line comprises a control I/O command for the first phase shift (excitation of the phase next to the deceleration starting phase) (7901), a sheet feeding motor PWM current (A phase) writing control I/O command (7401), a sheet feeding motor PWM current (B phase) writing control for I/O command (7528), a waiting timer control I/O command H realizing a deceleration operation (in units of 64 μsec) (1503), and a waiting timer control I/O command L (in units of 0.5 μsec) (1420).

The second line comprises a sheet feeding motor PWM current (A phase) writing control I/O command at a position advanced from the starting phase by 1/6 phase (7406), a sheet feeding motor PWM current (B phase) writing control I/O command (7526), a waiting timer control I/O command H for realizing a deceleration operation (in units of 64 μsec) (1503), and a waiting timer control I/O command L (in units of 0.5 μsec) (1424).

Similarly, the third line, the fourth line, the fifth line and the sixth line represent control I/O commands at positions advanced from the starting phase by 2/6 phase, 3/6 phase, 4/6 phase and 5/6 phase, respectively.

Basically, in the second through sixth lines, the contents of processing are the same, and only a current value written in A phase/B phase of the sheet feeding motor PWM current sinusoidally changes in order to realize microstepping. In addition, the setting of the waiting timer control I/O command is gradually increased in order to realize the deceleration operation.

In an ordinary deceleration operation, the time interval is gradually reduced at a timing of phase switching. In the first embodiment, however, since microstep control is performed, it is necessary to gradually change the time period even within the same phase (changed, for example, even within the range of deceleration 3-1–acceleration 3-6).

Actually, the current flow is directional both in A phase and B phase. In this case, however, only the absolute value of the current is written, and the direction of the current does not have a negative value because the direction is changed at the driver side.

The seventh line represents a position advanced from the deceleration staring phase by 6/6 phase, i.e., the position of the phase next to the deceleration starting phse. Hence, it comprises a control I/O command for a phase shift (excitation of the phase next but one from the deceleration starting phase) (7901), a sheet feeding motor PWM current (A phase) writing control I/O command (7428), a sheet feeding motor PWM current (B phase) writing control I/O command (7501), a waiting timer control I/O command H for realizing a deceleration operation (in units of 64 μsec) (1503), and a waiting timer control I/O command L (in units of 0.5 μsec) (1434).

In the first embodiment, the deceleration operation is repeated for 12 steps in the same manner. When deceleration has been completed, the last phase of deceleration (stopping phase) is excited. Then, the current is interrupted at the last line.

FIG. 30 is a diagram illustrating the configuration of a medium. A floppy disk, a CR-ROM, an MO (magnetooptical) disk or the like may be used as the medium. In FIG. 30, Installer (1) is software for installing one of a series of software (2)–(7) in the host system. RTOS Runtime Library (2) is software for providing the host system with an RTOS environment. Language Monitor (3) is software which is added to the spooling subsystem of the host unit and which exchanges data with W-RTOS Host Application. W-RTOS Host Application (4) is software having the role of receiving printing commands from Language Monitor and transmitting the received commands to RTOS Task, and controlling RTOS Task. RTOS Task (5) is software for performing printing or scanning in accordance with printing or scanning commands, respectively, transmitted from W-RTOS Host Application, and comprises Control-Code Analysis Task, Printing Processing Task, Scanning Processing Task, Head Exchange Processing Task, Sheet Feeding/Discharging Processing Task, Timer Control Task, Recovery-System Processing Task, Head-Temperature Control Processing Task, Error Processing Task, and Power-Supply Control Task. VCOMM Port Driver (6) is software for performing processing of transmitting printing commands from VCOMM to RTOS Driver. RTOS Driver (7) is software for transmitting printing commands from VCOMM Port Driver to RTOS Task. Utility (8) is utility software for performing setting of environment, head exchange and the like of the printer. The above-described software group is set by Installer (1) so as to be executed in the system.

Figure 31:
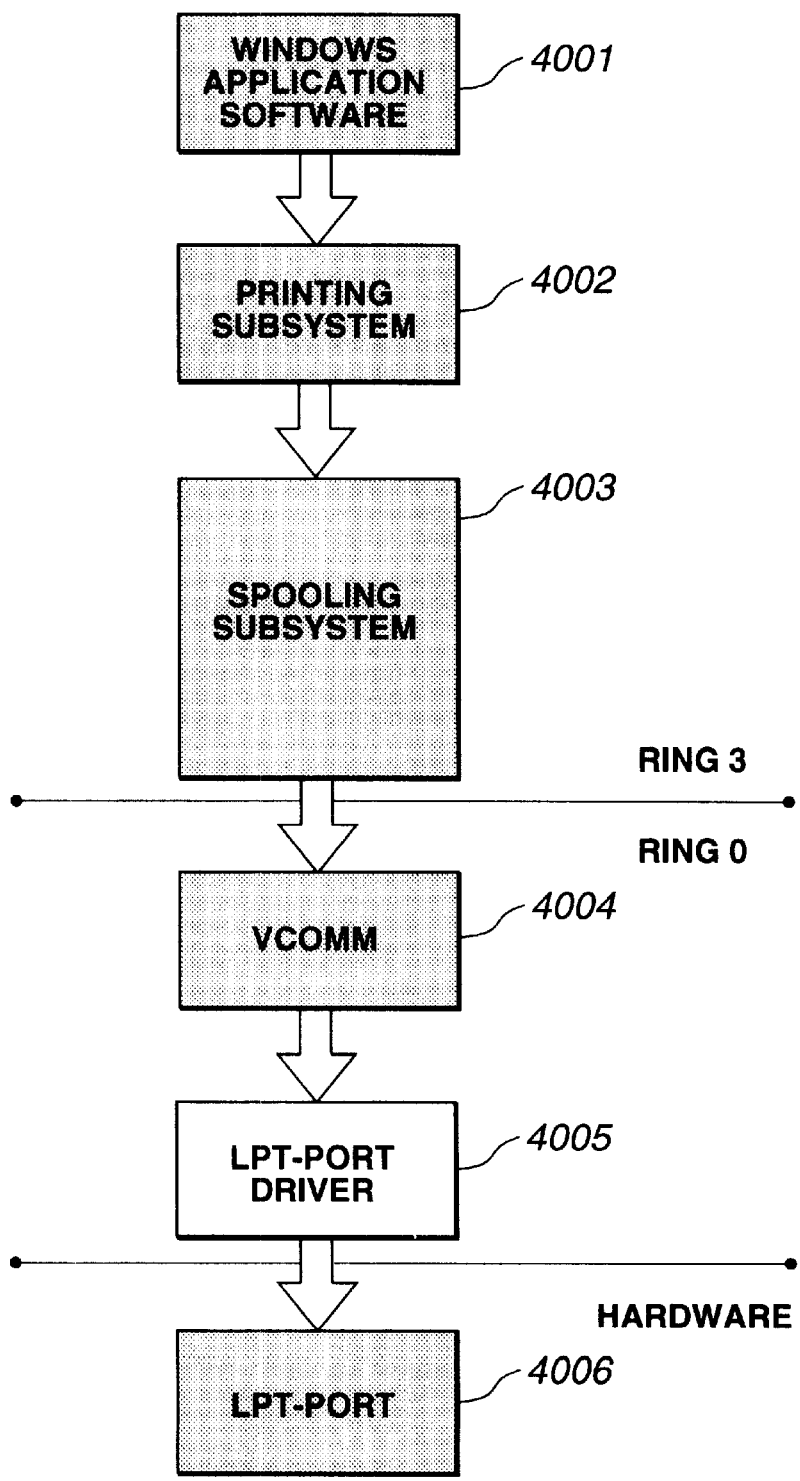
FIG. 31 is a diagram illustrating software processing procedures during an output operation from conventional Windows application software to a printer.

FIG. 31 illustrates software processing procedures when outputting data from Windows application software to a printer connected to an LPT port in a Window 95 environment. In FIG. 31, there are shown Windows application software 4001 having a printing function, a printing subsystem 4002, a spooling subsystem 4003, VCOMM 4004, a port driver 4005, and an LPT port 4006. The operations of components 4001–4005 are controlled by instructions of a Windows system.

Data output from general Windows application software 4001 having the printing function is transmitted to the printing subsystem 4002. The printer driver outputs data in cooperation with GDI (Graphical Device Interface), serving as an interface with the hardware of a graphic device in the Windows operating system while converting the data into printing data (control codes). The printing data is then transmitted to the spooling subsystem 4003, where a spooler process stores the printing data (control codes) in a spool file and writes the data in VCOMM 4004. VCOMM 4004 writes the printing data (control codes) in the physical LPT port 4006 via the LPT-port driver 4005.

In the present invention, a real-time OS (operating system) operating in a Windows 95 environment is used. RTOS provides a real-time environment with Ring 0 of a CPU operational mode, and can execute a plurality of signal processing tasks in the environment. Communication between RTOS Task and Windows application software executed in Ring 3 is realized by means for performing asynchronous communication using a Windows message. Windows application software communicating with RTO Task is called W-RTOS host application software. Communication between RTOS Tasks are also realized by means for performing asynchronous communication.

Figure 39:
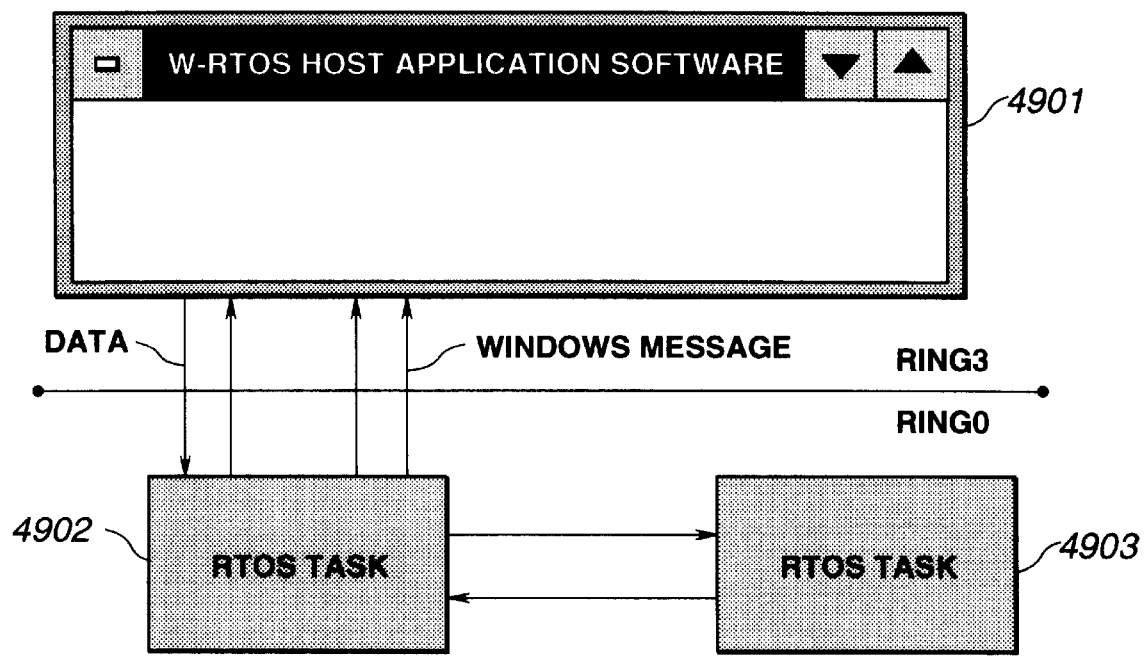
FIG. 39 is a diagram illustrating communication between an RTOS task and Windows application software, and between RTOS tasks in a conventional approach.

FIG. 39 illustrates communication between RTOS Task and Windows appplication software and bewteen RTOS Tasks in a conventional Windows 95 environment. In FIG. 39, reference numeral 4901 represents W-RTOS host application software. RTOS Task 4902 communicates with W-RTOS host application software 4901. RTOS Task 4903 communicates with RTOS Task 4902.

RTOS Task 4902 performs communication, such as request of data, end of data processing or the like, with W-RTOS host application software 4901 in the form of a Windows message. W-RTOS host application software 4901 communicates start of processing of RTOS Task 4901, and transmits data in accordance with the message.

Figure 32:
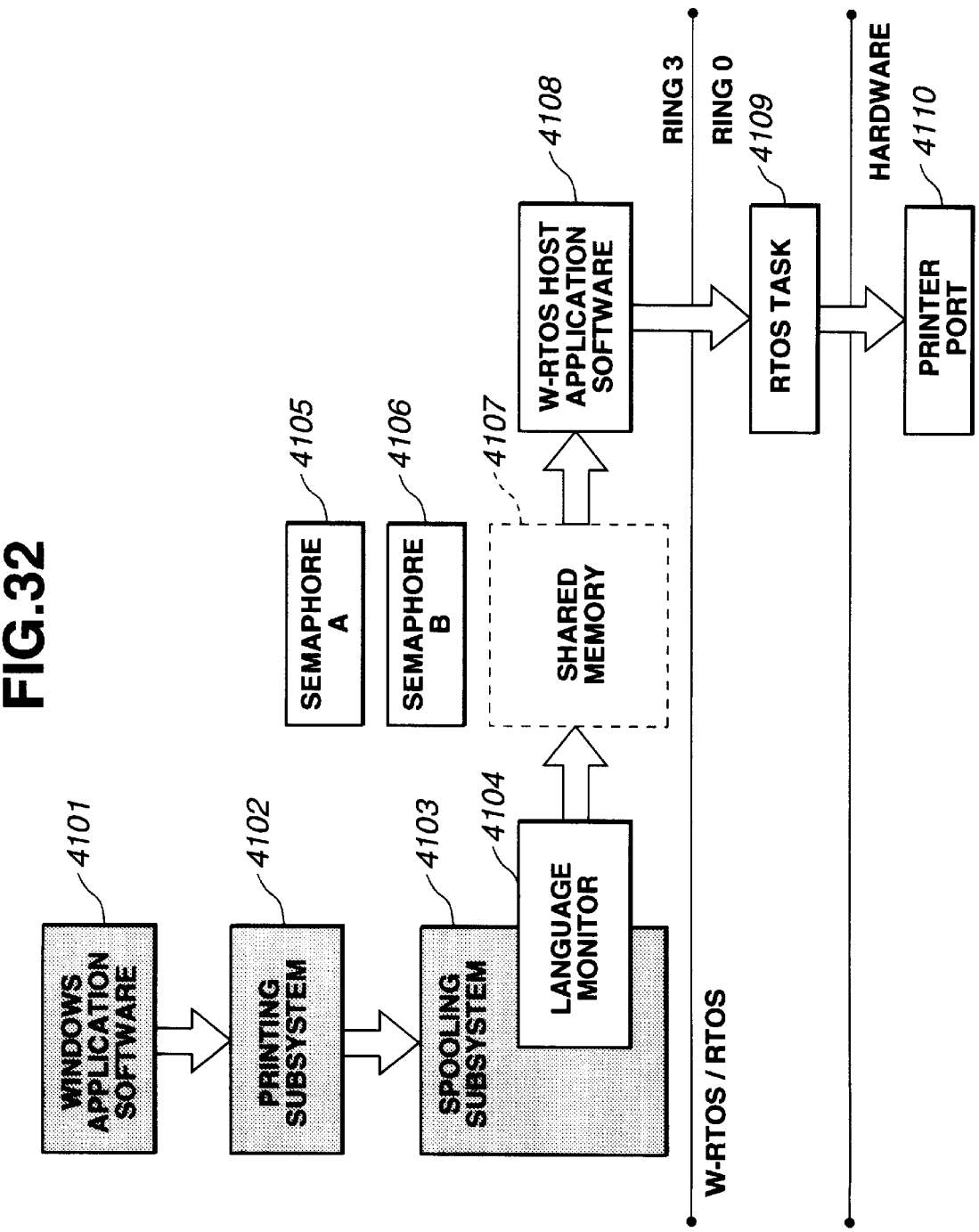
FIG. 32 is a block diagram of printing processing.

FIG. 32 is a software block diagram illustrating the flow of printing processing in the present invention. As shown in FIG. 32, this printing system includes Windows application software 4101, a printing subsystem 4102, a spooling subsystem 4103, Language Monitor 4104, semaphore A 4105, semaphore B 4106, a shared memory 4107, W-RTOS host application software 4108, RTOS Task 4109, and a printer port 4110.

In the case of the Windows 95 operating system, the spooling subsystem includes a plurality of components, among which Port Monitor and Language Monitor are components for communicating with VCOMM and writing data in Port Driver. In the present invention, in order to hook printing data (control codes) from the spooling subsystem, unique Language Monitor 4104 is formed and added to the spooling subsystem 4103.

Language Monitor 4104 exports a certain number of functions. If a two-way printer is not taken into consideration, when processing printing data (control codes), the Windows 95 system calls functions of Language Monitor as StartDocPort–WritePort (a plurality of times) →EndDocPort.

Figure 33:
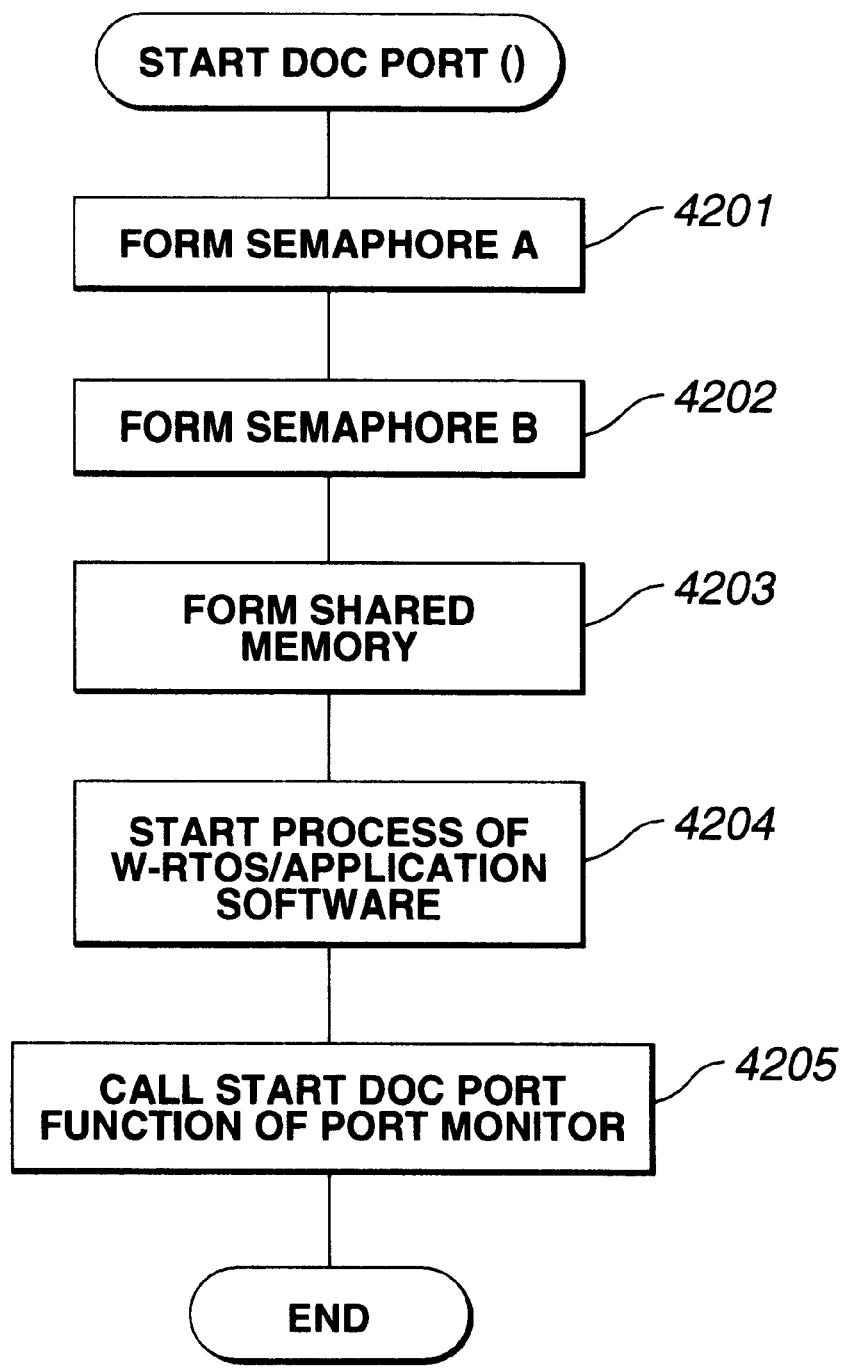
FIG. 33 is a flowchart of StartDocPort O of Language Monitor.

As shown in FIG. 32, data output from ordinary Windows application software 4101 having a printing function is processed by the printing subsystem 4102, and is transmitted to the spooling subsystem 4103. When processing printing data (control codes) by Language Monitor 4104 which is one of components constituting the spooling subsystem 4103 and which has been newly added this time, first, processing shown in FIG. 33 is performed. After calling the StartDocPort ( ) function, the semaphore A 4105 and the semaphore B 4106 are formed in steps 4201 and 4202, respectively. Then, in step 4203, the shared memory 4107 is allocated. Then, in step 4204, W-RTOS host application software 4108 is generated as a child process of Language Monitor 4104. Finally, in step 4205, the StartDocPort ( ) function of Port Monitor is called.

Figure 36:
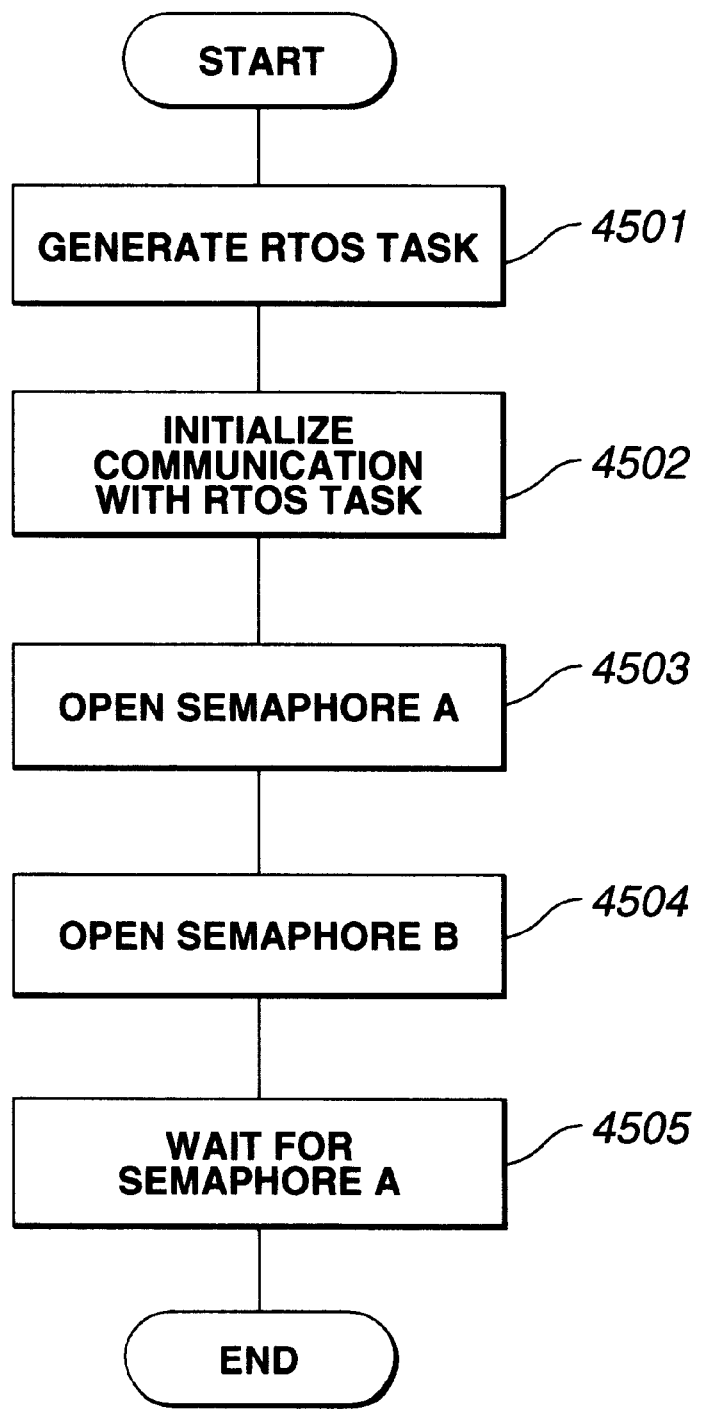
FIG. 36 is a flowchart of an initializing function in W-RTOS host application software.

The W-RTOS host application software 4108 generated as the child process in step 4204 shown in FIG. 33 performs processing shown in FIG. 36. That is, in step 4501, RTOS Task 4109 is started. In step 4502, communication between W-RTOS host application software 4108 and RTOS Task 4109 is initialized. In steps 4503 and 4504, the semaphore A 4105 and the semaphore B 4106 are opened. In step 4505, the semaphore A 4105 is awaited.

Figure 34:
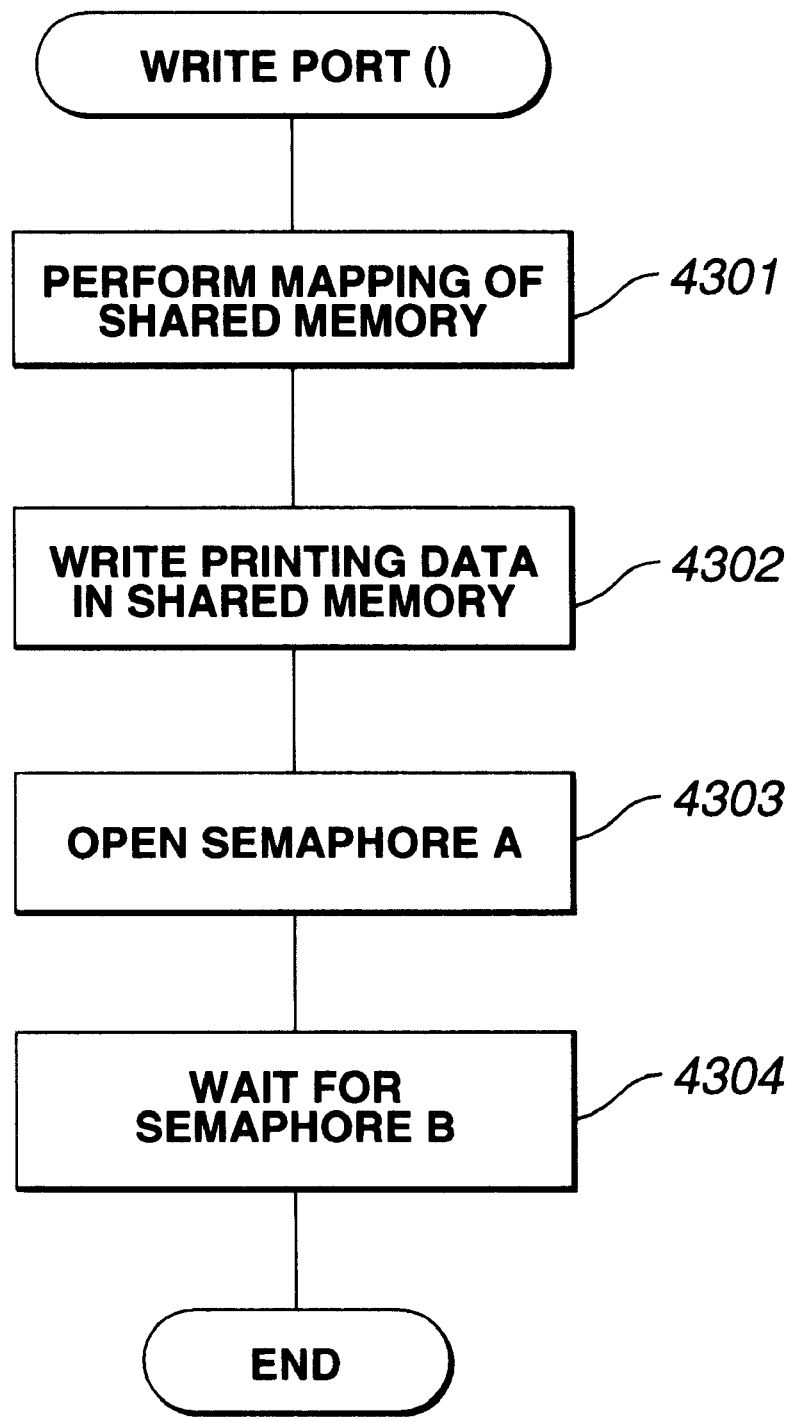
FIG. 34 is a flowchart of Write Port O of Language Monitor.

On the other hand, after performing the processing shown in FIG. 33, Language Monitor 4104 performs processing shown in FIG. 34. In FIG. 34, after calling the WritePort ( ) function, the shared memory 4107 is mapped in step 4301. In step 4302, printing data (control codes) is written in the shared memory 4107. In step 4303, the semaphore A 4105 is releases. In step 4304, the semaphore B is awaited.

Figure 37:
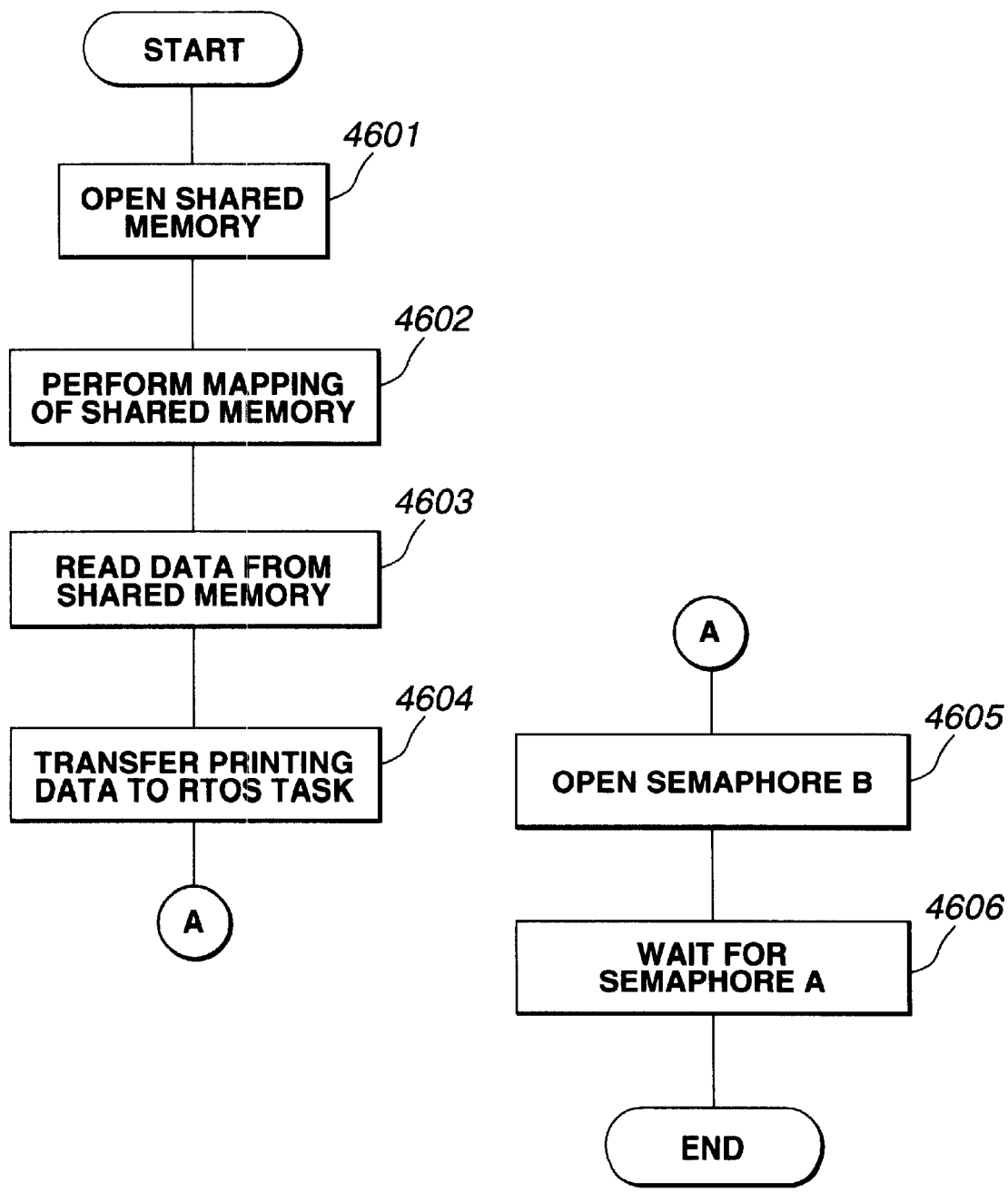
FIG. 37 is a flowchart of an asynchronous-communication function in W-RTOS host application software.

After performing the processing shown in FIG. 36, W-RTOS host application software 4108 performs processing shown in FIG. 37. That is, in step 4601, the shared memory 4107 is opened. Then, in step 4602, the shared memory 4107 is mapped in the process space of W-RTOS host application software 4108. In step 4603, the printing data (control codes) written in the shared memory 4107 in step 4302 shown in FIG. 34 is read. In step 4604, the printing data (control codes) is written in RTOS Task 4109. In step 4605, the semaphore B 4106 is released. In step 4606, the semaphore A 4105 is awaited. The written printing data (control codes) is converted into an print head image by RTOS Task 4109, and is written in the printer port 4110.

The Windows 95 system repeats the processing shown in FIG. 34 until no spooled data remains. A series of printing processing is performed by repeating the proceses shown in FIGS. 34 and 37.

Figure 35:
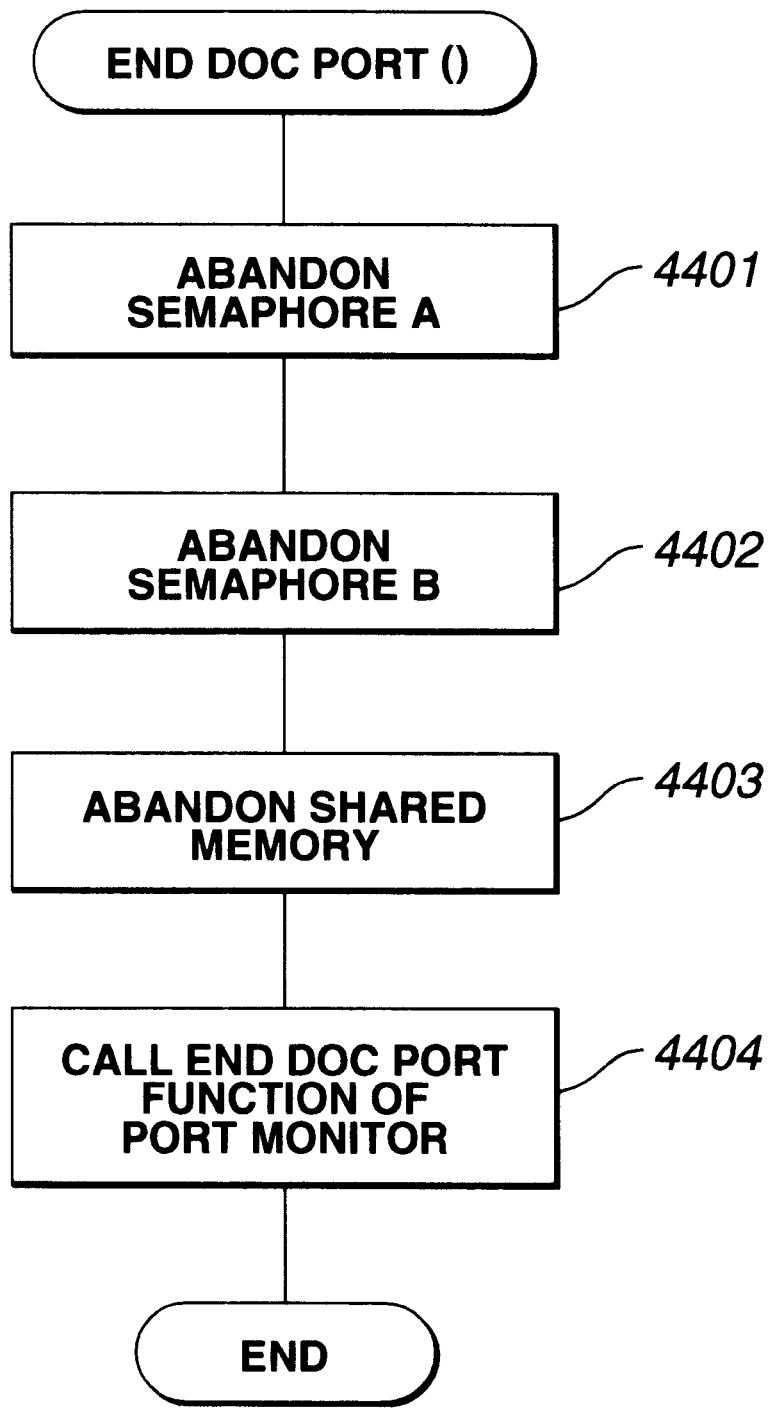
FIG. 35 is a flowchart of EndDocPort O of Language Monitor.

When no spooled data remains, the Windows 95 system performs processing shown in FIG. 35. After calling the EndDocPort ( ) function, the semaphores A and B are abandoned in steps 4401 and 4402, respectively. Then, in step 4403, the shared memory is abandoned. Finally, in step 4404, the EndDocPort ( ) function of Port Monitor is called.

Figure 38:
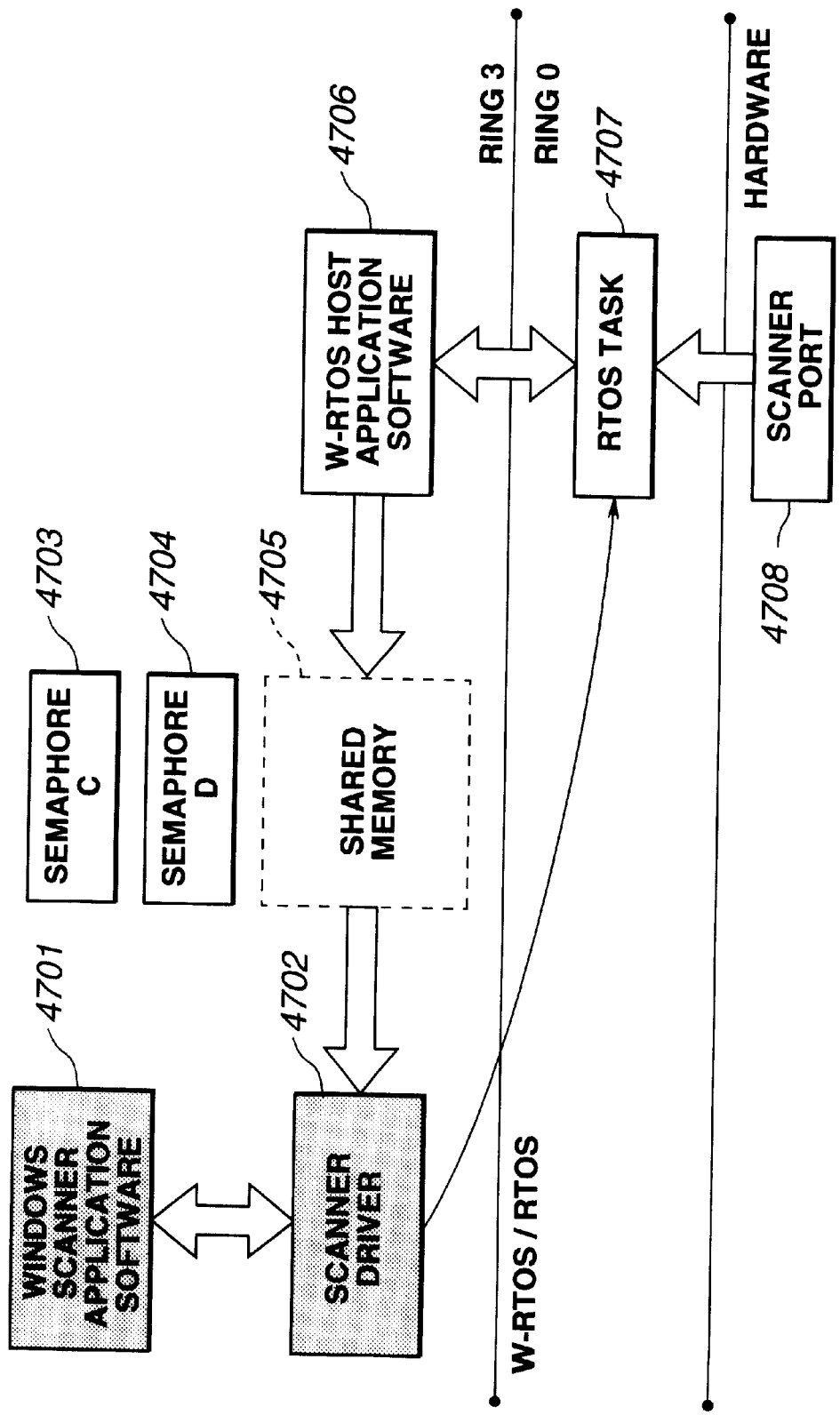
FIG. 38 is a block diagram of software illustrating the flow of scanner processing.

FIG. 38 is a software block diagram illustrating the flow of scanner processing in the present invention.

As shown in FIG. 38, the scanner system includes Windows scanner application software 4701, a scanner driver 4702, a semaphore C 4703, a semaphore D 4704, a shared memory 4705, W-RTOS host application software 4706, RTOS Task 4707, and a scanner port 4708.

Figure 40:
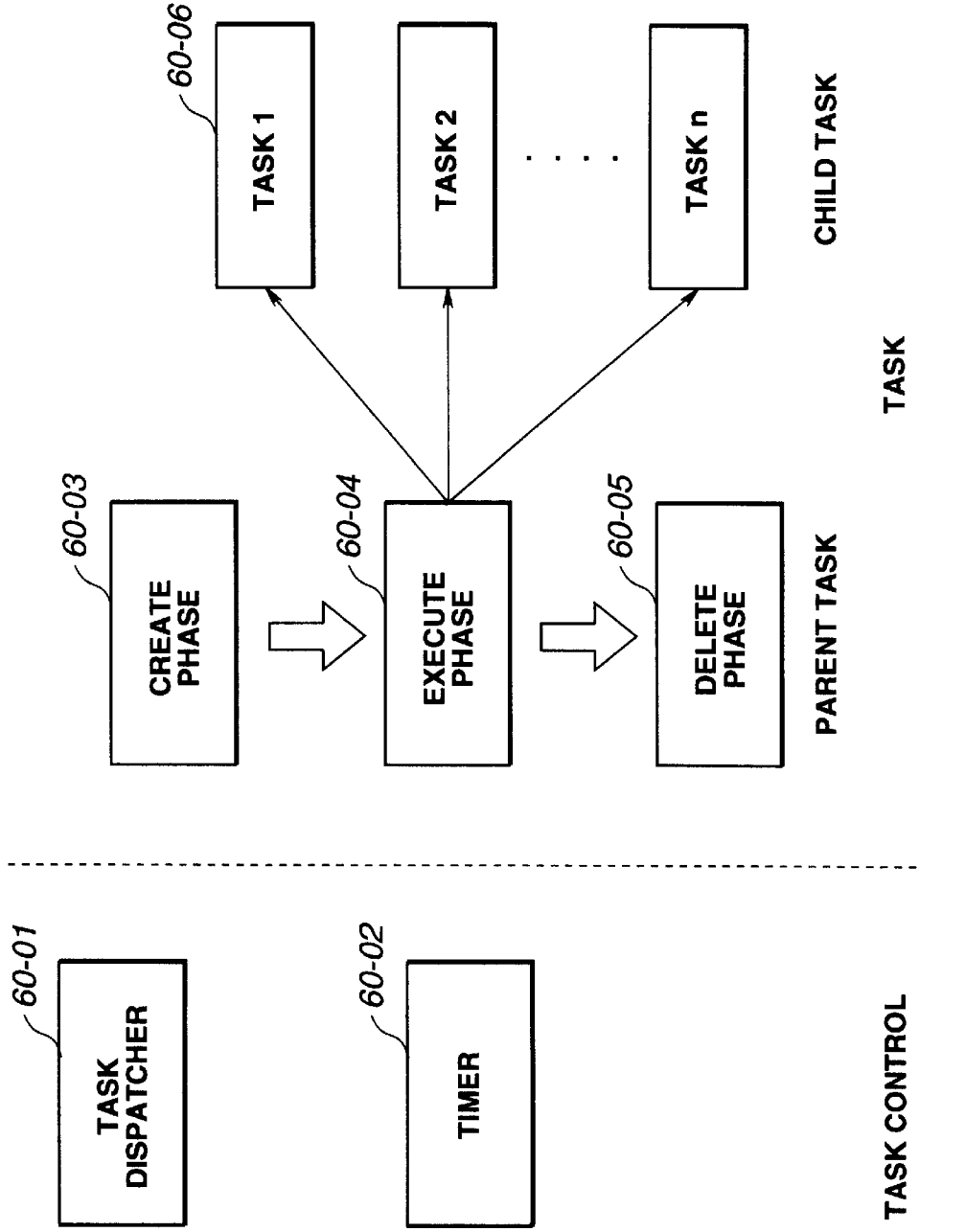
FIG. 40 is a diagram illustrating task control.

As shown in FIG. 40, when ordinary Windows application software 4701 having a scanner function provides a scanning starting instruction, the scanner driver 4702 forms the semaphore C 4703 and the semaphore D 4704, and allocates the shared memory 4705. W-RTOS host application software 4706 is generated as a child process of the scanner driver 4702. Then, a scanning starting control code is output to the scanner device via RTOS Task 4707 and the scanner port 4708.

Scanned data transmitted from the scanner device via the scanner port 4708 is subjected to buffering in RTOS Task 4707, and is transmitted to W-RTOS host application software 4706. W-RTOS host application software 4706 transmits the scanned data from the scanner driver 4704 to Windows scanner application software by providing synchronism using the semaphore C 4703 and the semaphore D 4704 via the shared memory 4705.

FIG. 40 illustrates the configuration for executing tasks, which includes Task Control for controlling tasks, and tasks to be executed. Task Control includes Task Dispatcher 60-01 for controlling the execution and the execution order of tasks, and Timer 60-02 for controlling time. Task Control is a part of the real-time-OS RTOS system, and controls tasks. Tasks are configured by a parent task for performing main execution, and child tasks generated from the parent task. The parent task has three phases, i.e., Create Phase 60-03 for initializing tasks, Execute Phase 60-04, serving as the main body of a task, and Delete Phase 60-05 for terminating the task. The parent task is executed in the sequence of Create, Execute and Delete. Child tasks are generated during the execution of the parent task, and n tasks from Task 1–Task n 60-06 can be generated. Each of Execute Phase of the parent task and child tasks 1–n has a priority order for the task. Each of these tasks is represented by reference numeral 4109 shown in FIG. 32. Task Dispatcher performs switching of task execution when the transition state of a task has changed in accordance with the priority order for each task. Timer performs switching of execution of a specific task for every predetermined time period for a task to be executed at a predetermined time interval. Each task has a semaphore in order to be synchronized with another task. Task Dispatcher also controls semaphores. A semaphore can control interruption and resumption of execution of the corresponding task according to a value set in the semaphore generated by the task. Waiting for a change in the value of a semaphore is called semaphore waiting, and setting of a value in a semaphore is called semaphore transmission.

Figure 41:
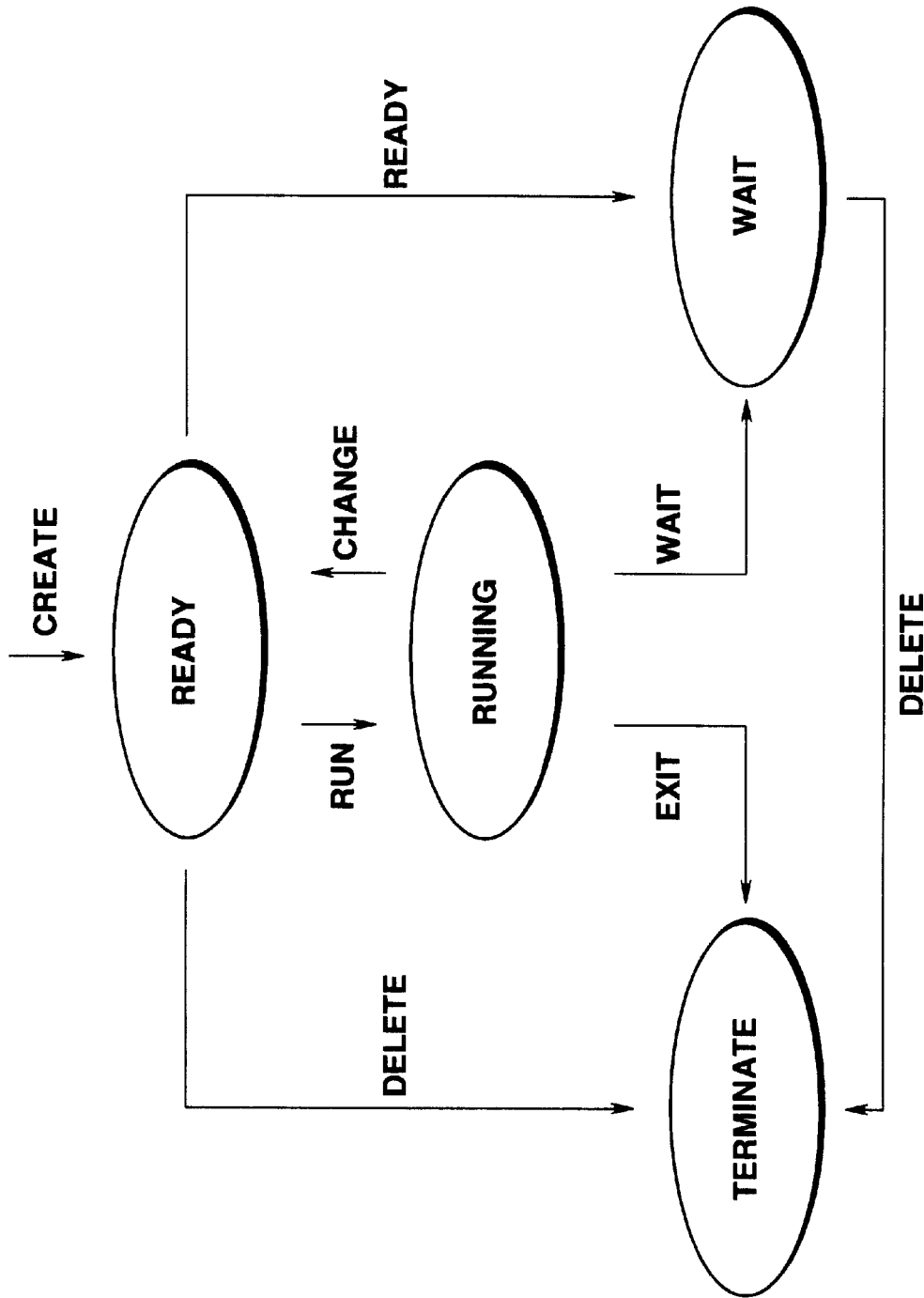
FIG. 41 is a diagram illustrating states of task transition.

FIG. 41 illustrates a manner of transition of a task. First, a task is generated by an arrow "create" to provide a "Ready" state. The task in the Ready state is controlled by Task Dispatcher and is registered in a queue with its priority order. The task at the leading portion having the highest priority order from among registered tasks becomes in a "Running" state as indicated by an arrow "run". An arrow "change" indicates that another task is switched to a Ready state by replacing the task in a Running state. An arrow "wait" indicates that a task in a Running state becomes in a "Wait" state, i.e., an interrupted state, by awaiting a semaphore. An arrow "ready" indicates a change from the Wait state to a Ready state by receiving transmission of a semaphore or terminating interruption, and the concerned task is registered at the end of the queue. An arrow "exit" indicates end of a task in a Running state to provide a "Terminate" state. An arrow "delete" indicates end of a task from a Ready or Wait state to provide a "Terminate" state. When each state transition indicated by the arrow change, exit, wait, delete or ready occurs, the next task is changed from a Ready state to a Running state by Task Dispatcher, and the next task is executed. A task executed by Timer performs the same transistion to provide a Running state. In the case of Timer, transition of a task is performed at a predetermined set time. In an ordinary task, however, transition of a task is executed only when state transition indicated by the arrow change, exit, wait, delete or ready has occurred. According to the above-described task control, execution, switching, and execution at a certain time of a task can be performed.

Figure 42:
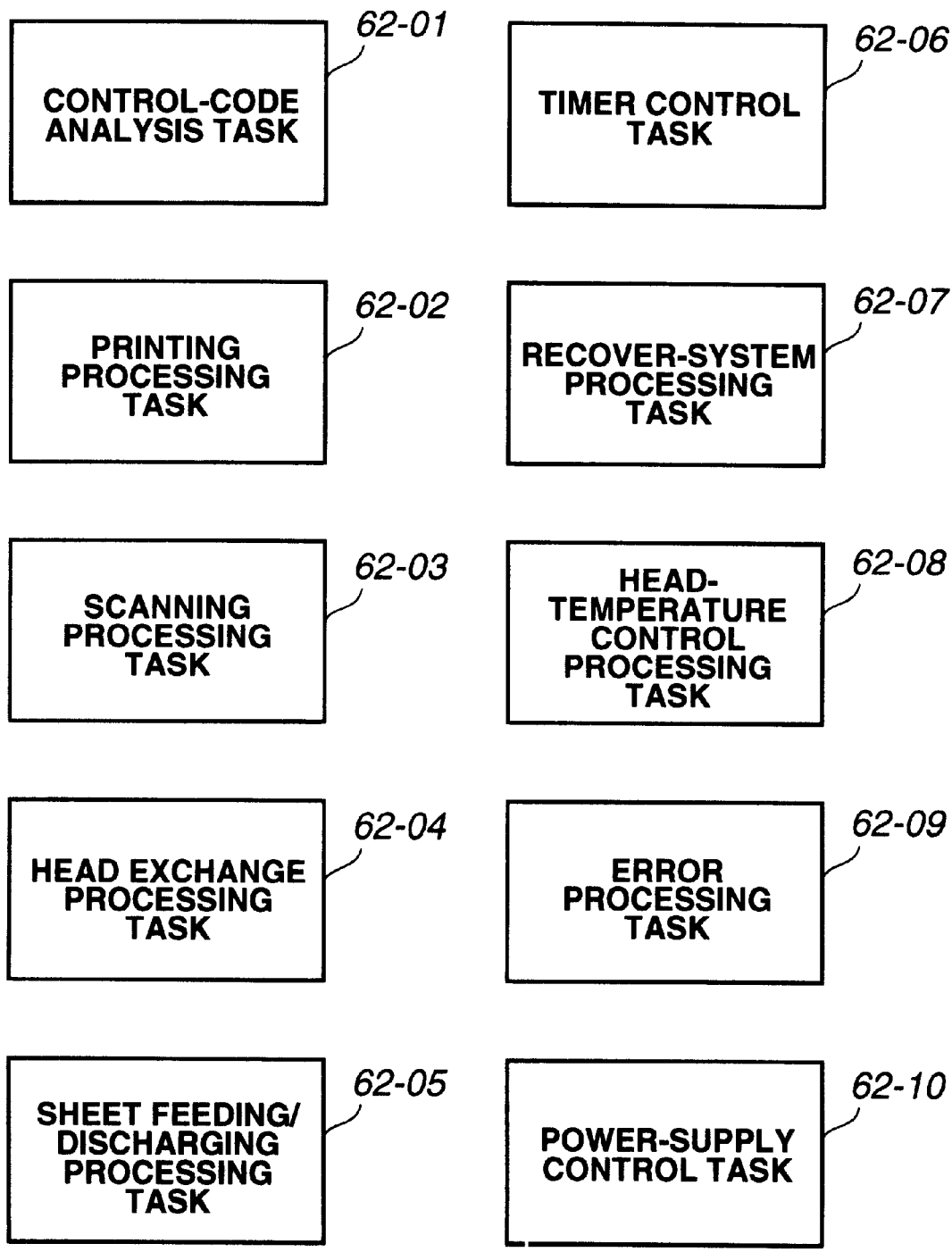
FIG. 42 is a diagram illustrating the configurations of tasks.

FIG. 42 is a diagram illustrating tasks which are executed in the first embodiment, and which correspond to Task 1–Task n shown in FIG. 40. In FIG. 42, Control-Code Analysis Task 62-01 changes transistion of each task in accordance with a control code. Printing Processing Task 62-02 is executed by Control-Code Analysis Task to perform printing. Scanning Processing Task 62-03 perrforms scanning by the scanner. Head Exchange Processing Task 62-04 exchanges the print head or the scanning head. Sheet Feeding/Discharging Task 62-05 performs sheet feeding and discharging. Timer Control Task 62-06 is called at every predetermined time interval to change transition of each task. Recovery-System Processing Task 62-07 performs maintenance processing of the print head executed by Timer Control Task. Head-Temperature Control Processing Task 62-08 peforms temperature control of the print head or the scanning head. Error Processing Task 62-09 processes various errors. Power-Supply Control Task 62-10 controls the state of the power supply. Control-Code Analysis Task, Printing Processing Task, Scanning Processing Task, Head Exchange Processing Task and Sheet Feeding/Discharging Processing Task have the same priority order. Timer Control Task, Recovery-System Processing Task, Head-Temperature Control Processing Task, Error Processing Task and Power-Supply Control Task have the same priority order which is higher than the priority order of Control-Code Analysis Task, Printing Processing Task, Scanning Processing Task, Head Exchange Processing Task and Sheet Feeding/Discharging Processing Task. The detail of each of the tasks will be described with reference to the following flowcharts.

In the conventional printer, tasks which are substantially the same as the above-described ones are executed by a CPU within the printer to perform printing. In the present invention, however, these tasks are executed by the CPU within the host computer.

FIG. 43 illustrates the basic form of a control code. In FIG. 43, ESC is an identifier (1Bh) of the control code, and indicates the start of the control code. Control codes include EPSON, ESCP, HP, PCL, Canon color native commands and the like, and perform instructions of control for performing printing or scanning. The word "command" represents the type of the control code. The contents of "command" are shown in FIG. 44. The word "length" represents the size of subsequent data having a numerical value in units of a byte. The notation "length =0" indicates there is no subsequent data. The word "data" represents data for assigning image data, the mode, the amount of feeding, and the like. Control codes are transmitted from the application software to each task for performing printing or scanning. In the first embodiment, control codes are trasmitted to each task via the Windows application software 4101, the printing subsystem 4102, the spooling subsystem 4103, Language Monitor 4104, the shared memory 4107 and the W-RTOS host application software 4108 shown in FIG. 32. In a second embodiment of the present invention, control codes are transmitted to each task via Windows application software 90-01, a printing subsystem 90-02, a spooling subsystem 90-03, VCOMM 90-08, VCOMM Port Driver 90-09 and RTOS Driver 90-10 shown in FIG. 78.

FIG. 44 illustrates specific control codes in the first embodiment. In FIG. 44, a control code (1) ESC P 0 performs switching to Printing Processing Task. A control code (2) ESC S 0 performs switching to Scanning Processing Task. A control code (3) ESC E 0 terminates Printing Scanning Task. A control code (4) ESC H 1 mode instructs head exchange, i.e., mode=0 and mode=1 indicate the start and the end of head exchange, respectively. A control code (5) ESC I 0 instructs sheet feeding. A control code (6) ESC 0 0 instructs sheet discharging. A control code (7) ESC i color length data controls a printing image, i.e., the word "color" assigns a color as K=black, C=cyan, M=magenta, and Y=yellow. The color of the subsequent data is determined by "color". The word "length" represents the size of data. The word "data" represents the data of the image, in which 1 byte equals 8 bits, and 1 bit equals 1 dot. This control code is a control code for a raster image, and assigns raster data of each color in units of a raster. A control code (8) ESC s 0 is a raster skipping control code, which updates the position of a raster downward by one raster. A control code (9) ESC f 2 feed assigns feeding, and the amount of feeding is assigned by "feed".

FIG. 45 illustrates a case of consecutively transmitting image data for one raster and a raster skipping control code. An image for one raster is formed by image control codes for raster data of four colors and a raser skipping control code. By repeatedly transmitting such image data in this sequence for one page, color printing for one page is performed.

Figure 46A:
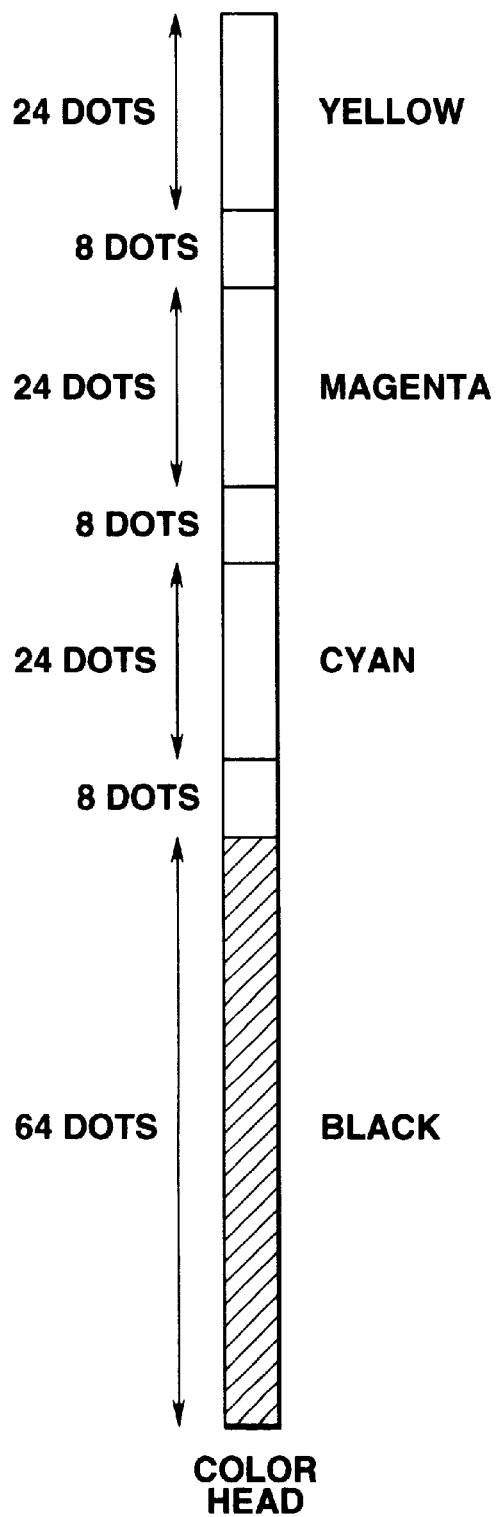
FIGS. 46(A) and 46(B) form a digram illustrating the configuration of dots-of a print head.
Figure 46B:
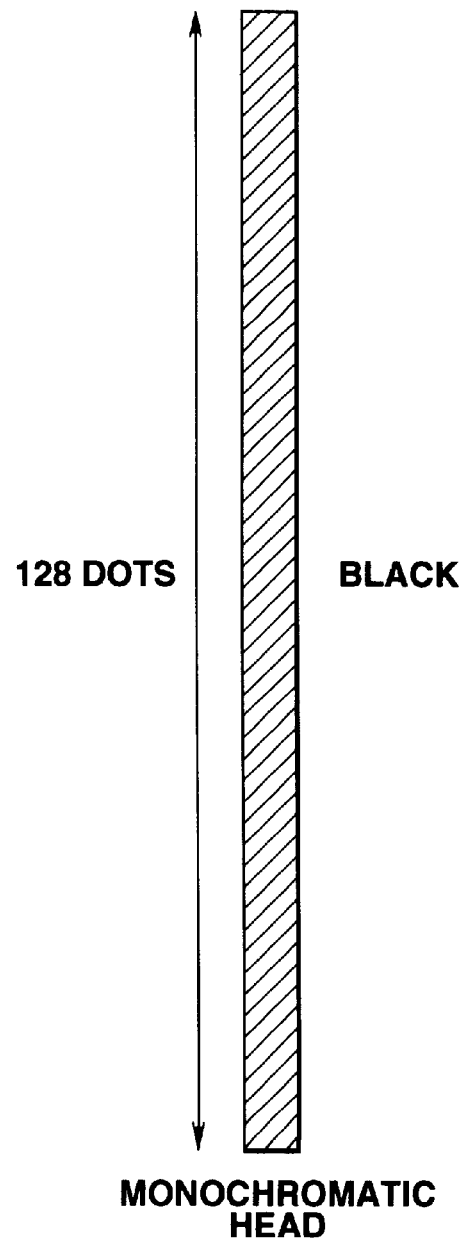

FIGS. 46(A) and 46(B) are schematic diagrams illustrating the configuration of the nozzle portion 2 shown in FIG. 11. FIG. 46(A) illustrates a color ink-jet head, and FIG. 46(B) illustrates a monochromatic ink-jet head. The color head includes color head portions for three colors and a head portion for black, arranged in the sequence of yellow (Y), magenta (M), cyan (C) and black (Bk) from above. Each of the color heads provides 24 dots, and the black head provides 64 dots. An interval of 8 dots is provided between adjacent color heads in order to prevent interference between colors. An ink-jet head has one nozzle for each dot, and, in this case, has a resolution of 1/360 dpi (dots per inch). Printing of color data is performed by discharging ink liquids of respective colors from corresponding ink-jet heads for four colors. Printing of a color which is not present in the ink-jet heads can be realized by superposition of colors of respective inks. The black ink-jet head portion is used for monochromatic printing, The monochromatic ink-jet head shown in FIG. 46(B) is dedicated for monochromatic printing, and includes only a black ink-jet head. The monochromatic ink-jet head provides 128 dots, and all of the 128 dots are provided at one printing operation.

FIGS. 47–53 are diagrams illustrating buffer storages for storing and processing image data of image control codes shown in FIG. 45. Each of buffer storages shown in FIGS. 47–51 has a width corresponding to 5,760 dots in the lateral direction. In the first embodiment, resolution in the lateral direction is 720 dpi. Hence, a width of 5,760/720=8 inches in the lateral direction corresponds to a printing region. The buffer storage shown in FIG. 52 has a width of 8+αinches. Each of the buffer storages shown in FIGS. 47–49 holds an image in the form of a raster image. Each of the buffers shown in FIGS. 50–52 holds image data obtained by performing vertical/horizontal conversion of raster image data as column image data. Y, M, C and K represent respective colors, and the number of rasters indicates the number of rasters which can be held in the buffer storage. The number of dots indicates the number of vertical dots after vertical/horizontal conversion. For example, 24 dots constitute 3 bytes. FIG. 53 illustrates the arrangement of data for rasters and columns. For rasters, data in units of 1 byte (8 dots) are held in the buffer storage in the horizontal direction in the sequence of 1>2>3>4> . . . >n. For columns, data in units of 1 byte (8 dots) are held in the buffer in the vertical direction in the sequence of 1>2>3>4> . . . >n. This is the case of 24 dots.

Figure 47:
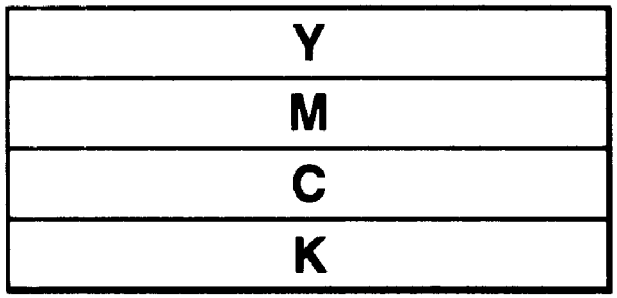
Figure 48:
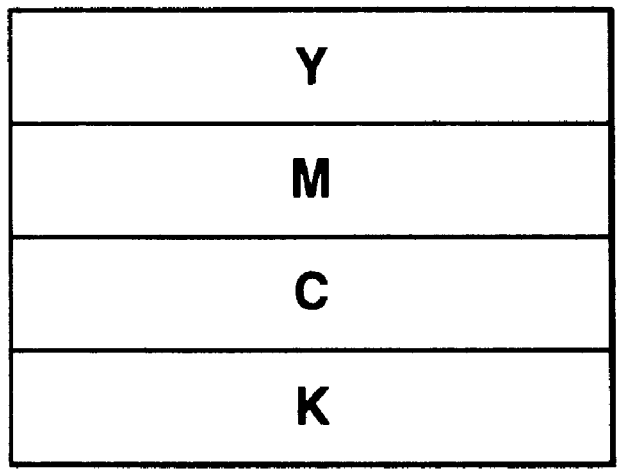
Figure 49:
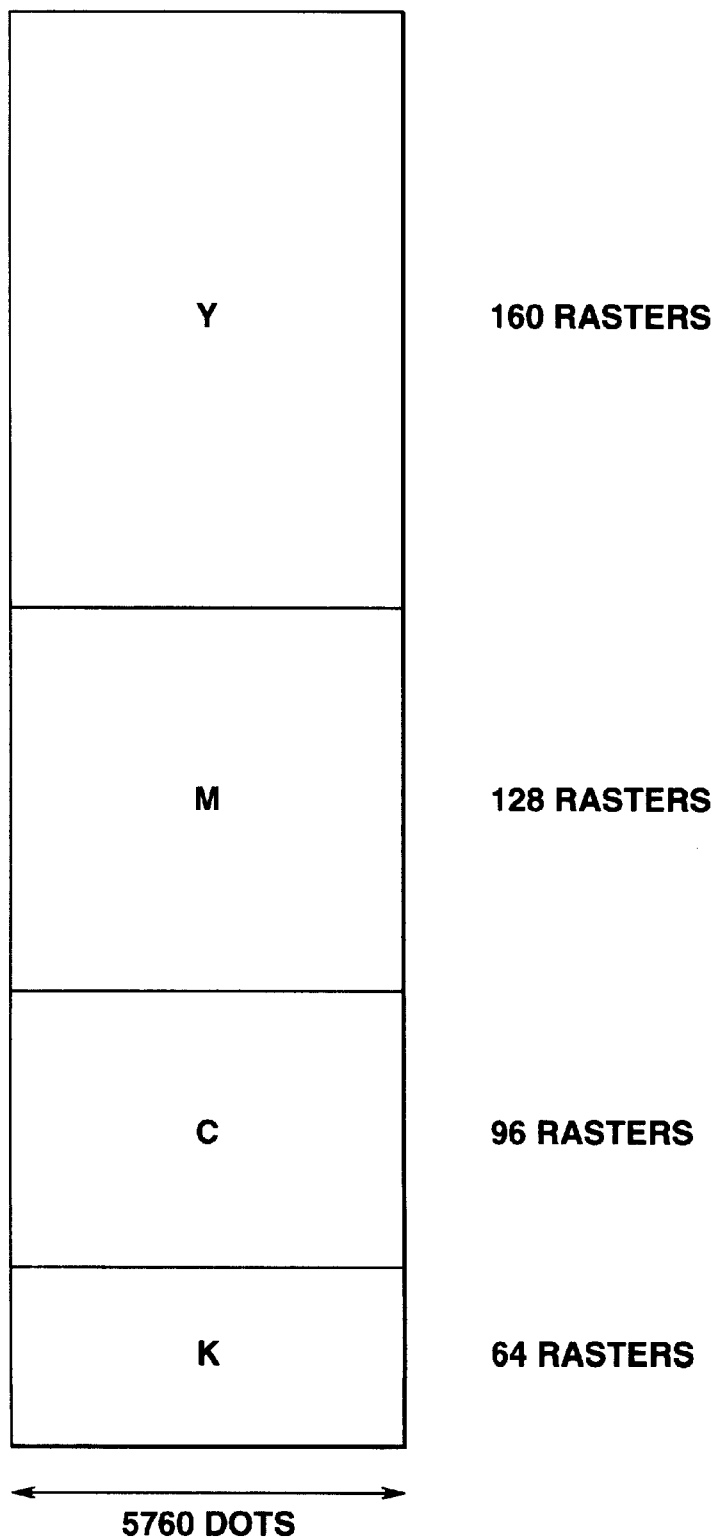
Figure 50:
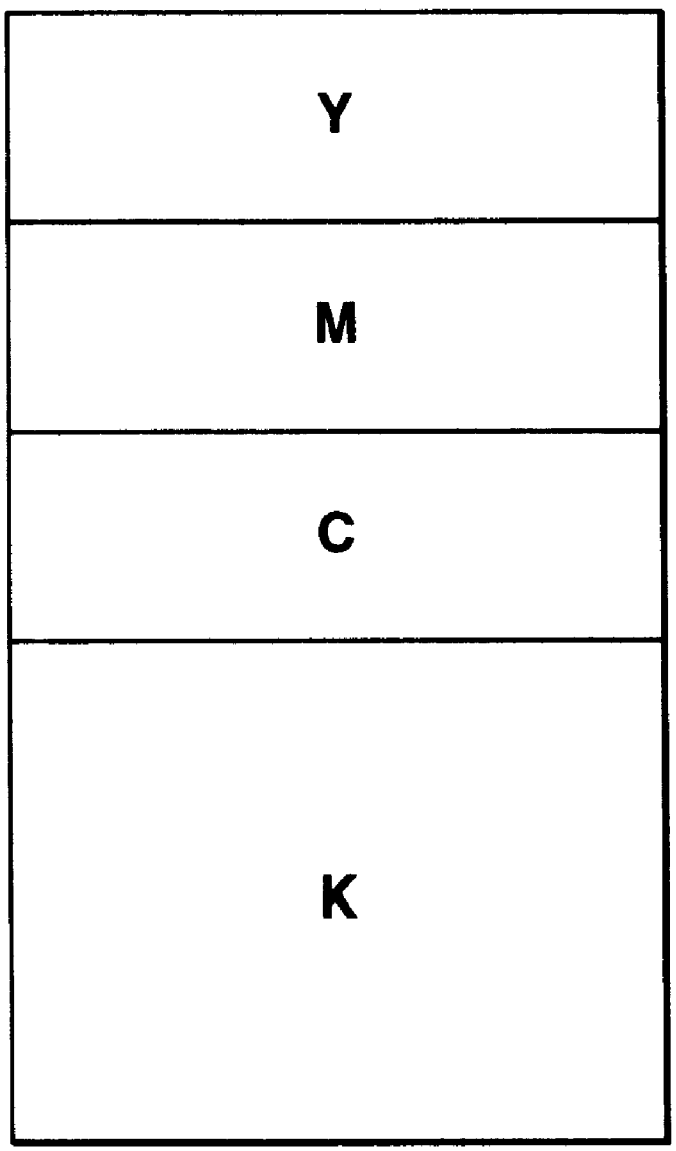

FIG. 47 illustrates a buffer storage for storing raster image data in units of 8 rasters. FIG. 48 illustrates a buffer storage for storing twice the raster image data stored in FIG. 47. This buffer storage is used for processing image data as will be described later, and has a capacity for 16 rasters. When data stored in the buffer storage shown in FIG. 47 become full for 8 rasters, the data are transferred to the buffer storage shown in FIG. 48. When data are not yet set in the buffer storage shown in FIG. 48, the data in the buffer storage shown in FIG. 47 are transmitted to a first half portion for 8 rasters of the buffer storage shown in FIG. 48. When data have already been set in the first half portion of the buffer storage shown in FIG. 48, the data from the buffer storage shown in FIG. 47 are set in a second half portion of the buffer storage shown in FIG. 48. FIG. 49 illustrates a buffer storage for holding processed data stored in the buffer storage shown in FIG. 48 in accordance with printing. As shown in FIG. 46(A), since the head portions of the print head are arranged in the sequence of black, cyan, magenta and yellow from below, colors arranged at higher positions are printed later. Hence, it is necessary to store much data for colors arranged at higher positions, and therefore the number of rasters increases in the sequence of K<C<M<Y. The printing method will be described later. The first half 8 rasters held in the buffer storage shown in FIG. 48 are transmitted to the buffer storage shown in FIG. 49, and the second half 8 rasters are moved to the first half in the buffer storage shown in FIG. 48. This is because processing performed in the buffer storage shown in FIG. 48 is performed in units of 16 rasters. The first half 8 rasters which have been processed are transmitted to the buffer storage shown in FIG. 49. FIG. 50 illustrates a buffer storage for storing column data obtained by performing vertical/horizontal conversion of raster data stored in the buffer storage shown in FIG. 49 in accordance with the print head. Printing is realized by transmitting data as shown in FIG. 50 to the print head shown in FIG. 46(A).

Figure 51:
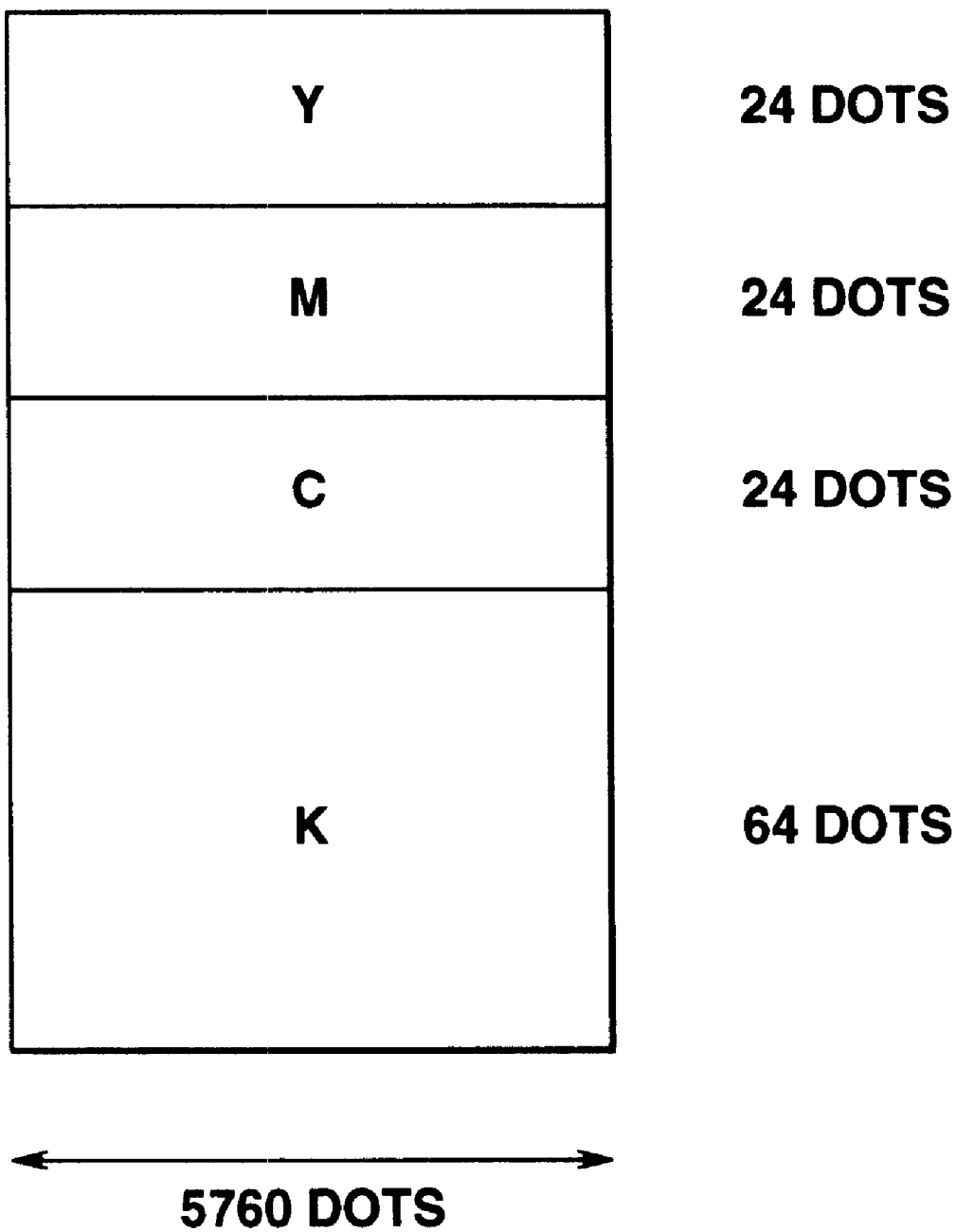
Figure 52:
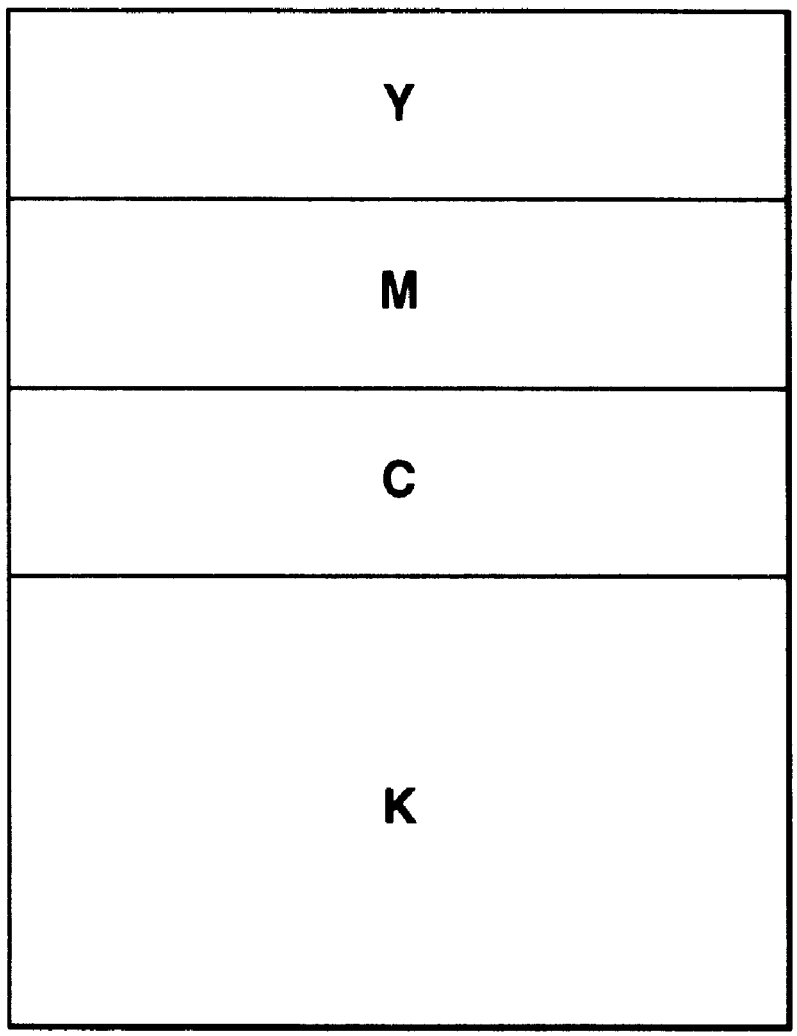

The tranfer of data from the buffer storage shown in FIG. 49 to the buffer storage shown in FIG. 50 is performed when 24 rasters have been stored in the K buffer storage shown in FIG. 49. FIG. 51 is a buffer storage for performing printing-path processing for data corresponding, to the print head formed in the buffer storage shown in FIG. 50. In printing-path processing, for example, printing is performed by superposing printed images a plurality of times (fine printing), or by skipping printing data (draft printing). In the first embodiment, superposition or skipping of data is not performed (high-quality printing). Hence, the same data is stored in both of the buffer storages shown in FIGS. 50 and 51. FIG. 52 illustrates a buffer storage for performing printing-correction processing for data subjected to printing-path processing shown in FIG. 51. Correction processing for a printing buffer storage is processing of performing correction peculiar to a head. In the first embodiment, as shown in FIG. 46, the components of the print head are vertically and linearly arranged. If the components of a print head are obliquely arranged, it is necessary to shift printing data in accordance with the skew of the components (dispersed oblique printing). If a print head has components arranged in a plurality of columns, it is necessary to allocate data for respective components. Such processing is called printing-correction processing. In order to store data subjected to such processing, the buffer storage shown in FIG. 52 has a width for additional+α dots. The data shown in FIG. 52 is transmitted to the print head to perform printing.

Figure 54:
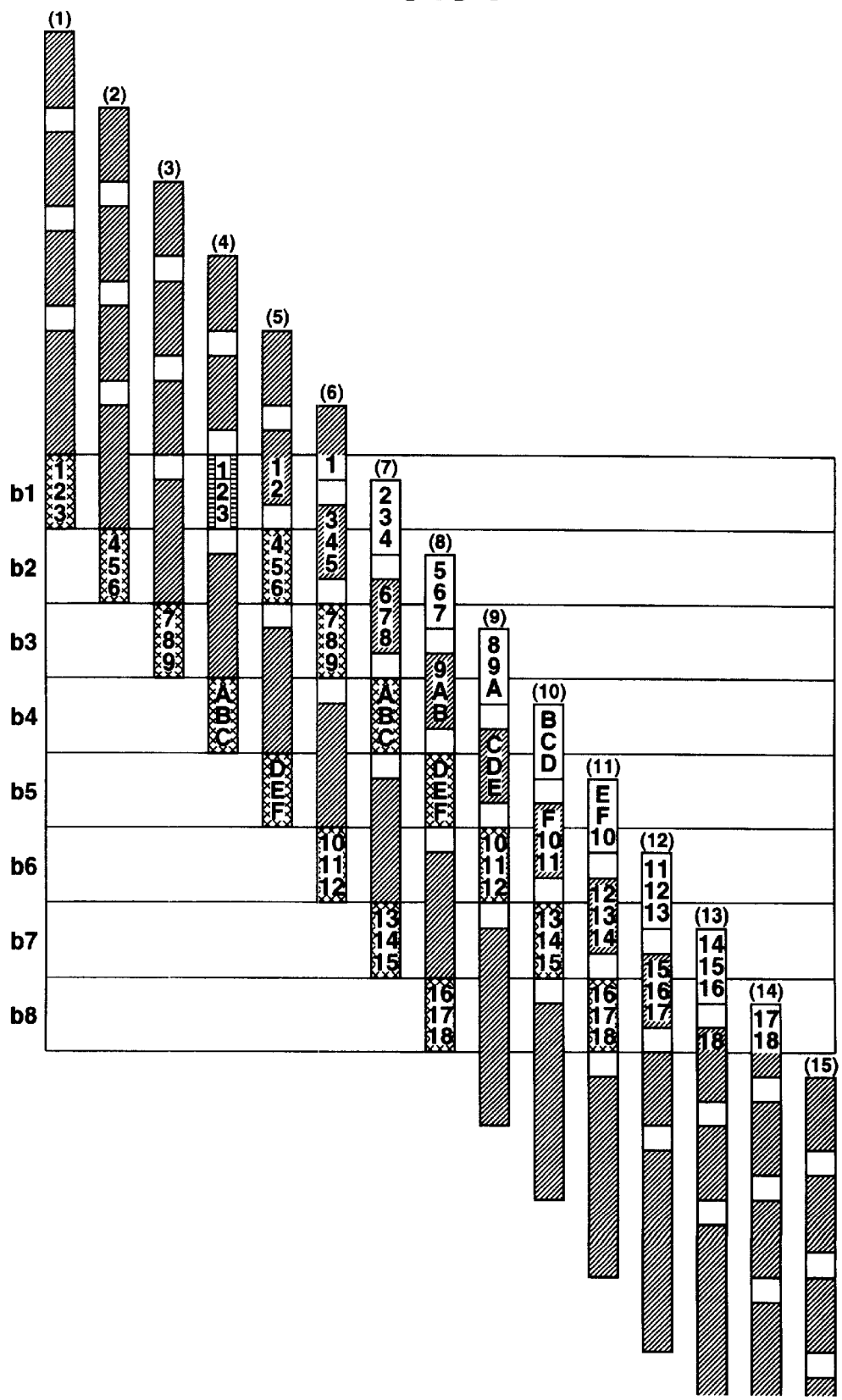
FIG. 54 is a diagram illustrating a printing sequence.
Figure 56:
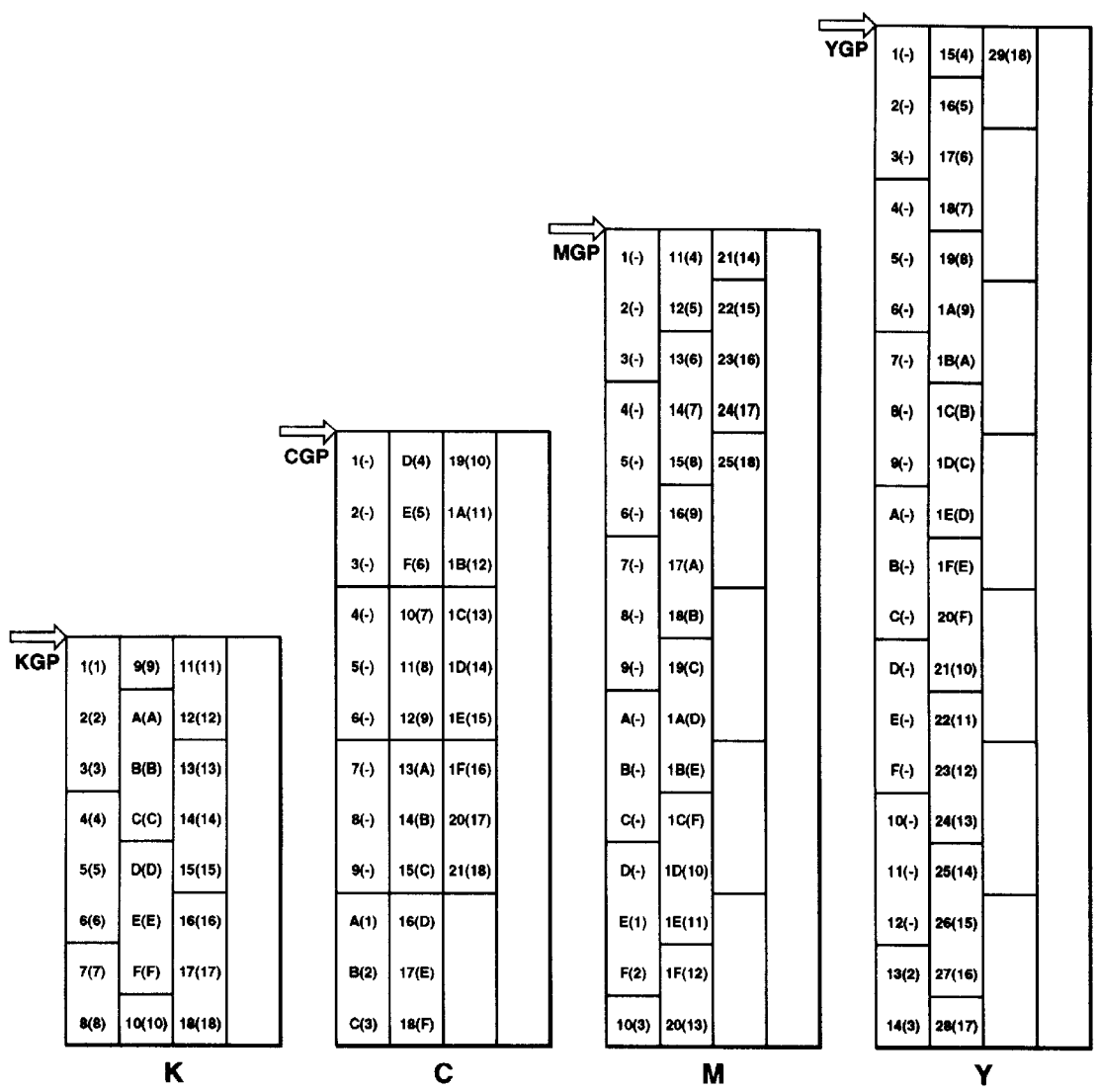
FIG. 56 is a diagram illustrating a sequence of getting image data from the buffer storage.

FIG. 54 is a diagram illustrating printing paths (1)–(15) in the case of high-quality printing. The paths (2)–(15) are shown by being shifted to the right in order to be easily observed. Actually, however, printing is performed at the same lateral position for all of the paths. Each of printing paths (1)–(15) corresponds to the print head. In printing path (1), black data 1, 2 and 3 are printed with 24 dots from the lowest dot of the black ink-jet head. Each of numerals 1, 2, 3, . . . represents a unit of 8 dots (1 byte). There is no image data for remaining 40 dots of the black head (always no image data) and for other three colors (null data). As a result, only black data (1), (2) and (3) are printed on band b1. These black data correspond to (1), (2) and (3) of a K buffer storage shown in FIG. 56, and the other data for three colors correspond to (−), (−) and (−) of C, M and Y buffer storages. A numeral within each parenthesis shown in FIG. 56 indicates data which is actually set, and "−" indicates that image data is null data. Then, feeding for 24 dots is performed, and data (4), (5) and (6) stored in the K buffer storage shown in FIG. 56 are printed at the printing path (2) to provide black dots on band b2. By repeating similar operations, the position of the cyan ink-jet head reaches band b1 at printing path (4), where black data (A), (B) and (C) and cyan data (1), (2) and (3) are printed, i.e., image data (1), (2) and (3) set in A, B and C of the C buffer storage shown in FIG. 56 are printed. At printing path (5), the position of the magenta ink-jet head reaches ⅔ of band b1, where black data (D), (E) and (F), cyan data (4), (5) and (6), and magenta data (−), (1) and (2) are printed, i.e., image data (4), (5) and (6) set in D, E and F of the C buffer storage, and image data (−), (1) and (2) set in D, E and F of the M buffer storage shown in FIG. 56, respectively, are printed. At printing path (6), the position of the yellow ink-jet head reaches ⅓ of band b1, where black data (10), (11) and (12), cyan data (7), (8) and (9), magenta data (3), (4) and (5), and yellow data (−), (−) and (1) are printed, i.e., image data (7), (8) and (9) set in 10, 11 and 12 of the C buffer storage, image data (3), (4) and (5) set in 10, 11 and 12 of the M buffer storage, and image data (−), (−) and (1) set in 10, 11 and 12 of the Y buffer storage, respectively, are printed. At printing path (7), black data (13), (14) and (15), cyan data (A), (B) and (C), magenta data (6), (7) and (8), and yelow data (2), (3) and (4) are printed, i.e., image data (A), (B) and (C) set in 13, 14 and 15 of the C buffer storage, image data (6), (7) and (8) set in 13, 14 and 15 of the M buffer storage, and image data (2), (3) and (4) set in 13, 14 and 15 of the Y buffer storage shown in FIG. 56, respectively, are printed. Null data is printed until the print head reaches a printing band. As a result, a printing operation is not performed.

When printing path (7) has been completed, band b1 is printed with four colors. Color printing has been completed on band b1 and ⅓ of band b2. Upon completion of printing path (14) by repeating printing paths and feeding in a similar manner, printing up to band b8 is completed.

Figure 55:
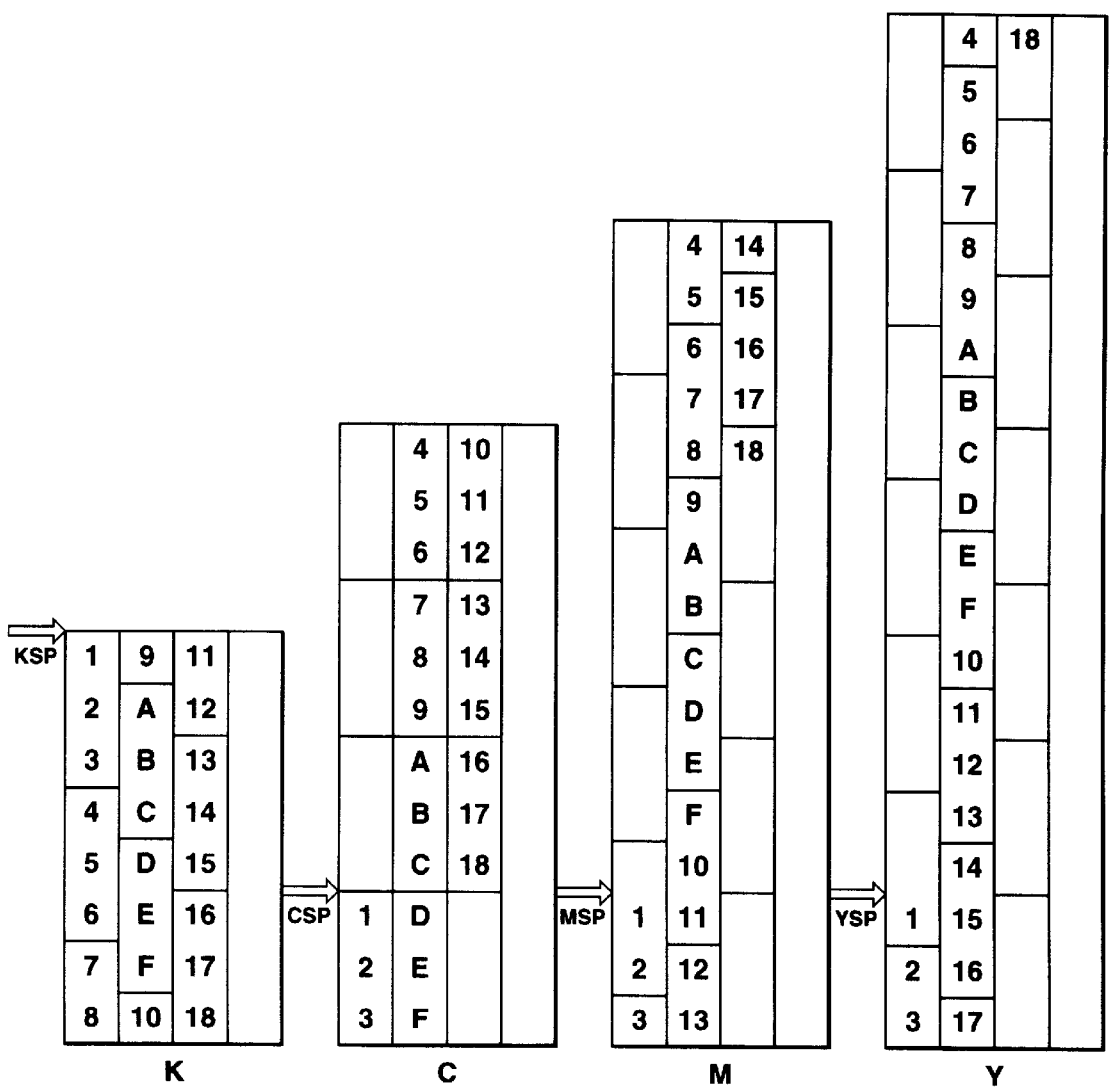
FIG. 55 is a diagram illustrating a sequence of setting image data in a buffer storage.

FIG. 55 is a diagram illustrating a state in which image data is set in the storage buffer shown in FIG. 49. In FIG. 55, KSP, CSP, MSP and YSP indicate positions to start a K-data setting pointer, a C-data setting pointer, an M-data setting pointer and a Y-data setting pointer, respectively. KSP indicates the head of the K buffer storage. Each of CSP, MSP and YSP indicates a position ahead by 24 rasters from the final raster of the corresponding buffer storage. Image data are set to positions indicated by these four pointers. Image data are sequentially set from 1 in units of 8 rasters. When image data have been set to the final raster of the buffer storage, each data setting pointer is returned to the head of the buffer storage, and the buffer storage is repeatedly utilized. Null data is set in advance from the leading position to the initial position of each of CSP, MSP and YSP in each of the C, M and Y buffer storages, respectively. Image data stored in the buffer storage shown in FIG. 48 are taken out in units of 8 rasters, and are set in the buffer storage shown in FIG. 55.

FIG. 56 illustrates the order to take out data from the buffer storage shown in FIG. 49 in order to take out image data set in the buffer storage shown in FIG. 55 and set that data in the buffer storage shown in FIG. 50. In FIG. 56, KGP, CGP, MGP and YGP indicate positions to start a K-data getting pointer, a C-data getting pointer, an M-data getting pointer and a Y-data getting pointer, respectively. Image data is taken out from the position indicated by each pointer. Data are taken out from the positions indicated by KGP, CGP, MGP and YGP from the K buffer storage, the C buffer storage, the M buffer storage and the Y buffer storage, respectively. At printing path (1) shown in FIG. 54, image data 1, 2 and 3 shown in FIG. 56 are taken out. The contents of setting of the buffer storage are shown in FIG. 55. Null data is set for image data 1, 2 and 3 for each of C, M and Y colors, and the null data is taken out when image data is taken out. Notation (−) indicates null data. Null data is provided for each of data 1–9 of the C buffer storage, data 1–D of the M buffer storage, and data 1–11 of the Y buffer.

FIG. 57 is a diagram illustrating pointers and a counter. In FIG. 57, KSP 71-01, CSP 71-02, MSP 71-03 and YSP 71-04 represent pointers indicating the positions to set image data in the K-data buffer storage, the C-data buffer storage, the M-data buffer storage and the Y-data buffer storage, respectively. KGP 71-05, CGP 71-06, MGP 71-07 and YGP 71-08 represent pointers indicating the positions to take out image data from the K-data buffer storage, the C-data buffer storage, the M-data buffer storage and the Y-data buffer storage, respectively. The value of a raster counter RCNT 71-09 is incremented every time image data is set to the position indicated by the KSP, and is cleared when image data is taken out. This counter is used for determining whether or not image data necessary for taking out has been set. Regions for these components are arranged within the RAM 52 shown in FIG. 2.

The operation of the system of the first embodiment will now be described in detail with reference to flowcharts. Procedures shown in the following flowcharts are executed by the CPU of the host computer.

Figure 58:
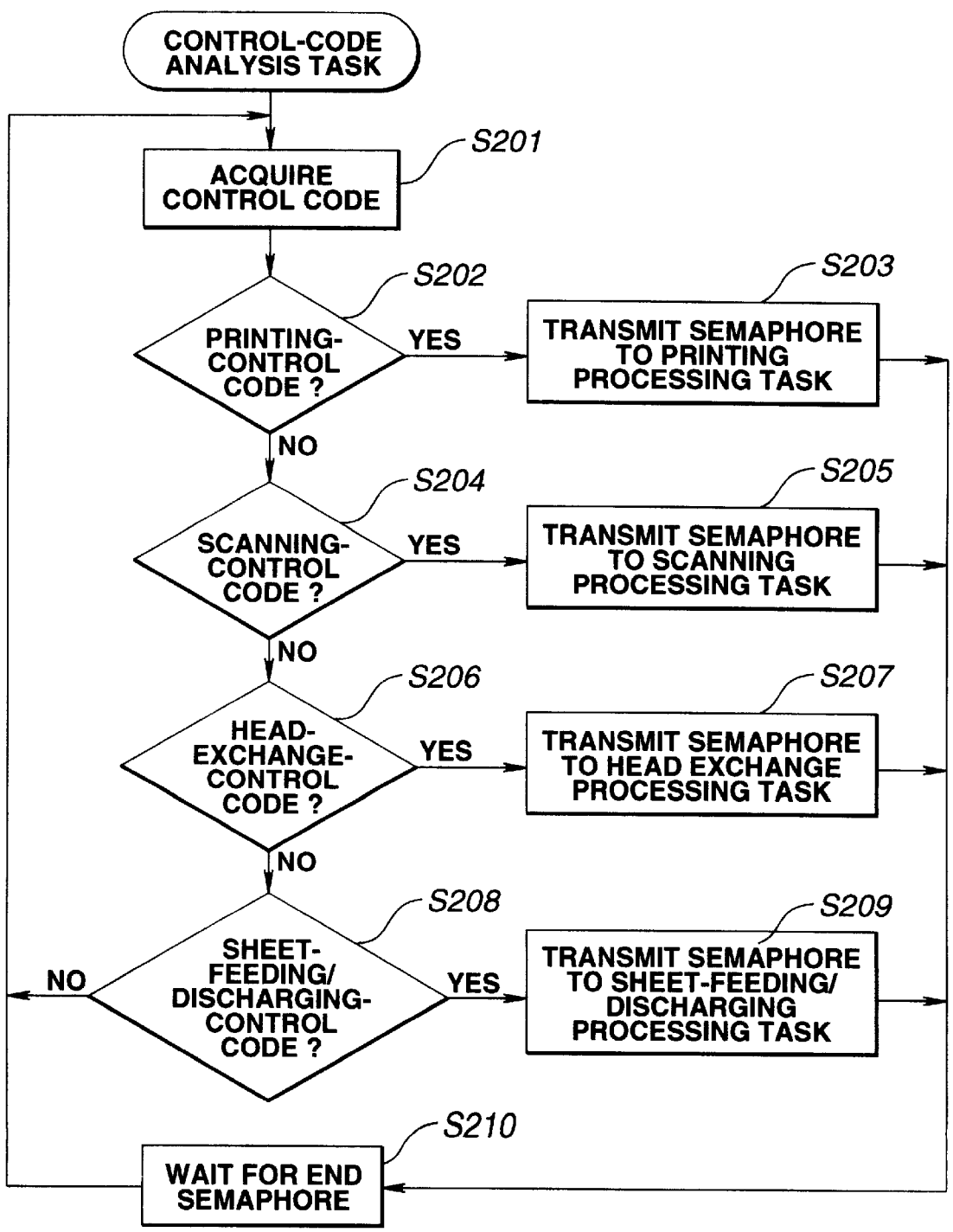
FIG. 58 is a flowchart illustrating a control-code analysis task.

FIG. 58 is a flowchart illustrating the details of Control-Code Analysis Task 62-01 shown in FIG. 42. First, in step S201, a control code is acquired. In the first embodiment, a control code is acquired from WRTOS host application software 4108 shown in FIG. 32. In the second embodiment, a control code is acquired from VCOMM Port Driver 90-09 via RTOS Driver 90-10 shown in FIG. 78.

Upon acquisition of the control code, the process proceeds to step S202, where it is determined if the acquired control code is a printing-control code represented by (1) in FIG. 44. If the result of the determination in step S202 is affirmative, the process proceeds to step S203, where a semaphore is transmitted to Printing Task. The process then proceeds to step S210, where the end of the task is awaited. Each task transmits an end semaphare when the task's own processing has been completed. Control-Code Analysis Task in a waiting state in step S210 proceeds to step S201. If the result of the determination in step S202 is negative, the process proceeds to step S204, where it is determined whether or not the control code is a scanning-control code represented by (2) in FIG. 44. If the result of the determination in step S204 is affirmative, the process proceeds to step S205, where a semaphore is transmitted to Scanning Processing Task. The process then proceeds to step S210, where the end of the task is awaited. If the result of the determination in step S204 is negative, the process proceeds to step S206, where it is determined whether or not the control code is a head-exchange-control code represented by (4) in FIG. 44. If the result of the determination in step S206 is affirmative, the process proceeds to step S207, where a semaphore is transmitted to Head Exchange Processing Task. The process then proceeds to step S210, where the end of the task is awaited. If the result of the determination in step S206 is negative, the process proceeds to step S208, where it is detemined whether or not the control code is a sheet-feeding/discharging-control code, represented by (5) or (6) in FIG. 44. If the result of the determination in step S208 is affirmative, the process proceeds to step S209, where a semaphore is transmitted to Sheet Feeding/Discharging Processing Task. The process then proceeds to step S210, where the end of the task is awaited. If the result of the determination in step S208 is negative, the process proceeds to step S201, where a control code is aquired.

According to the above-described processing, a control code is aquired, a semaphore is transmitted to the task corresponding to the contents of the control code, and a semaphore indicating the end of the task is awaited, so that Control-Code Analysis Task becomes from a Running state to a Waiting state. The task to which Control-Code Analysis Task has transmitted a semaphore using Task Dispatcher assumes a Running state.

Figure 59:
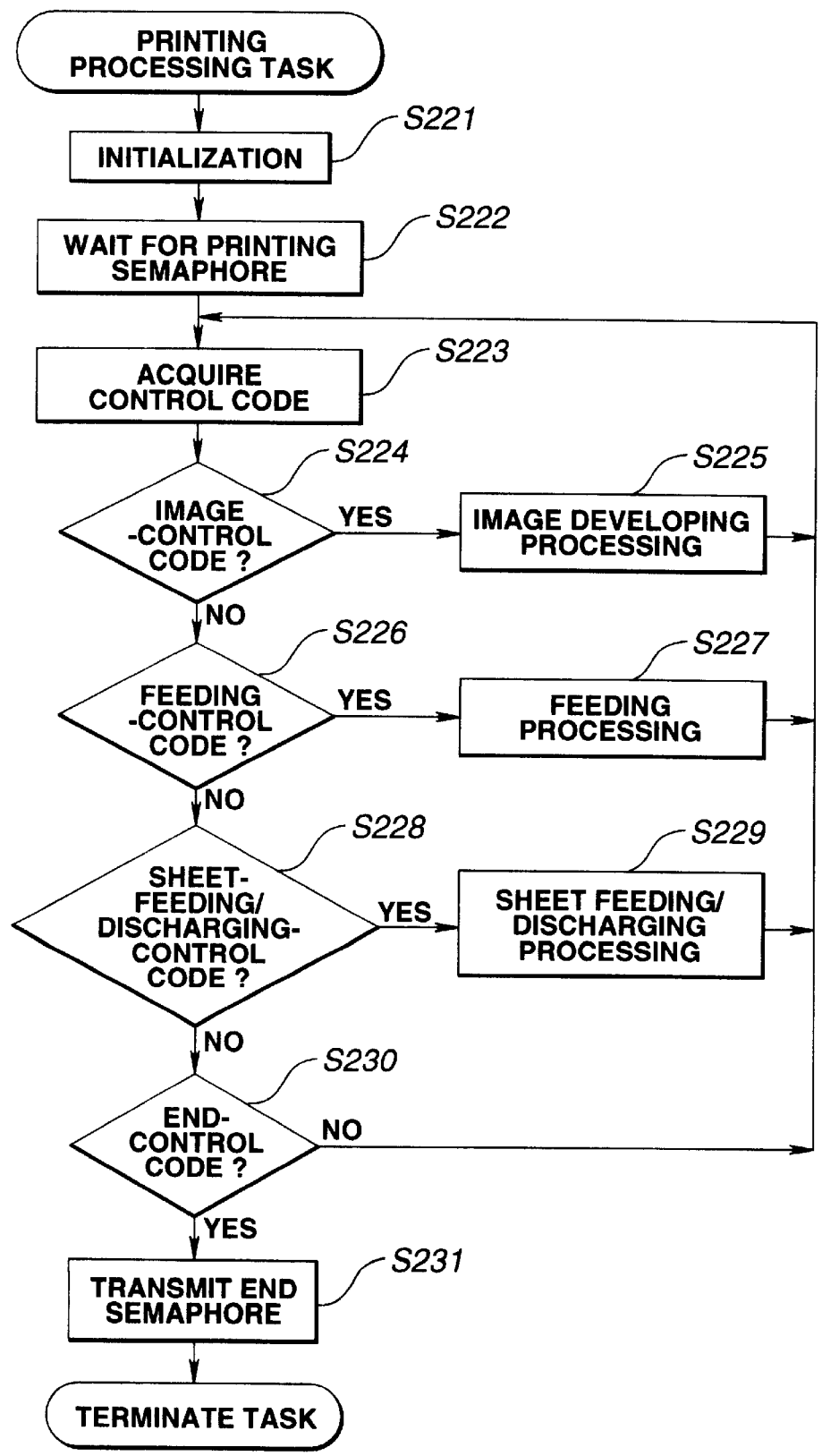
FIG. 59 is a flowchart illustrating printing processing.

FIG. 59 is a flowchart illustrating the details of Printing-Processing Task 62-02 shown in FIG. 42. First, initialization is performed in step S221. In initialization, acquisition and initialization of at least one of the buffer storages shown in FIGS. 47–53, intial setting of pointers shown in FIG. 57, and a carriage initializing operation (described with reference to FIG. 23) are performed. The process then proceeds to step S222, where a semaphore for printing is awaited. Printing Processing Task assumes a waiting state in step S222 until a semaphre for printing is trasmitted. After determining the printing-control code in step S202 of Control-Code Analysis Task described with reference to FIG. 58, a printing semaphore is trasmitted in step S203. Printing Processing Task is in a waiting state in step S222 until the printing semaphore is transmitted. This indicates that the state of the task has changed from a Waiting state to a Running state via a Ready state which are described with reference to FIG. 41. When the printing semaphore has been transmitted, the process proceeds to step S223, where a printing-control code is acquired. When the printing-control code has been acquired, the process proceeds to step S224, where it is determined whether or not the printing-control code is an image-control code represented by (7) in FIG. 44. If the result of the determination in step S224 is affirmative, the process proceeds to step S225, where image developing processing is executed. In the image developing processing, transmitted image data is developed in the buffer storage, and the resultant data is transmitted to the printer unit. The image developing processing will be described in detail with reference to FIG. 60. When data for one raster has been processed in step S225, the process returns to step S223, where the next control code is acquired. If the result of the determination in step S224 is negative, the process proceeds to step S226, where it is determined whether or not the control code is a feeding-control code represented by (9) in FIG. 44. If the result of the determination in step S226 is affirmative, the process proceeds to step S227, where feeding processing is performed. In the feeding processing, a sheet is fed by revolving the feeding motor. The feeding processing will be described in detail with reference to FIG. 63. When the sheet has been fed in the feeding processing, the process returns to step S223, where the next control code is acquired. If the result of the determination in step S226 is negative, the process proceeds to step S228, where it is determined whether or not the control code is a sheet feeding/discharging-control code represented by (5) or (6) in FIG. 44. If the result of the determination in step S228 is affirmative, the process proceeds to step S229, where sheet feeding/discharging processing is performed. In the sheet feeding/discharging processing, a new sheet is fed, or a sheet is discharged. The sheet feeding/discharging processing will be described in detail with reference to FIG. 64. When the sheet has been fed or discharged in the sheet feeding/discharging processing, the process returns to step S223, where the next control code is acquired. If the result of the determination in step S228 is negative, the process proceeds to step S230, where it is determined whether or not the control code is an end-control code represented by (3) in FIG. 44. If the result of the determination in step S230 is negative, the process returns to step S223, where the next control code is acquired. If the result of the determination in step S230 is affirmative, the process proceeds to step S231, where an end semaphore notifying the end of printing processing is transmitted, and Printing Processing Task is terminated. The end of the task indicates that Printing Processing Task in a Running state changes to a Waiting state shown in FIG. 41. According to this series of processing, image data is developed and printing is performed.

Figure 60:
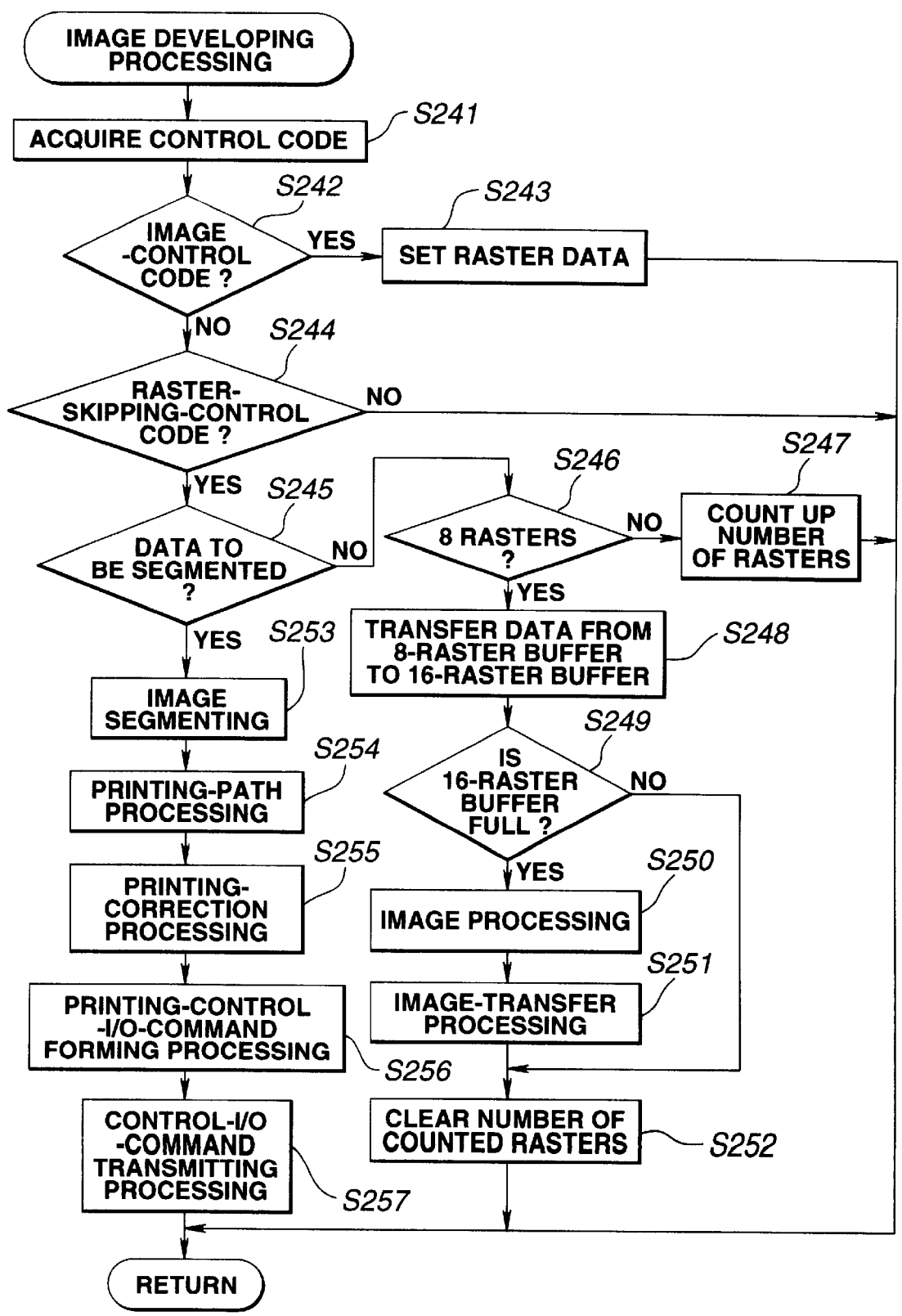
FIG. 60 is a flowchart illustrating image developing processing.

FIG. 60 is a flowchart illustrating the details of the processing of step S225 shown in FIG. 59. First, in step S241, a control code is acquired. The image developing processing is called when the control code represented by (7) or (8) in FIG. 44 is acquired. The process then proceeds to step S242, where it is determined whether or not the acquired control code is an image-control code represented by (7) in FIG. 44. If the result of the determination in step S242 is affirmative, the process proceeds to step S243, where raster data is set. As represented by (7) in FIG. 44, raster image data is discriminated for four colors, and each data is set in the corresponding buffer storage as shown in FIG. 47, which has buffer storages for four colors, i.e., Y, M, C and K, each for 8 rasters. The image data is set to the value of rasters set in the raster counter RCNT shown in FIG. 57 from among 8 rasters. When the image data has been set, the process returns. If the result of the determination in step S242 is negative, the process proceeds to step S244, where it is determined whether or not the control code is a raster-skipping-control code represented by (8) in FIG. 44. This control code advances the raster position by one raster. If the result of the determination in step S244 is negative, the process returns. If the result of the determination in step S244 is affirmative, the process proceeds to step S245, where it is determined whether or not data is to be segmented, based on whether or not K-data for 24 rasters has been newly set in the buffer storage shown in FIG. 49, i.e., whether or not three sets of 8-raster data, such as 1, 2 and 3, or 4, 5 and 6 shown in FIG. 55, have been set from the starting point KSP of the K-data setting pointer in the K buffer storage. If the result of the determination in step S245 is negative, the process proceeds to step S246, where it is determined whether or not the raster counter RCNT has counted 8 rasters. If the result of the determination in step S246 is negative, the process proceeds to step S247, where the value of the raster counter RCNT is incremented by one, and the process returns. If the result of the determination in step S247 is affirmative, the process proceeds to step S248, where data is transferred from the buffer storage for 8 rasters shown in FIG. 47 to the buffer storage shown in FIG. 48. The buffer storage shown in FIG. 48 has a capacity for 16 rasters, which is twice the capacity of the buffer storage shown in FIG. 47. Data in the buffer storage shown in FIG. 47 is first set in a first-half 8-raster portion of the buffer storage shown in FIG. 48. When setting next data, the data is set in a second half portion of the 16-raster buffer storage. The process then proceeds to step S249, where it is determined whether or not data has been transferred to the second-half portion of the buffer storage shown in FIG. 48. If the result of the determination in step S249 is negative, the process proceeds to step S252, where the value of the raster counter RCNT is cleared, and the process returns. If the result of the determination in step S249 is affirmative, the process proceeds to step S250, where image processing is performed. Image processing is performed for 8 rasters set in the first-half portion from among 16 rasters set in the buffer storage shown in FIG. 48, and image data is converted according to the arrangement of data for four colors. This processing is called, for example, boundary detection processing, in which the density of the image data is reduced by replacing adjacent black data by cyan, magenta and yellow data in order to prevent sticking of ink. This processing is performed for the transmitted original data, and the processed data is used for the subsequent processing. The process then proceeds to step S251, where the data provided in step S250 is transferred to the buffer storage for image development shown in FIG. 49. The data for 8 rasters in the first-half portion of the buffer storage shown in FIG. 48 is transferred to the buffer storage shown in FIG. 49. Data for each color is set at a position of the corresponding one of the K-data setting pointer KSP, the C-data setting pointer, the M-data setting pointer MSP and the Y-data setting pointer YSP of the buffer storage shown in FIG. 55. Raster data for one numeral shown in FIG. 55 is transferred from the first-half portion of the buffer storage shown in FIG. 48 to the buffer storage shown in FIG. 49. In the buffer storage shown in FIG. 48 after the data transfer, 8-raster data at the second-half position is transferred to the first-half portion. Then, data set in the buffer storage shown in FIG. 47 is set in the second-half portion of the buffer storage shown in FIG. 48. The process then proceeds to step S252, where the value of the raster counter RCNT is cleared, and the process returns.

If the result of the determintaion in step S245 is affirmative, the process proceeds to step S253, where image segmenting processing is performed. In the image segmenting processing, the image data set in step S251 is taken out from the buffer storage shown in FIG. 49 by an amount necessary for the print head. This processing is performed by taking out three sets of data (24 rasters) numbered in units of a raster from the K-data getting pointer KGP, the C-data getting pointer CGP, the M-data getting pointer MGP and the Y-data getting pointer YGP shown in FIG. 56. The obtained data is raster data, while data to be set in the print head is column data. Accordingly, vertical/horizontal conversion for converting the raster data into column data is performed. Data after the vertical/horizontal conversion is set in the buffer storage shown in FIG. 50. Black data for 64 dots of the print head are secured, and the segmented data for 24 dots are set at a position corresponding to 24 dots from the lowest position of 64 dots. The remaining 40 dots of the black data are cleared, and data is not set in the cleared portion.

The process then proceeds to step S254, where printing-path processing is performed. The printing-path processing is performed for the data segmented in step S253 and set in the buffer storage shown in FIG. 50, and the processed data is set in the buffer storage shown in FIG. 51. The printing-path processing includes, for example, fine printing in which high-precision printing is performed by printing one printing band with a plurality of divided printing operations, and draft printing in which the density of the obtained image is reduced by skipping printing data. These operations are realized by processing printing data. In fine printing, printing data is processed by performing AND processing between a predetermined fine mask pattern and original image data. In draft printing, skipping is performed using a predetermined pattern.

The process then proceeds to step S255, where printing-correction processing is performed. The printing-correction processing is performed for data set in the buffer storage shown in FIG. 51 subjected to the printing-path processing, and the data subjected to the correction processing is set in the buffer storage shown in FIG. 52. The printing-correction processing includes processing of correcting characteristics peculiar to a print head in which printing components are obliquely arranged or printing components are arranged in a plurality of columns. In the first embodiment, for a print head in which printing components are obliquely arranged, printing-correction processing is performed by obliquely arranging printing data in a reverse direction by the amount of skew of the printing components. This is performed by shifting printing data by the corresponding amount, and the obtained data is set in the buffer storage shown in FIG. 52. The process then proceeds to step S256, where printing-control-I/O-control-code forming processing is executed. This processing is performed by adding a printing control I/O command to printing image data corresponding to the print head completed in step S255. A series of printing processing is configured by printing printing data, performing feeding for 24 dots, and returning the print head to the original printing position. The details of this processing will be described with reference to the flowchart shown in FIG. 61. The process then proceeds to step S257, where control-I/O-command transmitting processing is executed. In this processing, the image data and the printing-control-I/O command completed in step S256 is transmitted. The details of this processing will be described with reference to the flowchart shown in FIG. 62. The process then returns.

Figure 61:
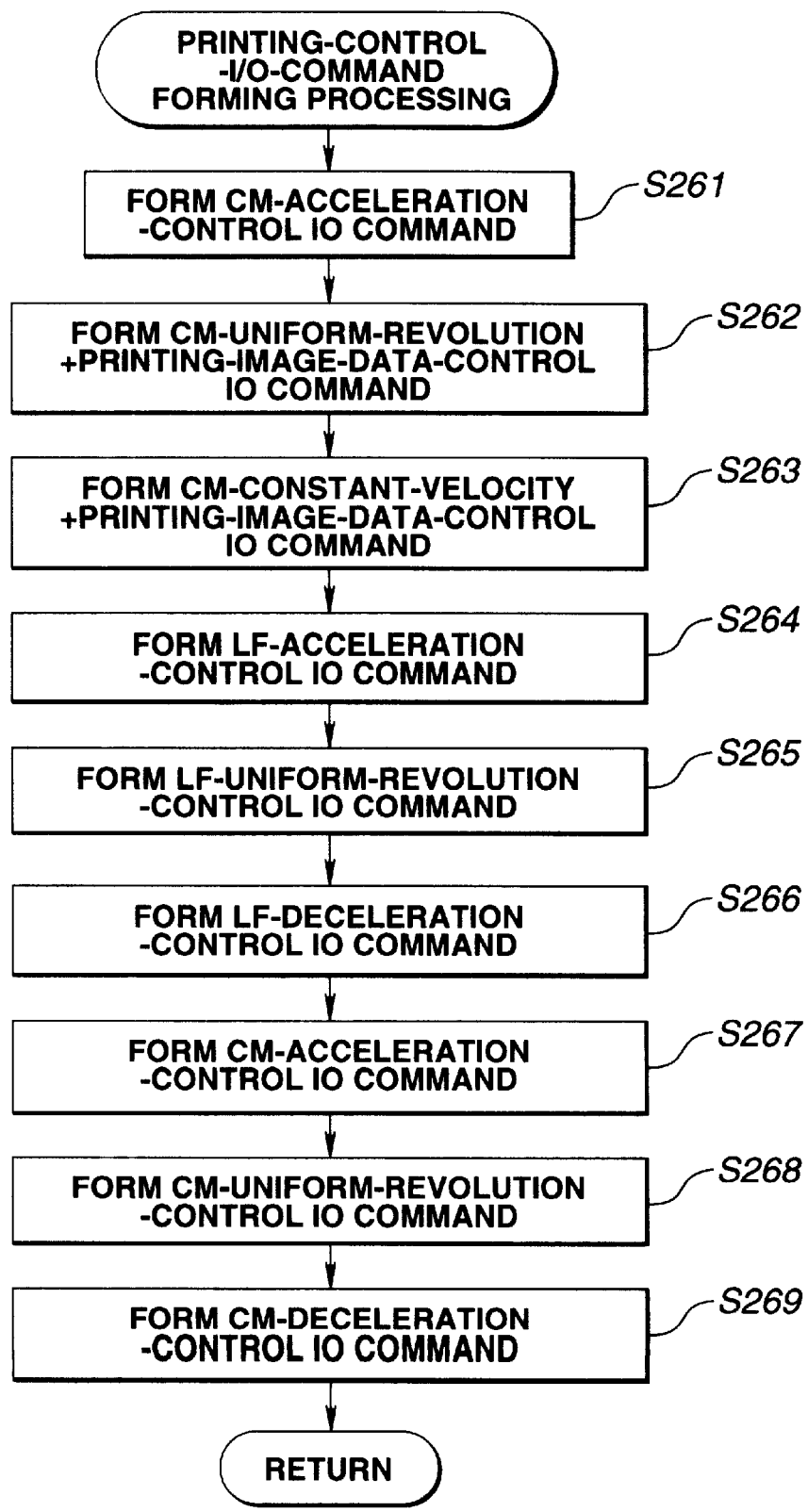
FIG. 61 is a flowchart illustrating printing-control-I/O-command forming processing.

FIG. 61 is a flowchart illustrating the details of the processing of step S256 shown in FIG. 60, and shows printing-control-I/O-command forming processing. In this processing, printing image data is printed by controlling the carriage motor CM for printing, performing line feeding by controlling the line feeding motor, and returning the carriage motor to the position before printing.

First, in step S261, an acceleration-control-I/O command for the carriage motor CM is formed. This command includes the control I/O commands shown in FIG. 27. For the control of the carriage motor CM for printing, the carriage motor is first accelerated, is then set to uniform revolution, during which printing data is discharged from the print head, and is decelerated after printing the image data. Then, in step S262, control I/O commands for uniform revolution of the carriage motor CM and for a discharging operation of the print head are formed in accordance wih the image data formed in step S255 shown in FIG. 60. The CM-uniform-revolution control I/O commands are the control I/O commands shown in FIG. 26. The CM-uniform-revolution-control I/O commands including printing image data is formed using these control-I/O commands and adding heating-data-register control I/O commands and the heating scanning trigger (shown in FIG. 18) to the image data. Then, in step 263, control I/O commands for decelerating the carriage motor CM are formed. The CM-deceleration control I/O commands are the control I/O commands shown in FIG. 29. In steps S261–S263, printing control I/O commands for the carriage motor is formed.

Then, in step S264, control I/O commands for accelerating the line feeding motor LF are formed. The LF-acceleration control I/O commands are the control I/O commands shown in FIG. 28. Then, in step S265, control I/O commands for uniform revolution of the line feeding motor LF are formed. When performing feeding of 24 dots, however, the uniform-revolution control I/O commands are not formed. Then, in step S266, control I/O commands for decelerating the line feeding motor LF are formed. The LF-deceleration control I/O commands are the control I/O commands shown in FIG. 31. In steps S264–S266, feeding control I/O commands for performing feeding of 24 dots by the line feeding motor LF are formed.

Then, in step S267, control I/O commands for accelerating the carriage motor CM are formed. The CM-acceleration control I/O commands are the control I/O commands shown in FIG. 25. Then, in step S268, control I/O commands for uniform revolution of the carriage motor CM are formed. The CM-uniform-revolution control I/O commands are control I/O commands shown in FIG. 26. Then, in step S269, control I/O commands for decelerating the carrige motor CM are formed. The CM-deceleration control I/O commands are the control I/O commands shown in FIG. 27. In steps S267–S269, control I/O commands for returning the carriage motor are formed. The return control I/O commands are for moving the carriage motor CM in a reverse direction. Hence, control I/O commands for inverting the direction of revolution of the carrige motor CM are included in the commands formed in step S267. According to the above-described processing, control I/O commands for performing line feeding and returning the carrige motor CM to the original position are formed.

Figure 62:
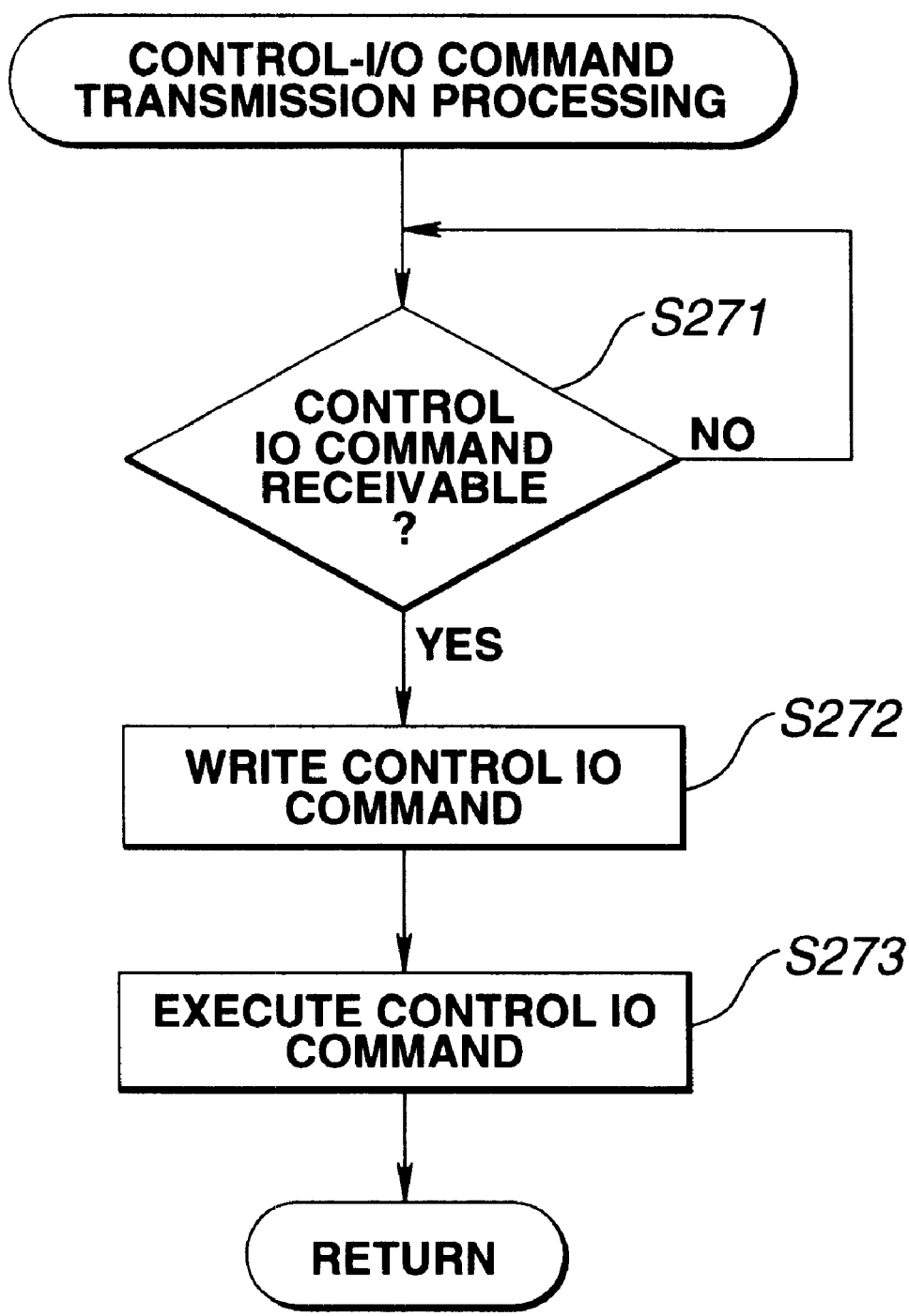
FIG. 62 is a flowchart illustrating printing-control-I/O-command transmission processing.
Figure 72:
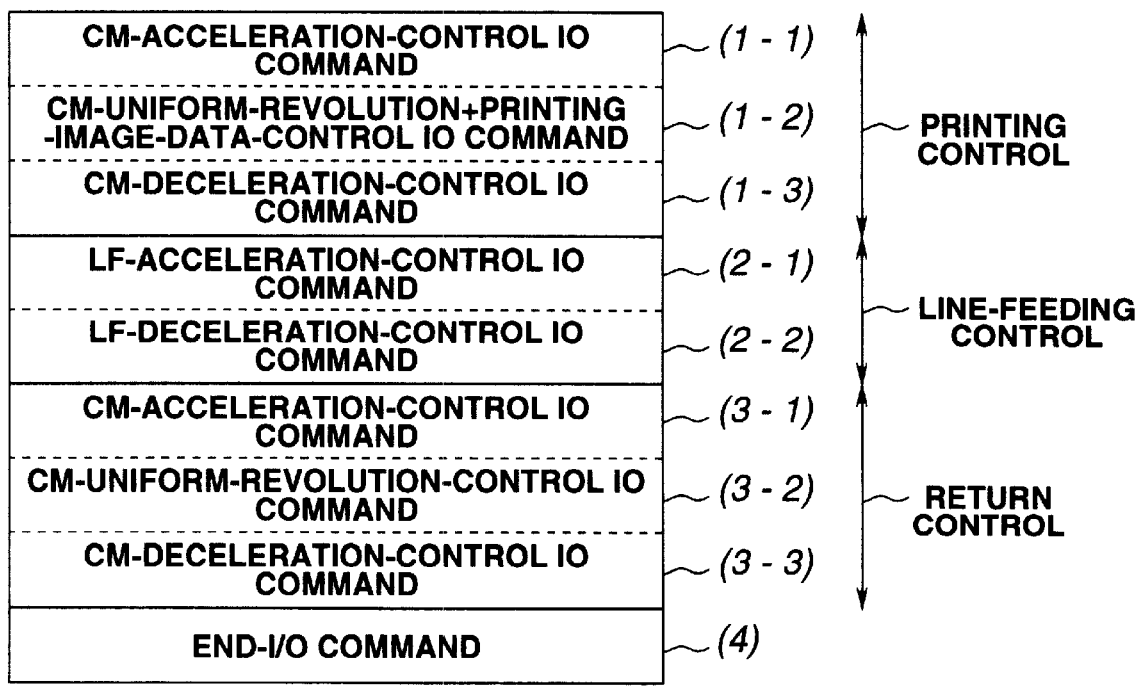
Figure 73:
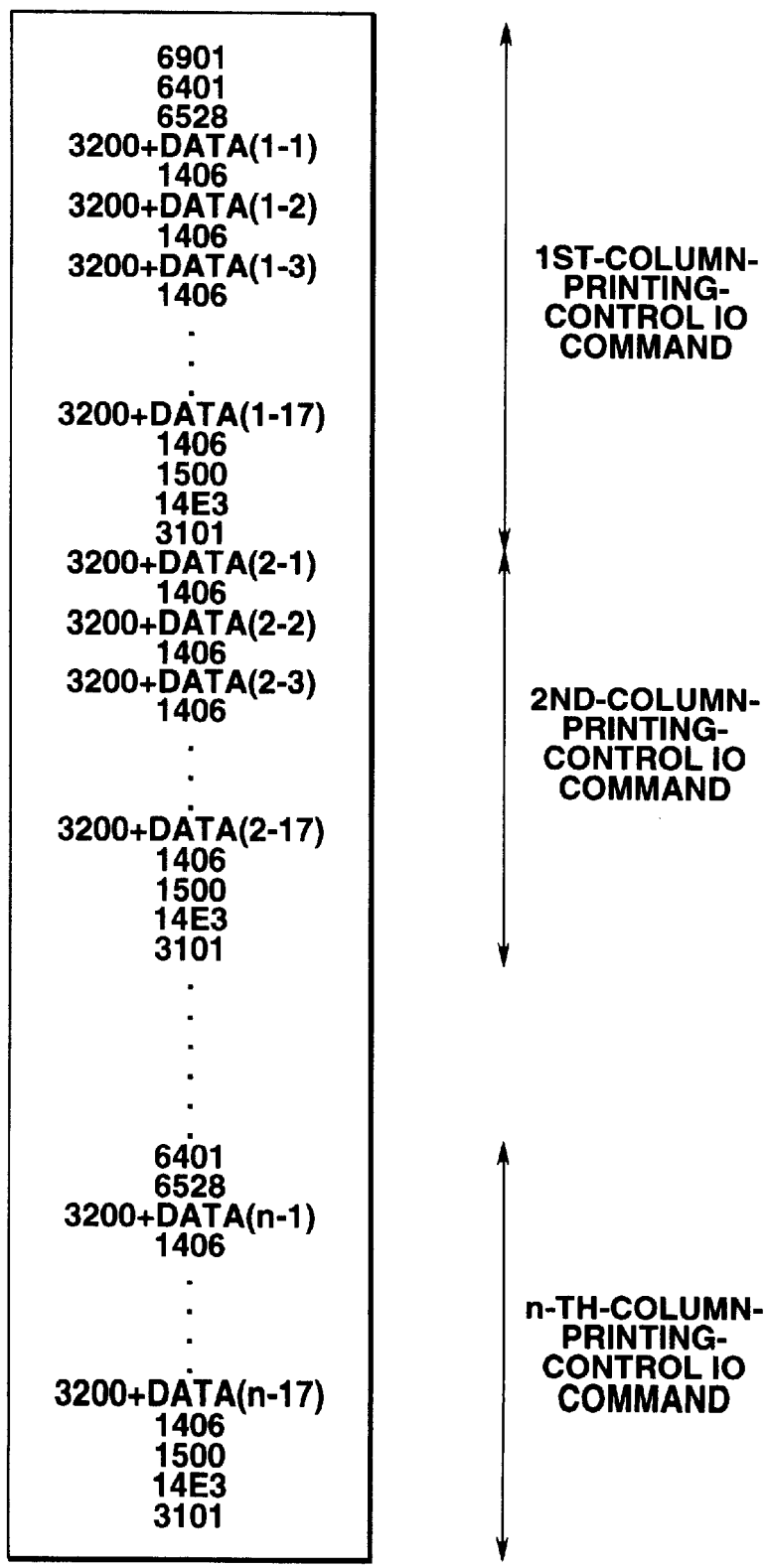

FIG. 62 is a flowchart illustrating the details of the processing of step S257 shown in FIG. 60. Control-I/O-command transmission processing is processing for transmitting printing control I/O commands formed in step S256 to the printer unit. First, in step S271, it is determined whether or not the printer unit can receive control I/O commands, by checking the value of BP-start shown in FIG. 10. If the value of BP-start is 0, it indicates that the printer unit can receive control I/O commands. If the printer unit cannot receive control I/O commands, the process of step S271 is repeated. If the result of the determination in step S271 is affirmative, the process proceeds to step S272, where a control I/O command for the address of a port to be connected to the printer unit is written. The port for writting the control I/O command is shown in FIG. 6(c), and data is written in the address of this port. FIGS. 72–74 illustrate the details of the printer memory shown in FIG. 7 after data writing. In FIG. 72, control I/O commands for printing control (1-1)–(1-3), line-feeding control (2-1)–(2-2) and return control (3-1)–(3-3) are set in the printer memory. In FIG. 72, reference numeral (1-1) represents the CM-acceleration control I/O commands formed in step S261 shown in FIG. 61. The contents of these commands are shown in FIG. 25. Reference numeral (1-2) represents the control I/O commands for CM uniform revolution and printing image formed in step S262 shown in FIG. 61, which will be described with reference to FIG. 73. Reference numeral (1-7) represents CM-deceleration control I/O commands formed in step S263 shown in FIG. 61. The contents of these commands are shown in FIG. 27. Reference numeral (2-1) represents the LF-acceleration control I/O commands formed in step S264 shown in FIG. 61. The contents of these commands are shown in FIG. 28. Reference numeral (2-2) represents the LF-deceleration control I/O commands formed in step S266 shown in FIG. 61. The contents of these commands are shown in FIG. 29. Reference numeral (3-1) represents the CM-acceleration control I/O commands formed in step S267 shown in FIG. 61. The contents is these commands are shown in FIG. 25. Reference numeral (3-2) represents the CM-uniform-revolution control I/O commands formed in step S268 shown in FIG. 61. The contents of these commands are shown in FIG. 26. Reference numeral (3-3) represents the CM-deceleration control I/O commands formed in step S269 shown in FIG. 61. The contents of these commands are shown in FIG. 27. Reference numeral (4) represents an end control I/O command, which corresponds to BP-end shown in FIG. 10. The execution of the control I/O commands is terminated at BP-end.

FIG. 73 illustrates the contents of the commands (1-2) shown in FIG. 72, which are configured so as to execute printing by adding image data to the uniform-revolution control shown in FIG. 26. FIG. 73 illustrates control from the first column to the n-th column. In FIG. 73, commands 6901–6528 are the same as those shown in FIG. 25. Commands of portions 3200+data are control-I/O commands for transmitting data to the heating-control register in order to discharge image data. The control I/O command 3200 is for the heating-data register at address 32 HDR shown in FIG. 18. The heating-data register is a heating register for printing, which corresponds to the print head. The details of this register are shown in FIG. 13. Data (1-1)–(1-17) are data for one column of the print head. The data configuration is shown in FIG. 74. Command 1406 next to 3200+data is a control I/O command for assigning a time interval for data transmission, which equals two microseconds. Commands 1500 and 14E3 after 3200+data (1-17) perform time setting for each column. Within the time period up to this point, a time period for ink discharge is adjusted to a time period for the movement of the carriage. Command 3101 assigns discharge of image data set in address 31 HDRUN shown in FIG. 18. Thus, printing control for one column is performed. Printing for n columns can be realized by repeating the same processing to the n-th column.

FIG. 74 is a diagram illustrating the printing positions of printing data from the first column to the n-th column. This corresponds to a printing image formed by the processing up to step S255 shown in FIG. 60. After writing control I/O commands, the process proceeds to step S273, where execution of the control I/O commands is instructed. The execution of the control I/O commands is instructed and written in the control-I/O-commands control port shown in FIG. 6(*a*). This operation is performed by writing "1" to BP-start shown in FIG. 10. The execution of the control I/O command is performed in accordance with the procedures described with reference to the timing chart shown in FIG. 10. According to the above-described processing, the transmission of the control I/O commands to the printer unit and the execution of the control I/O commands are realized.

Figure 63:
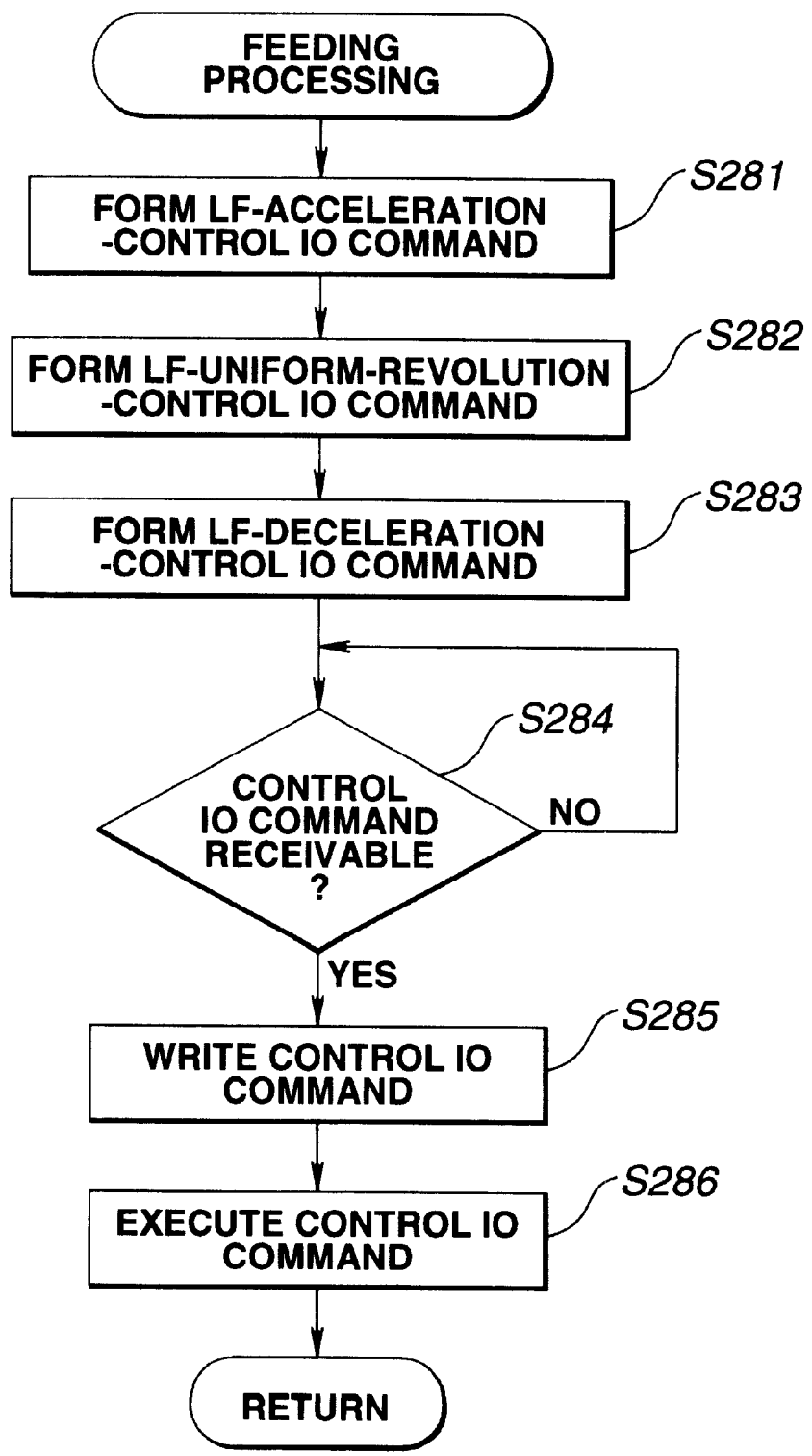
FIG. 63 is a flowchart illustrating feeding processing.

FIG. 63 is a flowchart illustrating the details of the process of step S227 shown in FIG. 59, i.e., feeding processing. The feeding processing is processing for the control code (9) shown in FIG. 44. First, in step S281, acceleration control I/O commands for the line feeding motor are formed. Then, in step S282, uniform-revolution control I/O commands for the line feeding motor LF is formed. The uniform-revolution control I/O commands are formed so that uniform revolution continues for the value set in feed of the control code (9) shown in FIG. 44. Then, in step S283, deceleration control I/O commands for the line feeding motor LF are formed. Then, in step S284, it is determined whether or not the printer unit can receive the control I/O commands. If the printer unit cannot receive the control I/O commands, the process of step S284 is repeated. If the result of the determination in step S284 is affirmative, the process proceeds to step S285, where the control I/O commands are written in the addresses of the port to be connected to the printer unit. This operation is the same as step S272 shown in FIG. 62. Then, in step S286, the control I/O commands are executed. According to the above-described processing, the processing for feeding control codes is performed to execute feeding.

Figure 64:
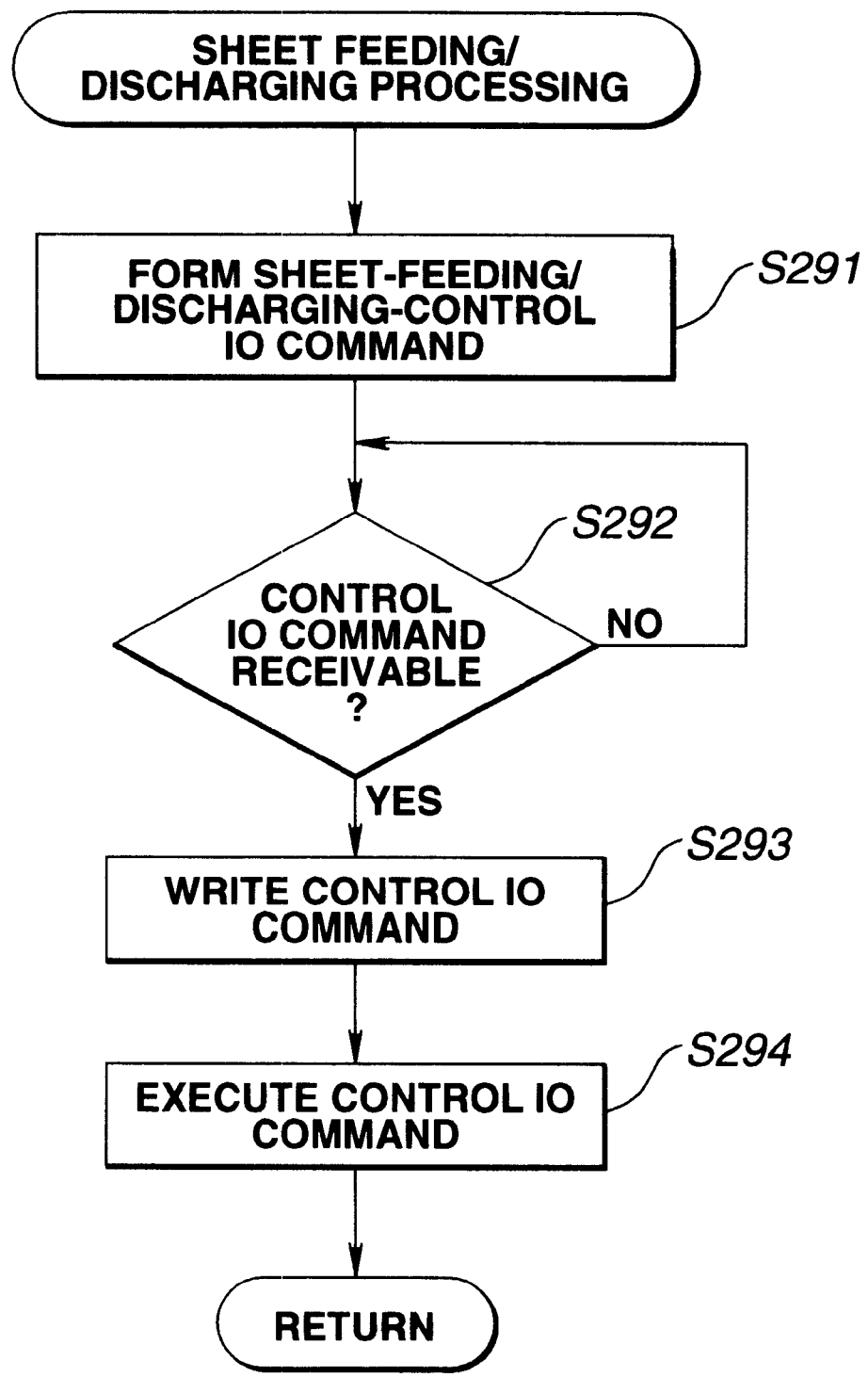
FIG. 64 is a flowchart illustrating sheet feeding/discharging processing.

FIG. 64 is a flowchart illustrating the details of the process of step S229 shown in FIG. 59, i.e., sheet feeding/discharging processing. First, in step S291, control I/O commands for sheet-feeding control codes or sheet-discharging control codes are formed. Then, in step S292, it is determined whether or not the printer unit can receive the control I/O commands. If the printer unit cannot receive the control I/O commands, the process of step S292 is repeated. If the result of the determination in step S292 is affirmative, the process proceeds to step S293, where the control I/O commands are written in addresses of the port to be connected to the printer unit. This operation is the same as step S272 shown in FIG. 62. Then, in step S294, the control I/O commands are executed. Thus, the sheet feeding/discharging processing is realized.

A description has been provided of printing processing with reference to FIGS. 59–64.

Figure 65:
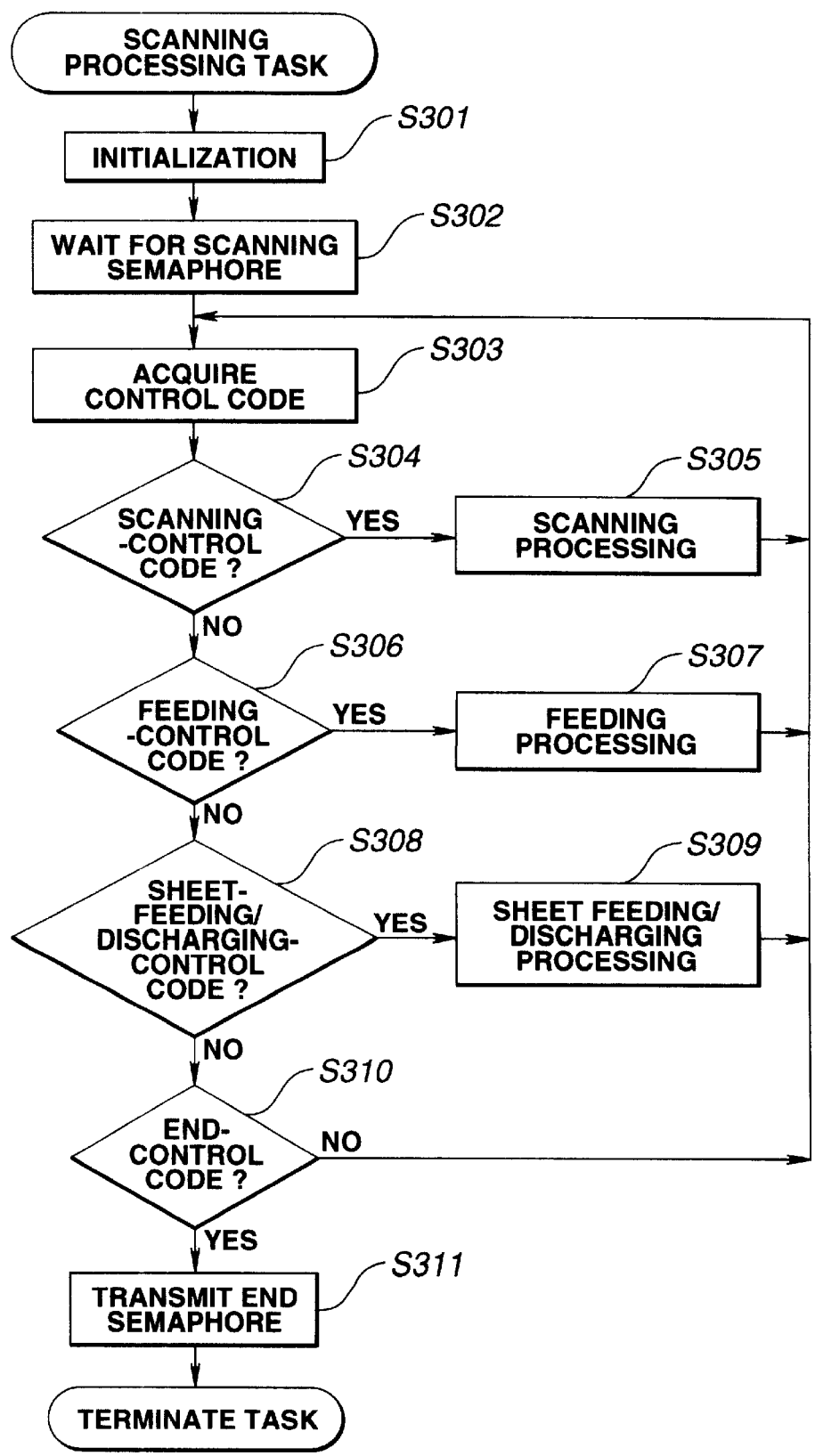
FIG. 65 is a flowchart illustrating a scanning processing task.

FIG. 65 is a flowchart illustrating the details of Scanning Processing Task 62-03 shown in FIG. 42. First, in step S301, initialization is performed. The process then proceeds to step S302, where a semaphore for scanning is awaited. The Scanning Processing Task is in a waiting state in step S302 until a semaphore for scanning is transmitted. In Control-Code Analysis Task shown in FIG. 58, after determining a scanning-control code in step S204, a scanning semaphore is transmitted in step S205. Scanning Processing Task is in a waiting state until that time. This indicates that the state of the task has changed from a Waiting state to a Running state via a Ready state shown in FIG. 41. When a printing semaphore has been transmitted, the process proceeds to step S303, where a scanning-control code is acquired. Upon reception of a scanning-control code, the process proceeds to step S304 in order to analyze the scanning-control code, i.e., it is determined whether or not the received code is a scanning-control code. The scanning-control code is represented by (10) shown in FIG. 44. If the received code is this control code, the process proceeds to step S305. In step S305, scanning processing is performed, and scanned image data can be returned to scanning application software. The details of this processing will be described with reference to the flowchart shown in FIG. 66. Processing from step S306 to step S311 is the same as the processing from step S226 to step S231 of Printing Processing Task shown in FIG. 59, and a further description thereof will be omitted.

Figure 66:
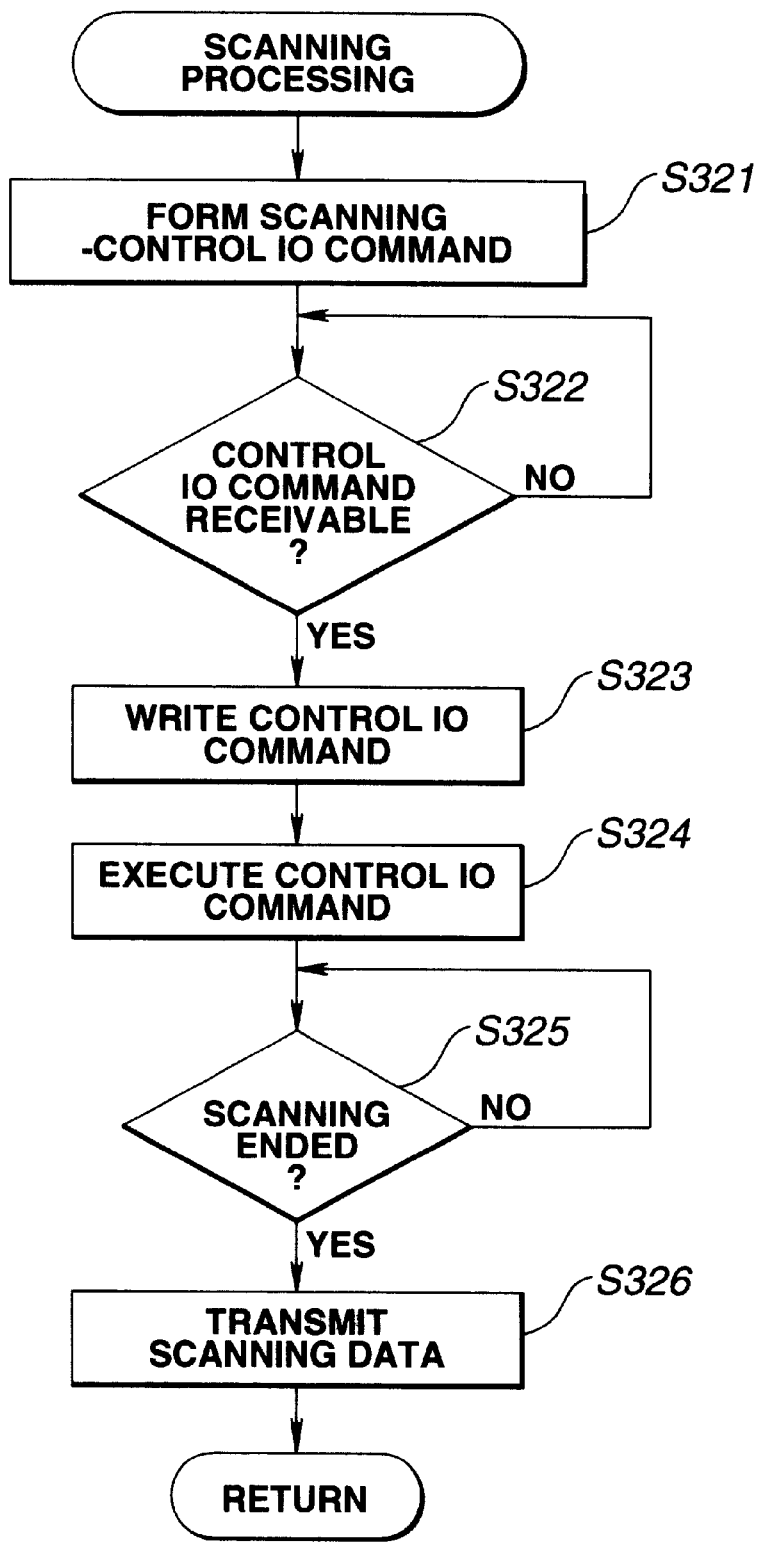
FIG. 66 is a flowchart illustrating scanning processing.

FIG. 66 is a flowchart illustrating the details of the process of step S305 shown in FIG. 65. First, in step S321, scanning control I/O commands are formed. These commands are control I/O commands for performing a scanning operation. In this operation, the carriage motor CM is accelerated and is then set to uniform revolution. Then, scanned data is read from the scanner head and the read data is stored, and the carriage motor CM is decelerated. Then, feeding for the scanner head is performed and the carriage is returned. The process then proceeds to step S322, where it is determined whether or not the printer unit can receive the control I/O commands. If the printer unit cannot receive the control I/O commands, the process of step S322 is repeated. If the result of the determination in step S322 is affirmative, the process proceeds to step S323, where the control I/O commands are written in addresses of the port to be connected to the printer unit. This operation is the same as step S272 shown in FIG. 62.

Figure 75:
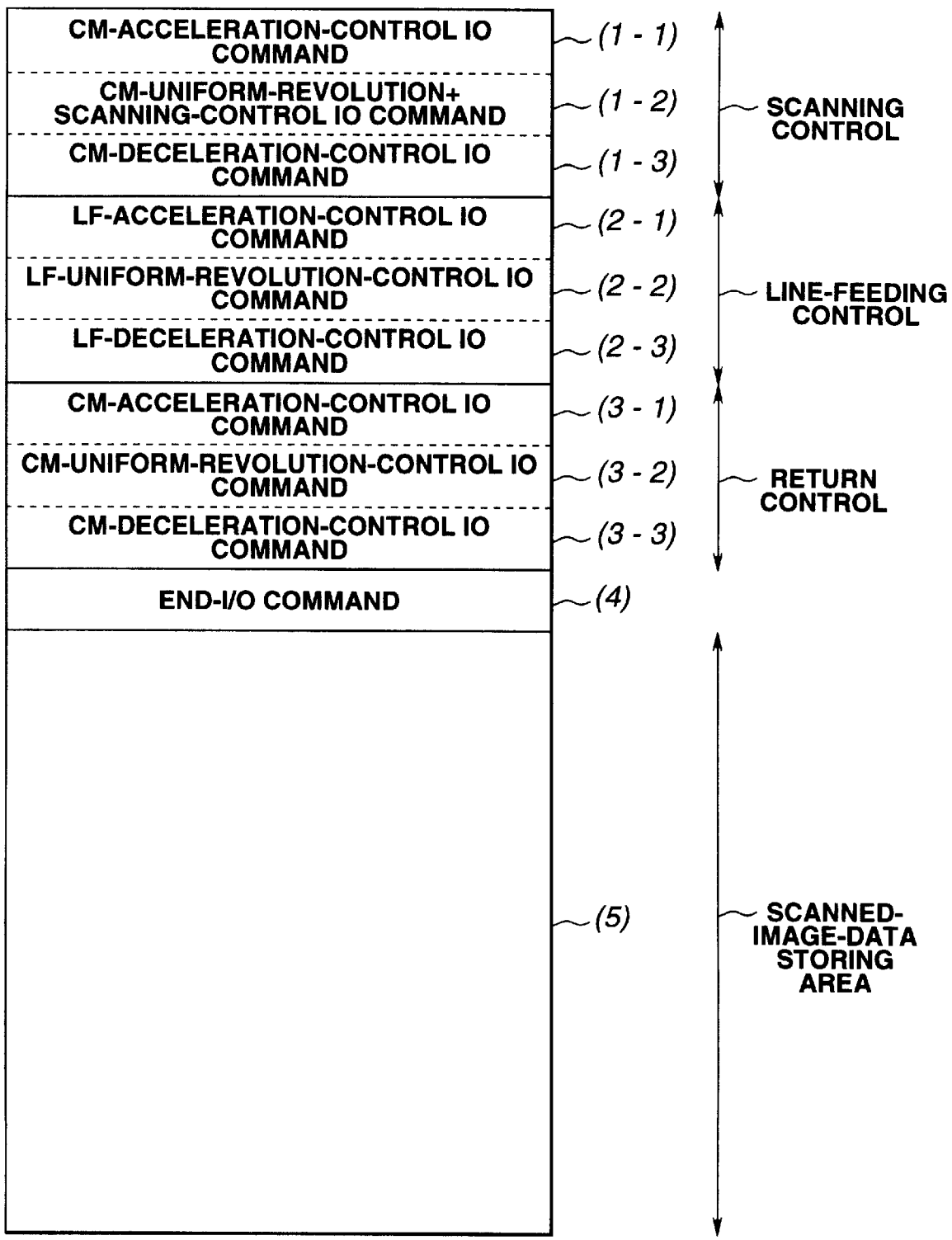
Figure 76:
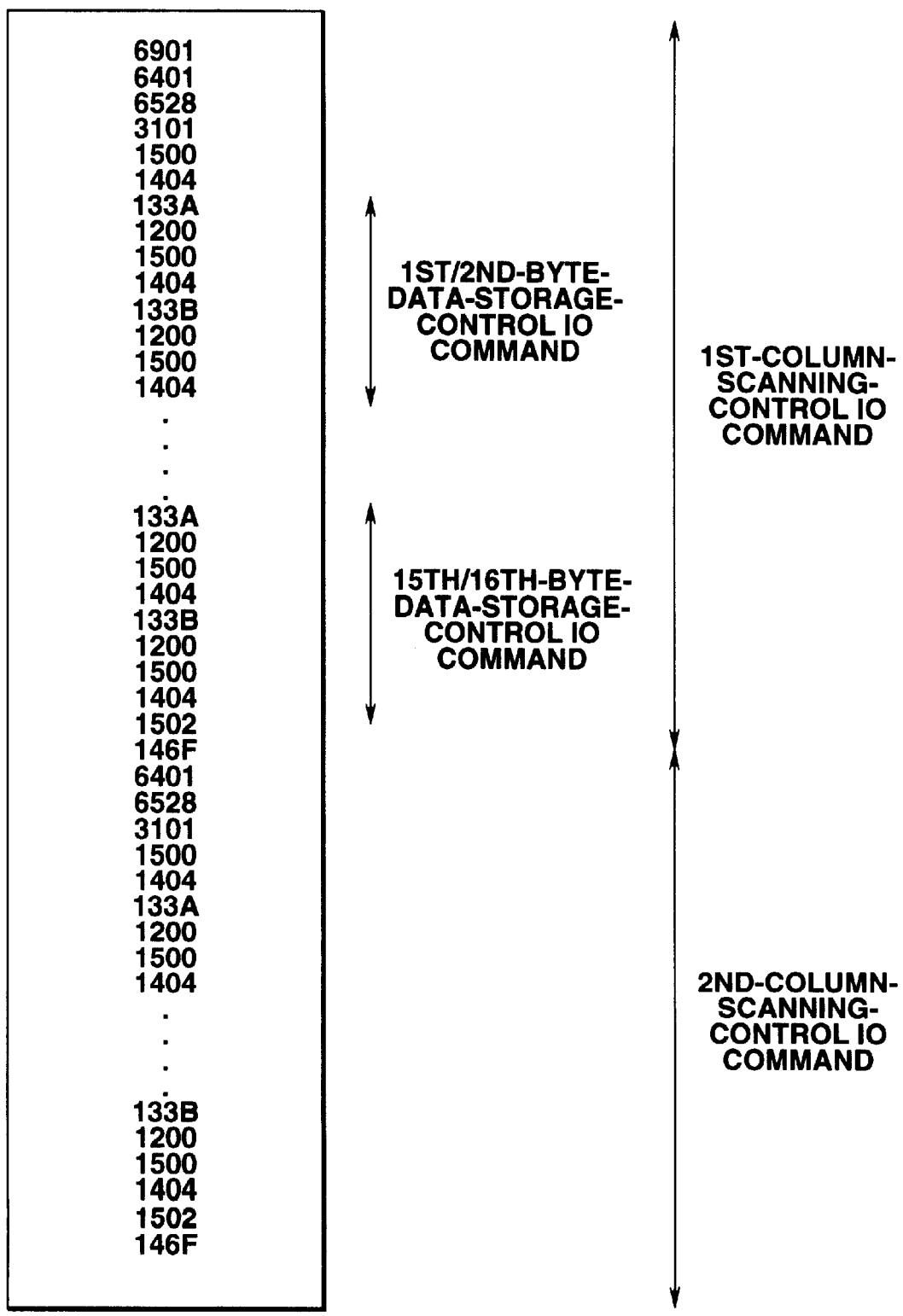

FIGS. 75–77 illustrate the details of the printer memory shown in FIG. 7 after writing data. In FIG. 75, control I/O commands for scanning control (1-1)–(1-3), line-feeding control (2-1)–(2-3), and return control (3-1)–(3-3) are set in the printer memory. In FIG. 75, reference numeral (1-1) represents the CM-acceleration control I/O commands formed in step S261 shown in FIG. 61. The contents of these commands are shown in FIG. 25. Reference numeral (1-2) represents scanning control I/O commands for CM uniform revolution and acquisition of image data. The details of these commands will be described with reference to FIG. 76. Reference numeral (1-3) represents CM-deceleration control I/O commands formed in step S263 shown in FIG. 61. The contents of these commands are shown in FIG. 27. Reference numeral (2-1) represents the LF-acceleration control I/O commands formed in step S264 shown in FIG. 61. The contents of thse commands are shown in FIG. 28. Reference numeral (2-2) represents the LF-uniform-revolution control I/O commands formed in step S282 shown in FIG. 63. The contents of these commands are shown in FIG. 28. Reference numeral (2-3) represents the LF-deceleration control I/O commands formed in step S266 shown in FIG. 61. The contents of these commands are shown in FIG. 29. Reference numeral (3-1) represents the CM-acceleration control I/O commands formed in step S267 shown in FIG. 61. The contents is these commands are shown in FIG. 25. Reference numeral (3-2) represents the CM-uniform-revolution control I/O commands formed in step S268 shown in FIG. 61. The contents of these commands are shown in FIG. 26. Reference numeral (3-3) represents a control command which is the same as the CM-deceleration control I/O commands formed in step S269 shown in FIG. 61. The contents of these commands are shown in FIG. 27. Reference numeral (4) represents an end control I/O command, which corresponds to BP-end shown in FIG. 10. The execution of the control I/O commands is terminated at BP-end. Reference numeral (5) represents a scanned-image-data storing area for storing scanned image data for one line until the end of scanning.

FIG. 76 is a diagram illustrating the contents of the commands (1-2) shown in FIG. 75, obtained by adding image-data-acquisition control I/O commands to commands for uniform revolution shown in FIG. 26 in order to execute scanning. FIG. 76 illustrates control from the first column to the second column. Control is performed until the n-th column by repeating similar processing. In FIG. 76, commands from 6901 to 6528 are the same as those shown in FIG. 25. Commands 3101, 1500, 1404, 133A, 1200, 133B and 1200 are control I/O commands for instructing scanning for one column, and taking out data of the scanning head for two bytes and storing the obtained data in the scanned-image-data storage area. Command 3101 assigns a timing for receiving image data with address 31 HDRUN shown in FIG. 18. Commands 133A, 1200, 133B and 1200 are for transferring scanned image data from registers 3A and 3B storing the image data (see FIG. 18) to the scanned-image-data storing area (5) shown in FIG. 75.

FIG. 77 illustrates the configuration of scanned image data. Commands 1502 and 14CF after a scanning operation for one column and storage of 16-byte image data perform time setting for each column. A time period for scanning is adjusted to a time period for moving the carriage within the total time period up to this point. Thus, scanning control for one column is realized. Scanning for n columns can be realized by repeating the same processing until the n-th column. In FIG. 77, columns from the first column to the nth column are shown in the horizontal direction, and the first through 16-th bytes for providing 128 dots are shown in the vertical direction.

Returning to FIG. 66, in the next step S324, the control I/O commands are executed. This operation is the same as step 5273 shown in FIG. 62. Then, in step S325, it is determined whether or not scanning has been completed by executing the control I/O commands transmitted to the printer unit. If the scanning is not completed, the process of step S325 is repeated. If the result of the determination in step S325 is affirmative, the process proceeds to step S326, where the scanned image data is transmitted to scanning application software. The scanned image data is stored in the printer unit and is read from the printer unit in step S326. The reading of the image data is performed by the port shown in FIG. 6(c). FIG. 38 illustrates the configuration of a task for performing a scanning operation and Windows scanner application software.

Image data scanned in the printer unit according to the scanning processing shown in FIGS. 65 and 66 can be transmitted to scanning application software.

Figure 67:
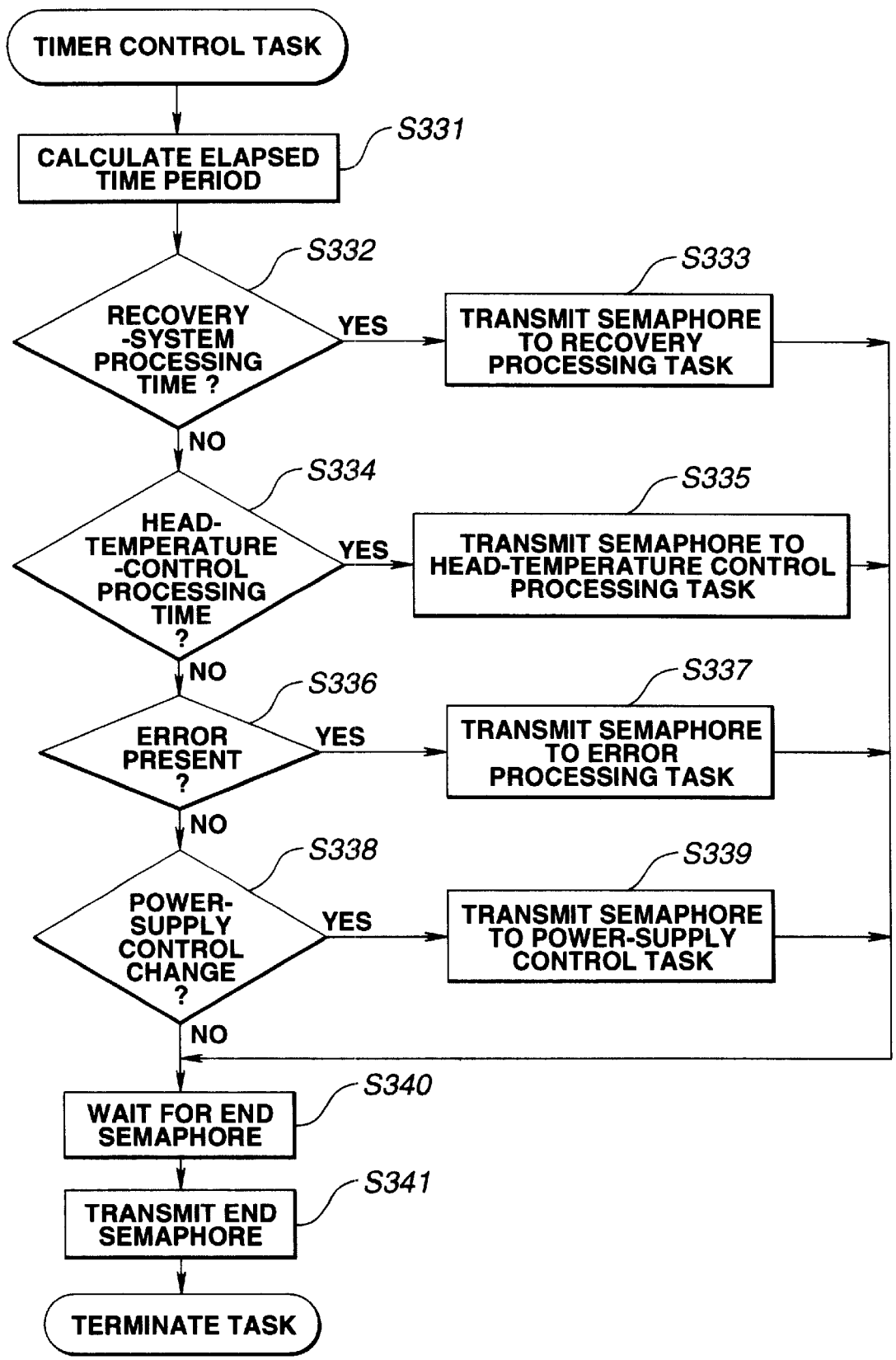
FIG. 67 is a flowchart illustrating a timer control task.

FIG. 67 is a flowchart illustrating the details of Timer Control Task 62-06 shown in FIG. 42. Timer Control Task is called at a predetermined time interval by Timer of Task Controller shown in FIG. 40. In step S331, the elapsed time period is calculated. Since Timer Controller is called at the predetermined time interval, the elapsed time period can be calculated from the number of calling operations. The process then proceeds to step S332, where it is determined whether or not the current time is a recovery-system-processing time, in order to execute processing for a recovery system at a predetermined time interval based on the time period calculated in step S331. If the result of the determination in step S332 is affirmative, the process proceeds to step S333, where a semaphore is transmitted to Recovery-System Processing Task. The process then proceeds to step S340, where an end semaphore is awaited. If the result of the determination in step S332 is negative, the process proceeds to step S334, where it is determined whether or not the current time corresponds to a print-head-temperature control processing time. If the result of the determination in step S334 is affirmative, the process proceeds to step S335, where a semaphore is transmitted to Print-Head Temperature Control Processing Task. The process then proceeds to step S340, where an end semaphore is awaited. If the result of the determination in step S334 is negative, the process proceeds to step S336, where it is determined whether or not an error is present. If the result of the determination in step S336 is affirmative, the process proceeds to step S337, where a semaphore is transmitted to Error Processing Task. The process then proceeds to step S340, where an end semaphore is awaited. If the result of the determination in step S336 is negative, the process proceeds to step S338, where it is determined whether or not power-supply control has changed. If the result of the determination in step S338 is affirmative, the process proceeds to step S339, where a semaphore is transmitted to Power-Supply Control Task. The process then proceeds to step S340, where an end semaphore is awaited. The process then proceeds to step S341, where an end semaphore for Timer Control Task is transmitted.

Figure 68:
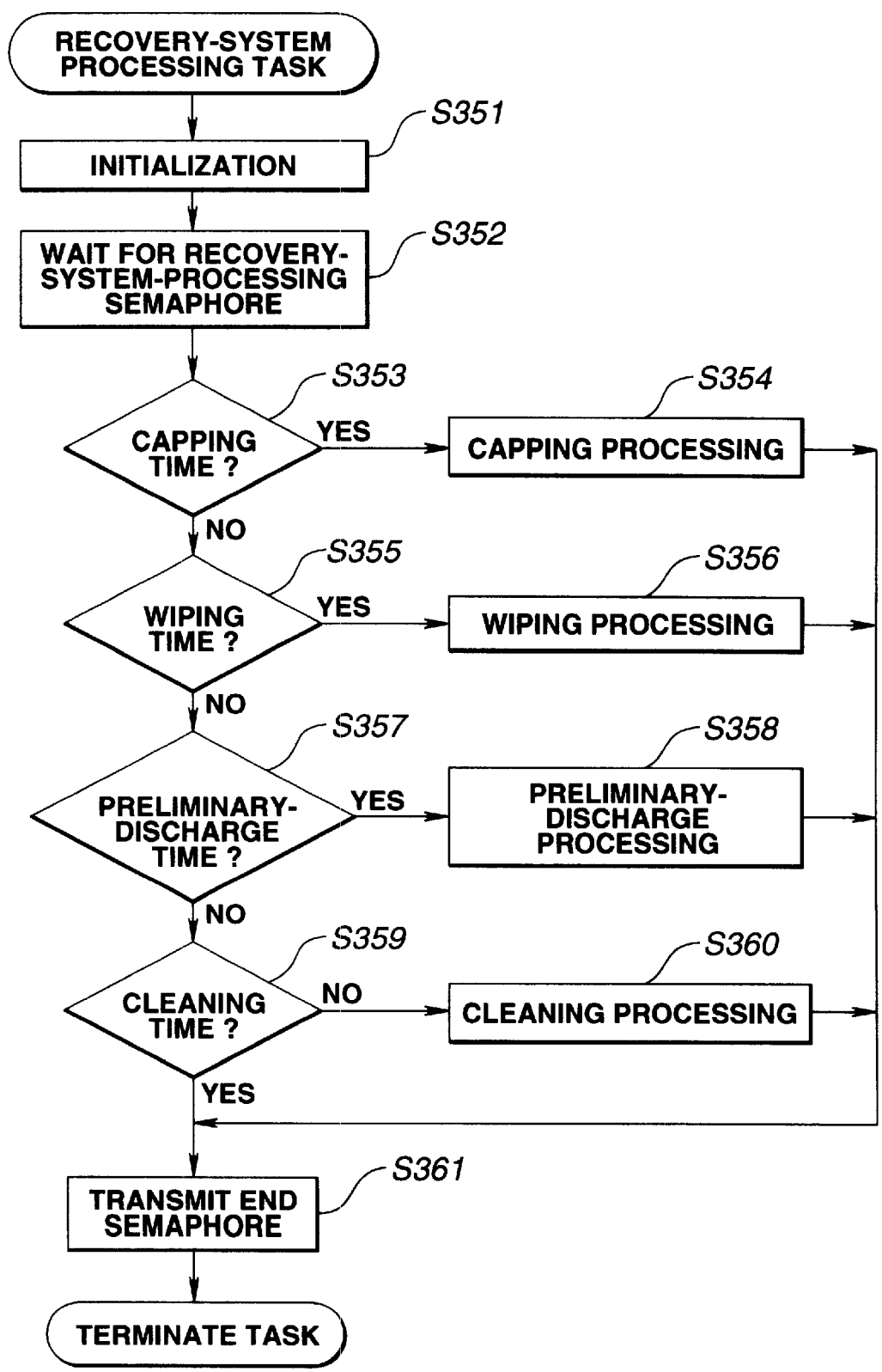
FIG. 68 is a flowchart illustrating a recovery-system processing task.

FIG. 68 is a flowchart illustrating the details of Recovery-System Processing Task 62-07 shown in FIG. 42. First, in step S351, initialization is performed. Then, in step S352, a semaphore to Recovery-System Processing Task is awaited. When a semaphore to Recovery-System Processing Task has been transmitted in step S333 shown in FIG. 67, the process proceeds to step S353 to proceed to recovery-system processing. In step S353, it is determined whether or not the current time corresponds to a capping time, based on the time period elapsed from the last printing time. If the result of the determination in step S353 is affirmative, the process proceeds to step S354, where capping processing is performed. This processing is performed for preventing ink from drying while printing is not performed by the print head, by moving the carriage to a capping position and capping the print head. When printing is continuously performed, a printing time period increases if capping is performed at every printing operation. Hence, capping is performed only when printing is not performed for a predetermined time period after the last printing operation. The process then proceeds to step S361, where an end semaphore is transmitted. If the result of the determination in step S353 is negative, the process proceeds to step S355, where it is determined whether or not the current time corresponds to a wiping time, based on the time period elapsed from the immediately-preceding wiping time. If the result of the determination in step S355 is affirmative, the process proceeds to step S356, where wiping processing is executed. This processing is processing for wiping surplus ink adhered to the print head. The wiping processing is performed at every predetermined printing time interval in such a manner that the carriage is moved to a wiping position, and surplus ink is wiped using a wiping blade in order to prevent, for example, color mixture due to the surplus ink. The process then proceeds to step S361, where an end semaphore is transmitted. If the result of the determination in step S355 is negative, the process proceeds to step S357, where it is determined if the current time corresponds to a preliminary discharging time, based on the time period elapsed from the immediately preceding preliminary discharging time. If the result of the determination in step S357 is affirmative, the process proceeds to step S358, where preliminary discharging processing is executed. This processing is processing for preventing the print head from being clogged. The preliminary discharging processing is performed at every printing time interval in such a manner that the carriage is moved to a preliminary discharging position, and a predetermined amount of ink is discharged in order to prevent the print head from being clogged with ink. The process then proceeds to step S361, where an end semaphore is transmitted. If the result of the determination in step S357 is negative, the process proceeds to step S359, where it is determined whether or not the current time corresponds to a cleaning time, based on the time period elapsed from the immediately preceding cleaning time. Cleaning is also performed at the start of a printing operation. If the result of the determination in step S359 is affirmative, the process proceeds to step S360, where cleaning processing is executed. This processing includes preliminary discharging processing for preventing the print head from being clogged, and wiping processing of wiping surplus ink adhered to the print head. By performing preliminary discharging processing and wiping processing, the print head can be cleaned so as to be maintained in an optimum state. The process then proceeds to step S361, where an end semaphore is transmitted.

Figure 69:
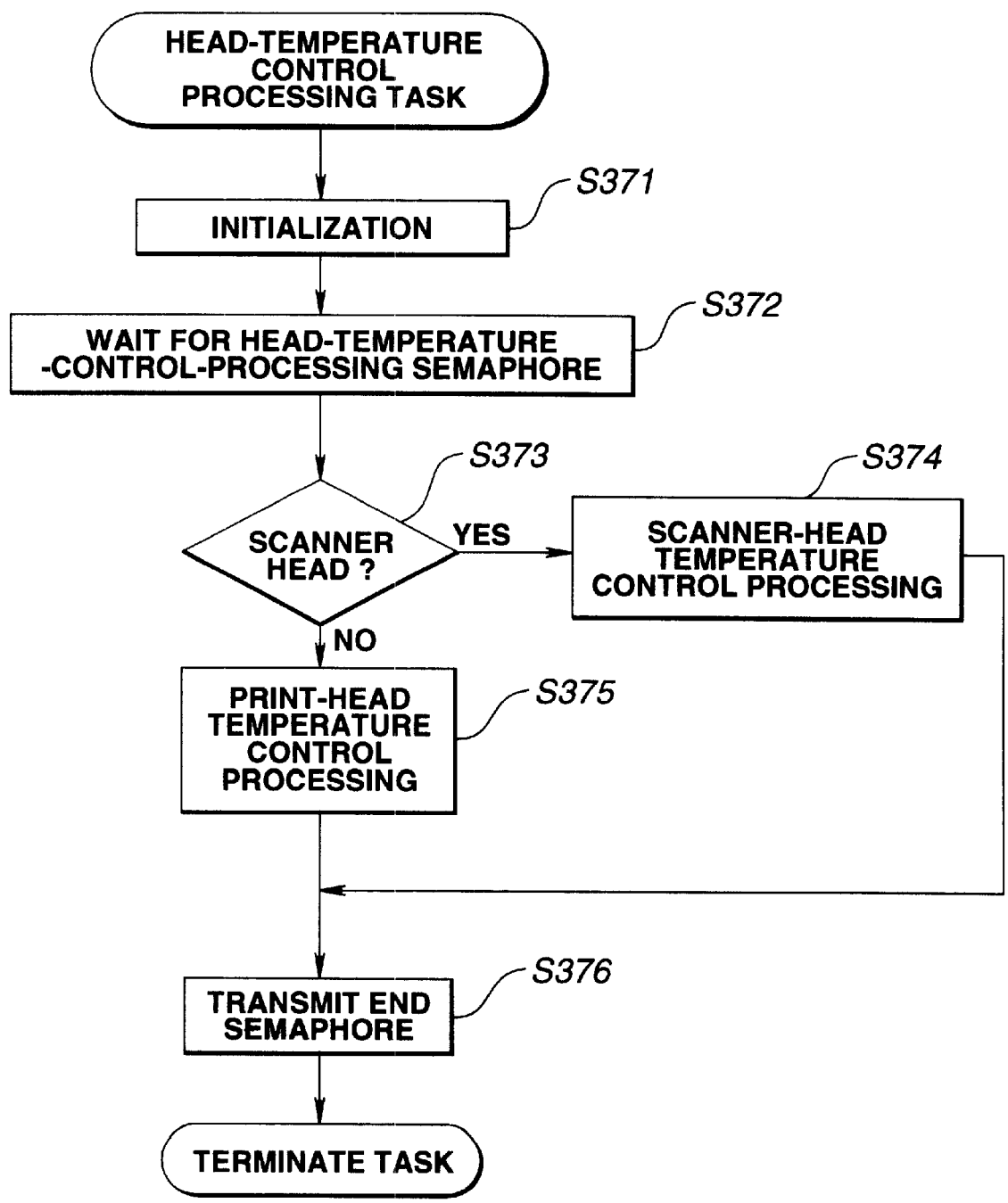
FIG. 69 is a flowchart illustrating a head-temperature control processing task.

FIG. 69 is a flowchart illustrating the details of Head-Temperature Control Processing Task 62-08 shown in FIG. 42. First, in step S371, initialization is performed. Then, in step S372, a semaphore for Head-Temperature Control Processing Task is awaited. When a semaphore for Head-Temperature Control Processing Task is transmitted in step S335 shown in FIG. 67, the process proceeds to step S373, where temperature control processing for the corresponding head is performed. In step S373, it is determined whether the head mounted in step S373 is a print head or a scanner head. If the head is a scanner head, the process proceeds to step S374, where temperature-control processing for the scanner head is executed. In this processing, the light source mounted in the scanner head is lit in advance for a necessary time period so that the light source can always be lit with at least a predetermined amount of light. The process then proceeds to step S376, where an end semaphore is transmitted. If the head is not a scanner head as the result of the determination in step S373, the process proceeds to step S375, where print-head temperature control processing is performed. In this processing, the heaters of the print head are heated in advance so that the print head can discharge ink in a constant state, or the print head is subjected to temperature control corresponding to the amount of temperature rise in the print head occurred during a continuous printing operation. The process then proceeds to step S376, where an end semaphore is transmitted.

Figure 70:
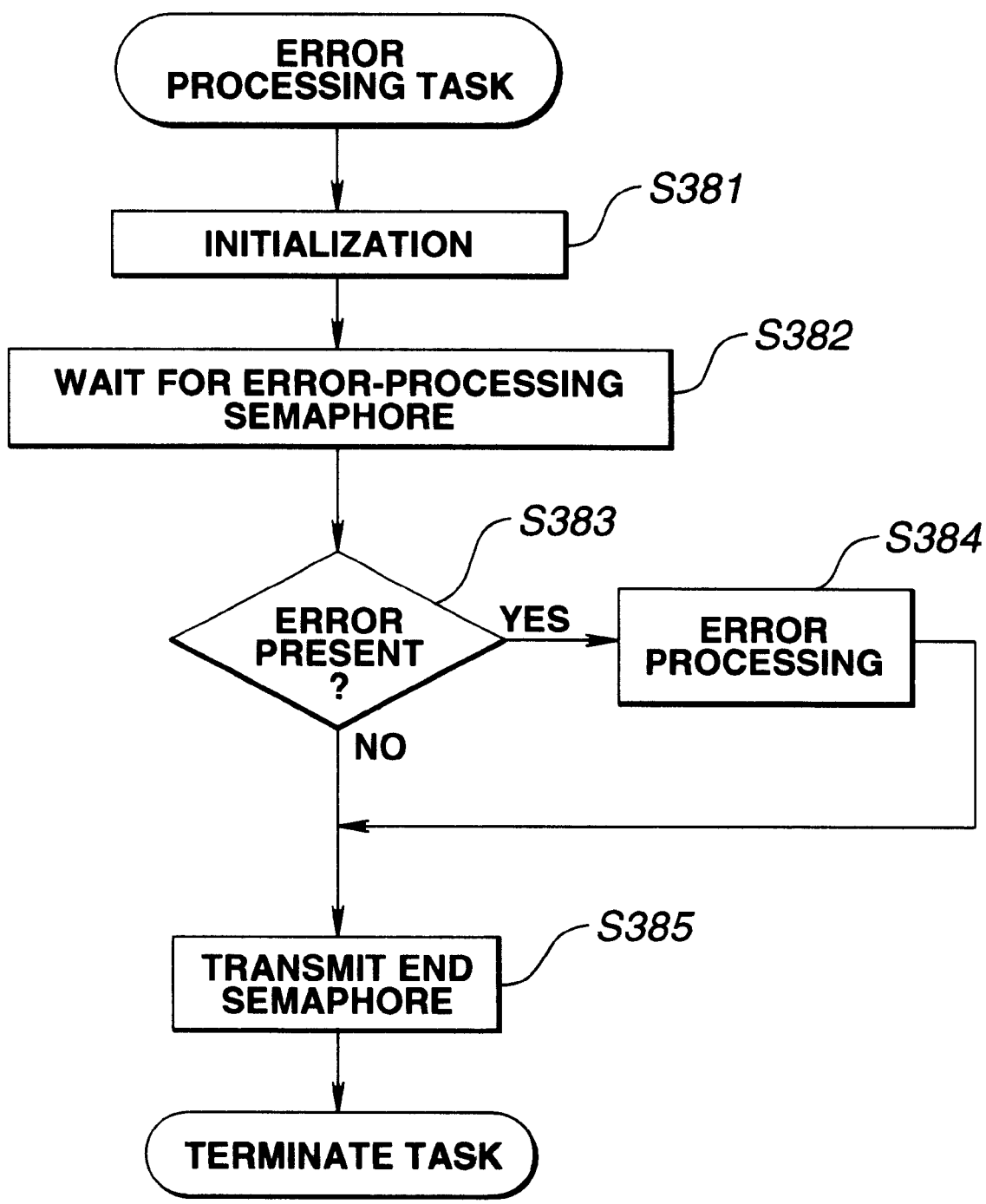
FIG. 70 is a flowchart illustrating an error processing task.

FIG. 70 is a flowchart illustrating the details of Error Processing Task 62-09 shown in FIG. 42. First, in step S381, initialization is performed. Then, in step 5382, a semaphore for Error Processing Task is awaited. When a semaphore for Error Processing Task has been transmitted in step S337 shown in FIG. 67, the process proceeds to step S383 to proceed to error processing. In step S383, it is determined whether or not an error is present. If the result of the determination in step S383 is affirmative, the process proceeds to step S384, where error processing is executed. In this processing, errors in each type of printer relating, for example, to the motor, the head or a sheet are processed. The process then proceeds to step S385, where an end semaphore is transmitted.

Figure 71:
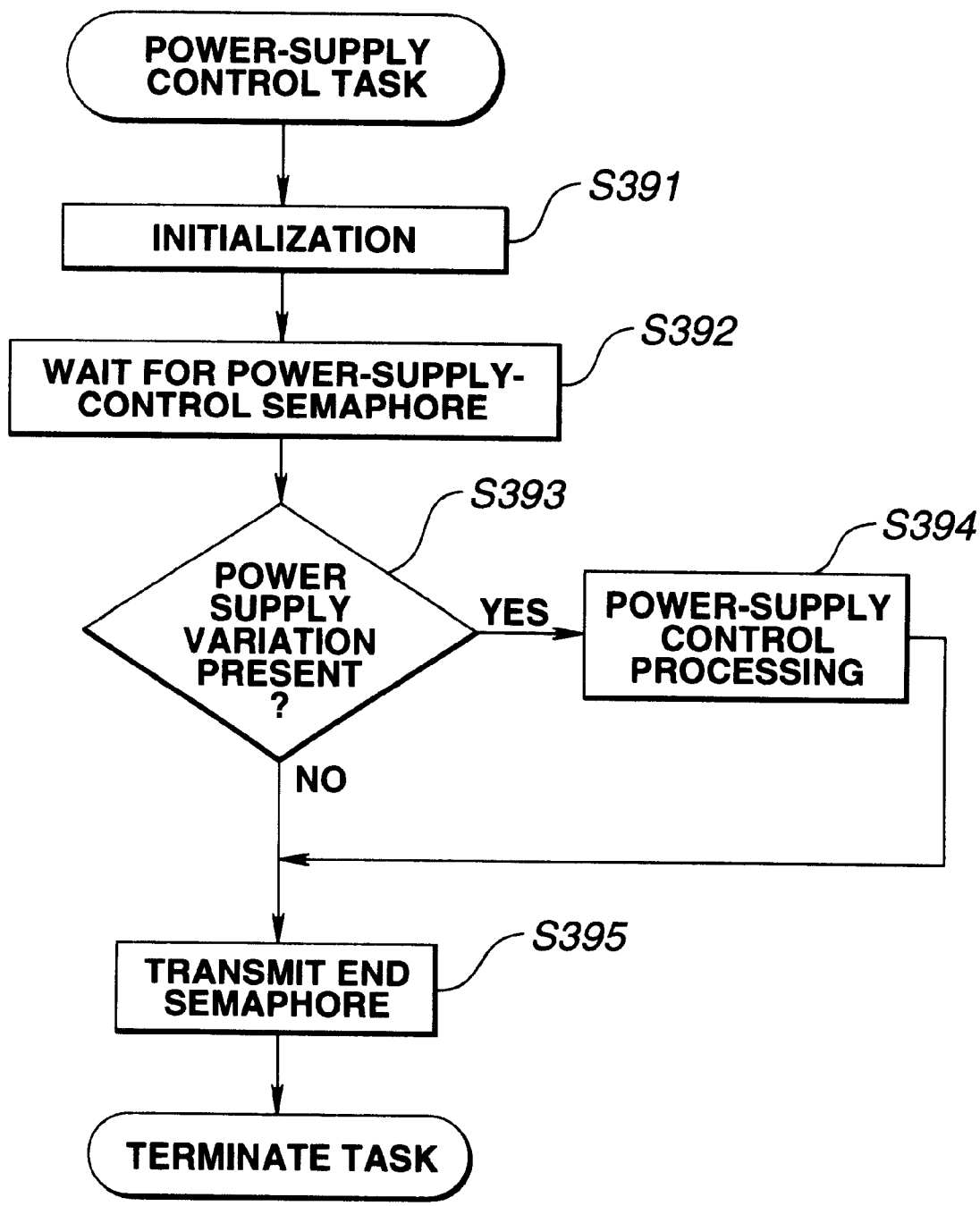
FIG. 71 is a flowchart illustrating a power-supply control task.

FIG. 71 is a flowchart illustrating the details of Power-Supply Control Task 62-01 shown in FIG. 42. First, in step S1401, initialization is performed. Then, in step S392, a semaphore for Power-Supply Control Task is awaited. When a semaphore for Power-Supply Control Task is transmitted in step S339 shown in FIG. 67, the process proceeds to step S393 to proceed to power-supply control processing. In step S393, it is determined whether or not power supply variation is present. If the result of the determination in step S393 is affirmative, the process proceeds to step S394, where power-supply control processing is executed. In this processing, a voltage drop or the like relating to power supply variation is processed. The process then proceeds to step S395, where an end semaphore is transmitted.

A description has been provided of Timer Control Task with reference to FIGS. 67–71. That is, Timer Control Task is started at every predetermined time interval, and processing performed in accordance with the lapse of time is executed according to Timer Control Task.

Second Embodiment

Figure 78:
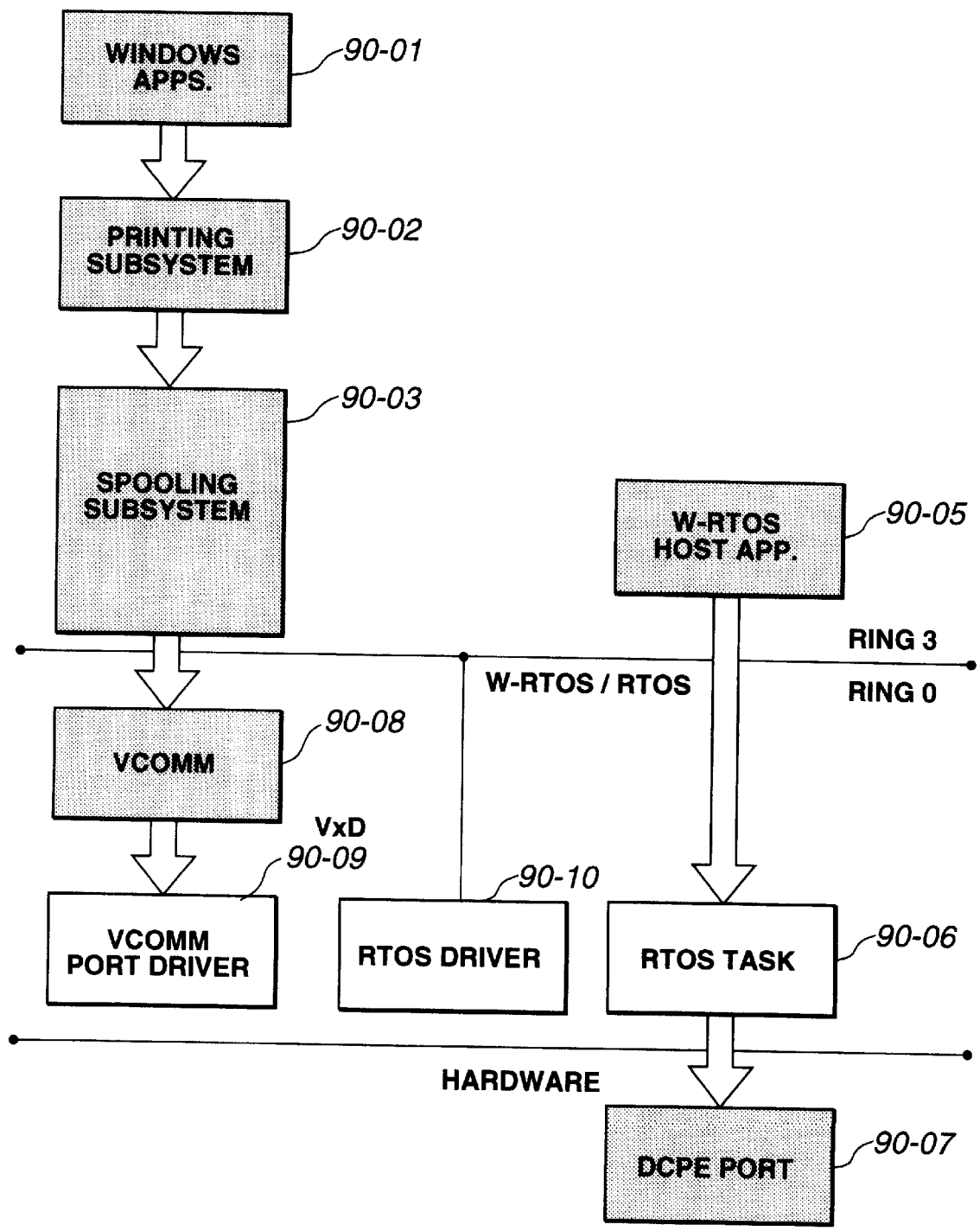
FIG. 78 is a block diagram illustrating the processing of a second embodiment of the present invention.

FIG. 78 is a block diagram illustrating processing according to a second embodiment of the present invention.

In FIG. 78, there are shown Windows application software 90-01, and a printing subsystem 90-02 in a Windows operating system. A spooling subsystem 90-03 in the Windows operating system generates printing data (control codes) in accordance with an ordinary Windows printing sequence, and stores the generated data in a spooling file.

W-RTOS host application software 90-05 is ordinary Windows application software, and has the function of communicating with RTOS.

Reference numeral 90-06 represents an RTOS task, and reference numeral 90-07 represents a DCPE port. The RTOS task 90-06 is started by W-RTOS host application software 90-05, and, as the RTOS task in the first embodiment, converts printing data (control codes) into a print-head image and printer control I/O commands and writes the obtained data in the DCPE port 90-07.

Reference numeral 90-08 represents VCOMM in the Windows operating system, and reference numeral 90-09 represents a VCOMM port driver in the Windows operating system. VCOMM 90-08 receives printing data (control codes) from the spooling subsystem 90-03 in accordance with an ordinary Windows printing sequence, and transmits the received data to the VCOMM port driver 90-09.

As An RTOS driver 90-10 transmits printing data (control codes) to the RTOS task 90-06 via a streaming input/output port (SIO) provided by RTOS. The RTOS task and the RTOS driver operate in a real-time operating system RTOS which operates in an Windows environment, in a CPU operating mode Ring 0.

Both of VCOMM and the VCOMM driver are VxD in the Windows operating system, and operate in a CPU operating mode Ring 0 and is recognized by the system by structure DDB. The device name, service entry points and the like are included in structure DDB. The VCOMM port driver provides VCOMM with a group of functions called port driver functions, which basically correspond to services of VCOMM. The spooling subsystem calls a service of VCOMM via a Windows system API (application programming interface). VCOMM calls a port driver function corresponding to the service and outputs printing data (control codes). Main port driver functions relating to output of printing data (control codes) are Port Open (opening of a port), Port Close (closing of a port), Port Setup (setup of a transmission/reception queue), Port Write (writing to an output queue), Port Get Queue Status (taking out of the state of the queue), and the like. In an ordinary Windows printing sequence, the VCOMM driver writes printing data (control codes) in a physical port where the printer is connected. In the second embodiment, the VCOMM port driver 90-09 transmits printing data (control codes) to the RTOS driver 90-10.

Figure 79:
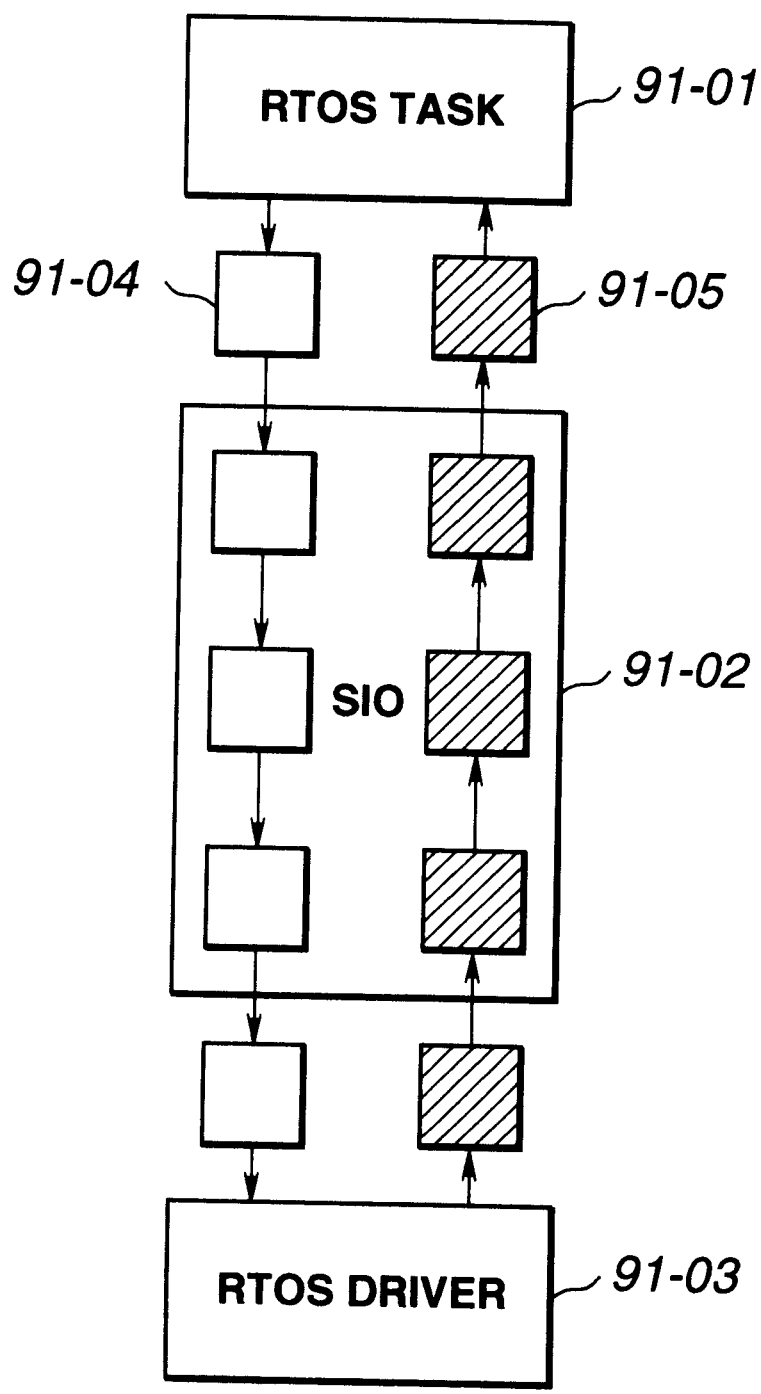
FIG. 79 is a block diagram illustrating RTOS-stream input/output.

FIG. 79 is a block diagram illustrating the operation of stream input/output of RTOS used in the second embodiment. In FIG. 79, there are shown an RTOS task 91-01, SIO 91-02, an RTOS driver 91-03, a vacant buffer storage 91-04, and a buffer storage 91-05 where input data is stored. The RTOS task 91-01 calls an input function SIO_get ( ) of SIO 91-02, and trasfers the vacant buffer storage to SIO 91-02. SIO 91-02 places the transferred vacant buffer storage in a vacant buffer queue and calls an input function Dxx_input of the RTOS driver 91-03. The RTOS driver 91-03 takes out the vacant buffer storage from the vacant buffer queue, and stores input data in this buffer storage. When the buffer storage is filled with the input data, the buffer storage is input in an input-data buffer queue. After returning from Dxx_input ( ), SIO 91-02 terminates SIO_get ( ), and returns the buffer storage where the input data has been stored from the input-data buffer queue to the RTOS task 91-01. The processing of the RTOS driver 91-03 will now be described with reference to a flowchart.

Figure 80:
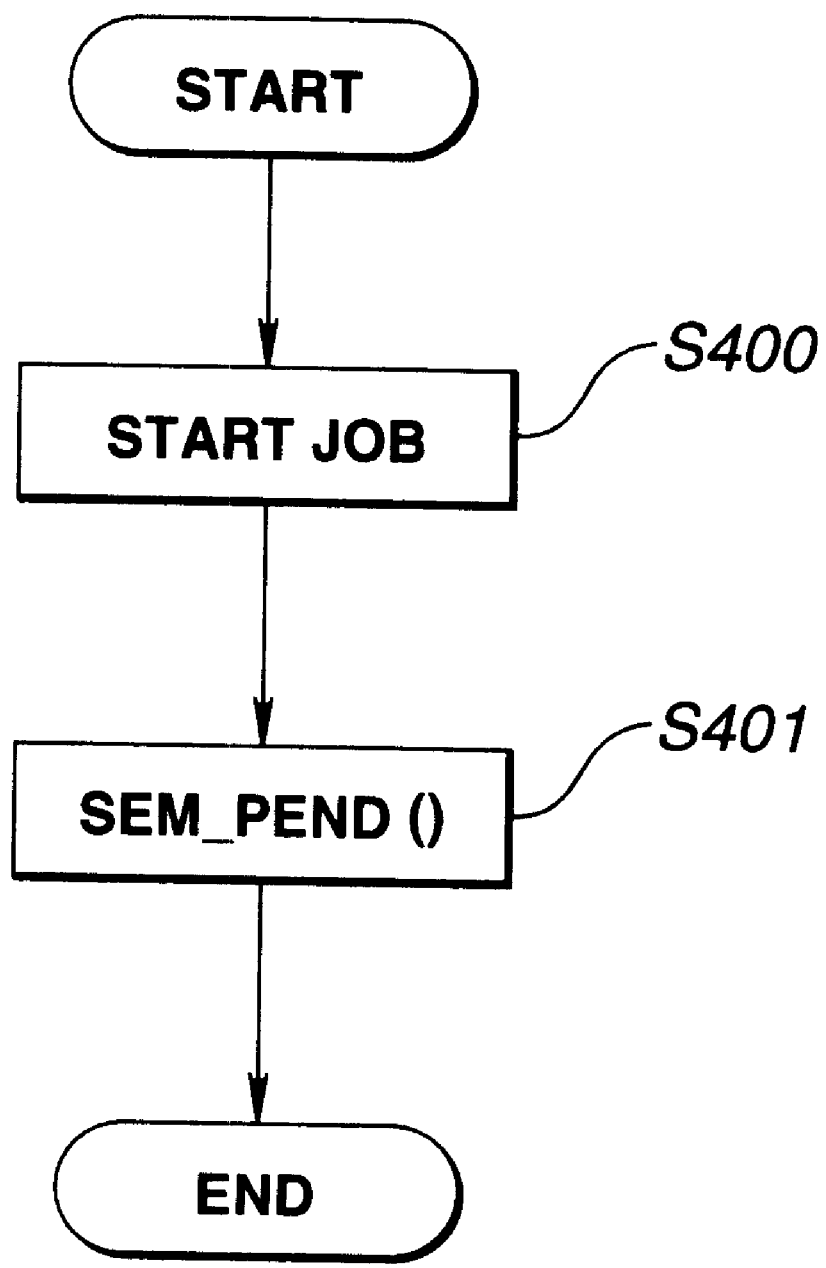
FIG. 80 is a flowchart illustrating a function of inputting an RTOS driver 91-03.

FIG. 80 is a flowchart of Dxx_input ( ). First, in step S400, an input job is started. Since the input job is processed by being asynchronously started, the RTOS driver 91-03 waits for a semaphore for synchronism. In step S401, posting of this semaphore is awaited. When the semaphore has been posted, the process is terminated.

Figure 81:
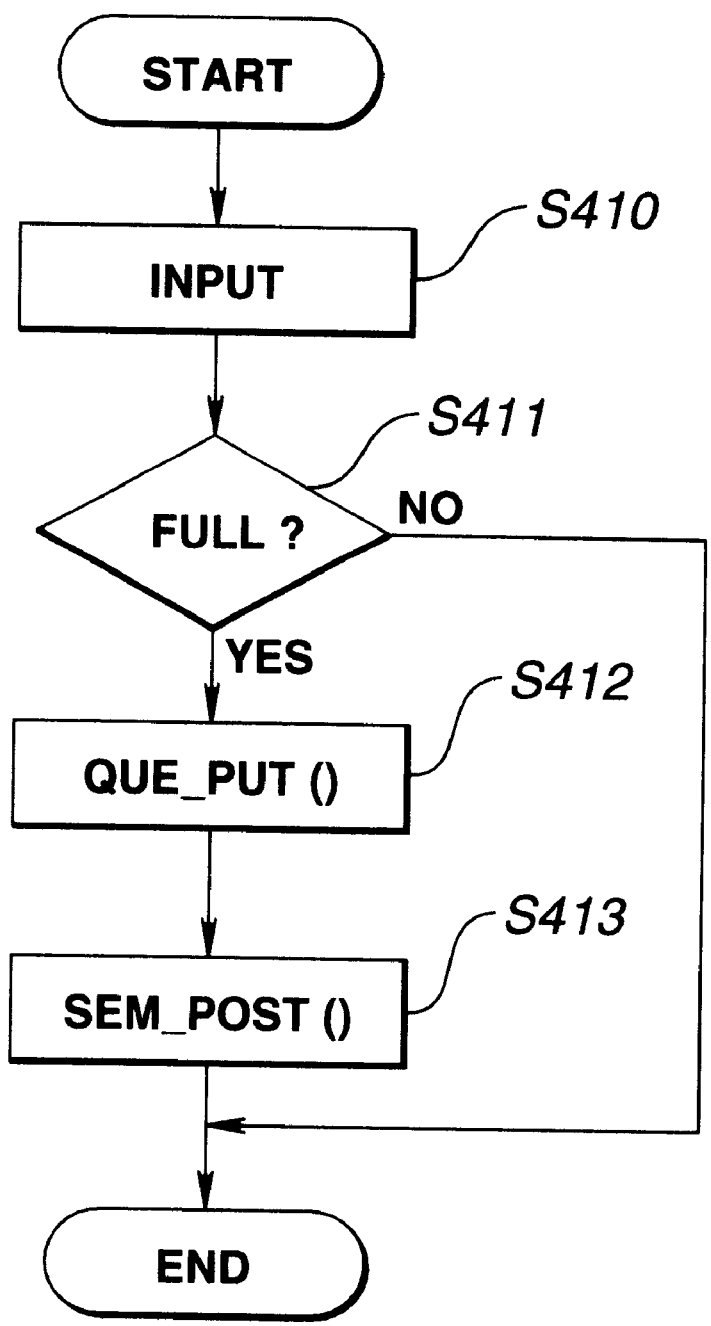
FIG. 81 is a flowchart illustrating a function of inputting the RTOS driver 91-03.

FIG. 81 is a flowchart of an input job. First, in step S410, data is input from a device and is stored in a buffer storage. As described above, in the second embodiment, the data is received from the VCOMM port driver 90-09. In step S411, it is determined whether or not the buffer storage is full. If the result of the determination in step S411 is negative, the process is terminated. If the result of the determination in step S411 is affirmative, the process proceeds to step S412, where the data in the buffer storage is input to an input-data buffer queue. In step S413, a semaphore is posted.

A description will now be provided of transfer of data from the VCOMM port driver 90-09 to the RTOS driver 90-10.

The RTOS driver 90-10 exports an entry point by adding the driver's own structure DDB to DDB chain of VxD layer of the Windows operation system by function IA_addDDB ( ) provided by RTOS. The VCOMM port driver 90-09 retrieves DDB of the RTOS driver 90-10 by service getDDB ( ) provided by the Windows operating system to acquire an entry point. When the above-described port driver function Port Write (writing to an outpue queue) has been called, the VCOMM port driver 90-09 calls the RTOS driver 90-10 by the entry point, and transmits printing data (control codes) transmitted from VCOMM to the RTOS driver 90-10. The RTOS driver 90-10 performs the above-described input job using the printing data as input data.

Third Embodiment

Figure 82:
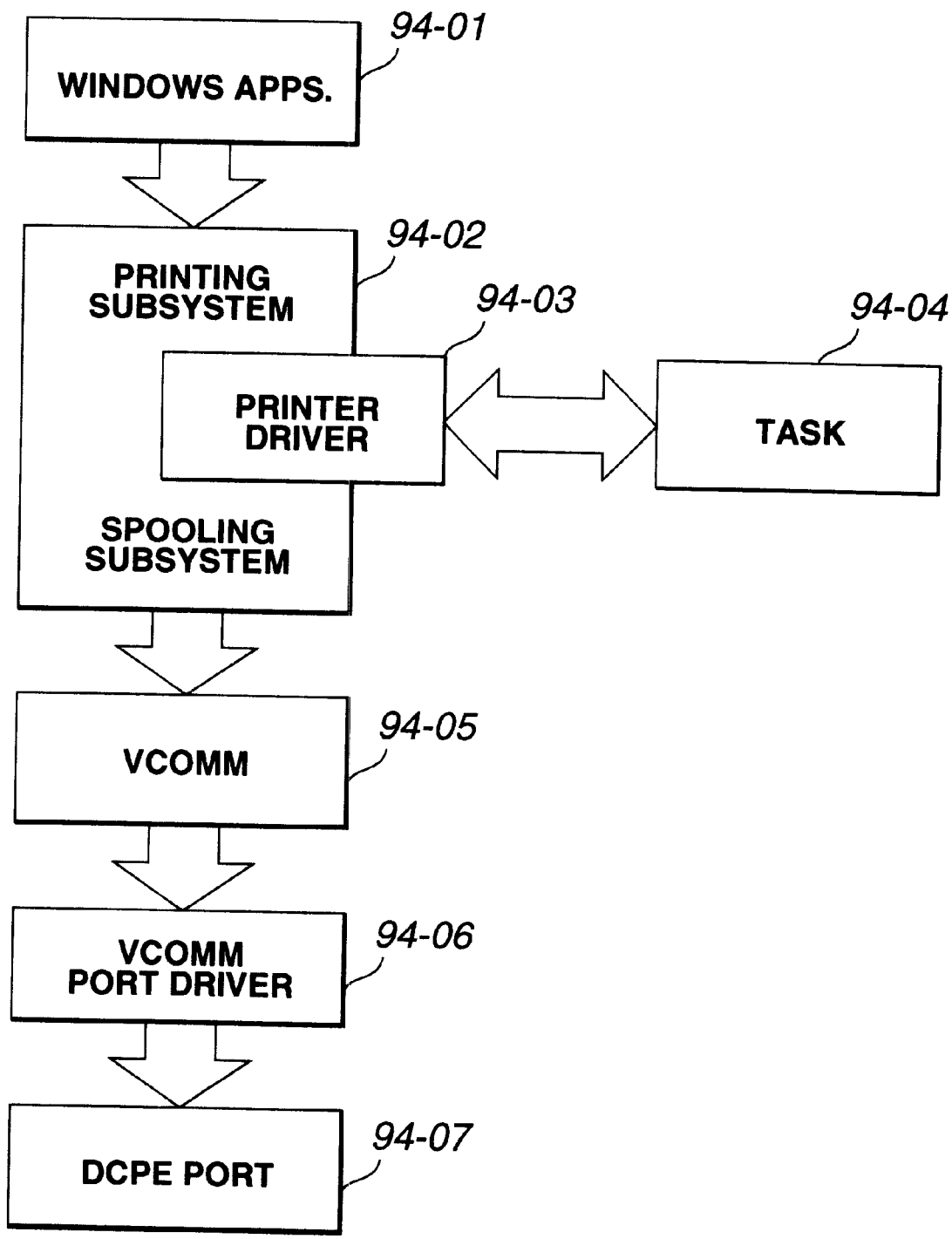
FIG. 82 is a block diagram illustrating the processing of a third embodiment of the present invention.

FIG. 82 is a block diagram illustrating the processing of a third embodiment of the present invention.

In FIG. 82, there are shown Windows application software 94-01, a printing subsystem/spooling subsystem 94-02 in a Windows operating system, a printer driver 94-03 in the Windows operating system, a data conversion task 94-04, VCOMM 94-05 in the Windows operating system, a VCOMM-port driver 94-06 in the Windows operating system, and a DCPE port 94-07. In the third embodiment, also, printing data is generated in accordance with an ordinary Windows printing sequence and is stored in a spooling file. The printer driver 94-03 converts printing data (control codes) into print-head-image-printer control I/O commands by communicating with the data conversion task 94-04 which processes data in the same manner as the RTOS task in the first embodiment, and outputs the obtained commands to the DCPE port via the VCOMM and VCOMM-port driver.

Fourth Embodiment

In the first embodiment, a description has been provided of a configuration in which an interface between a host unit and a printer unit. is connected via an ISA bus. However, the configuration of an interface is not limited to the above-described one. A description will now be provided of a third embodiment of the present invention in which IEEE 1394 is used as a general-purpose high-speed interface instead of the ISA bus.

First, an outline of the technique of IEEE 1394 will be described. As home-use digital VCR's (video cassette recorders) and DVD's (digital video disks) have been practically used, it is necessary to support real-time transfer of data having a high amount of information, such as video data, audio data and the like. In order to perform real-time transfer of video data or audio data and input the transferred data in a personal computer (PC), or to transfer the data to another digital apparatus, an interface having a necessary transfer function which can performing high-speed data transfer is required. IEEE 1394-1995 (hereinafter termed a "1394 serial bus") is an interface which has been developed for that purpose.

Figure 83:
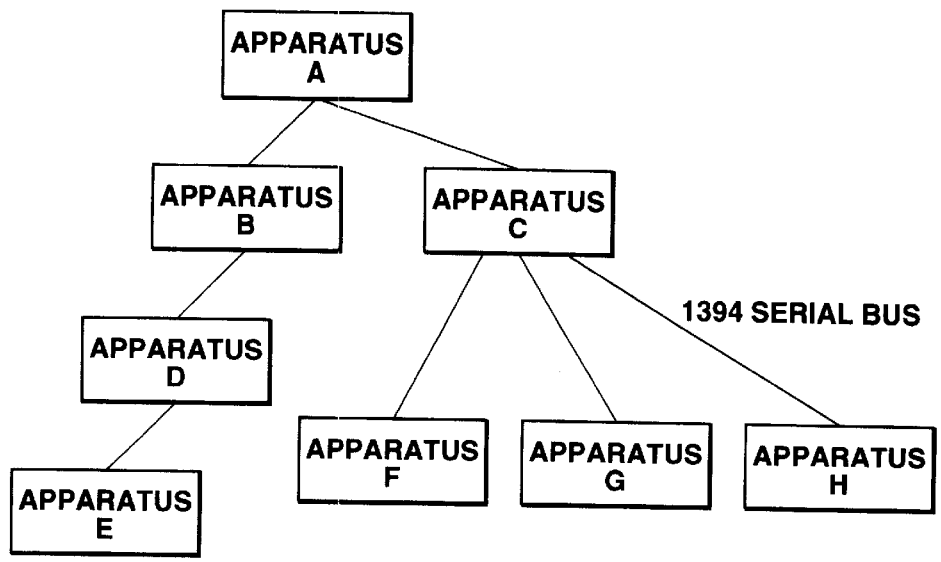
FIG. 83 is a block diagram illustrating a network system configured using IEEE 1394 serial buses.

FIG. 83 illustrates a network system configured using 1394 serial buses. This system includes apparatuses A, B, C, D, E, F, G and H, and a 1394-serial-bus twisted-pair cable connects each pair of apparatuses A and B, A and C, B and D, D and E, C and F, C and G, or C and H to each other. Each of the apparatuses comprises a PC, a digital VCR, a DVD, a digital camera, a hard disk, a monitor or the like. Each pair of apparatuses is connected to each other according to mixture of a daisy chaining method and a node branching method, so that connection with a high degree of freedom can be realized.

Each of the apparatuses has its peculiar ID, and the apparatuses consitute a network within a range of connection via 1394 serial buses by being recognized by each other. By only connecting each pair of digital apparatuses to each other by a single 1394 serial-bus cable, each of the apparatuses has the role of relay, and the apparatuses constitute a network as a whole. According to a plug & play function which is a feature of the 1394 serial bus, the network has the function of automatically recognizing each of the apparatuses, a state of connection between apparatuses, and the like when cables connect the apparatuses.

In the system shown in FIG. 83, if an apparatus is deleted from the network or a new apparatus is added, bus resetting is automatically performed, and a new network is constructed after resetting the configuration of the previous network. Accoring to this function, the configuration of a network at a certain time can always been set and recognized.

The data transfer speed has values of 100, 200 and 400 Mbps (mega bits per second), and an apparatus having a higher transfer speed supports an apparatus having a lower transfer speed in order to provide compatibility.

Data transfer modes include an asynchronous transfer mode in which asynchronous data (hereinafter termed an "Async data"), such as a control signal or the like, are transferred, and an isochronous transfer mode in which isochronous data (hereinafter termed an "Iso data"), such as real-time video or audio data, or the like, is transferred. Async data and Iso data are transferred by being mixed while giving priority to the transfer of Iso data within each cycle (1 cycle being usually equal to 125 µs) after the transfer of a cycle starting packet (CSP) indicating the start of the cycle.

Figure 84:
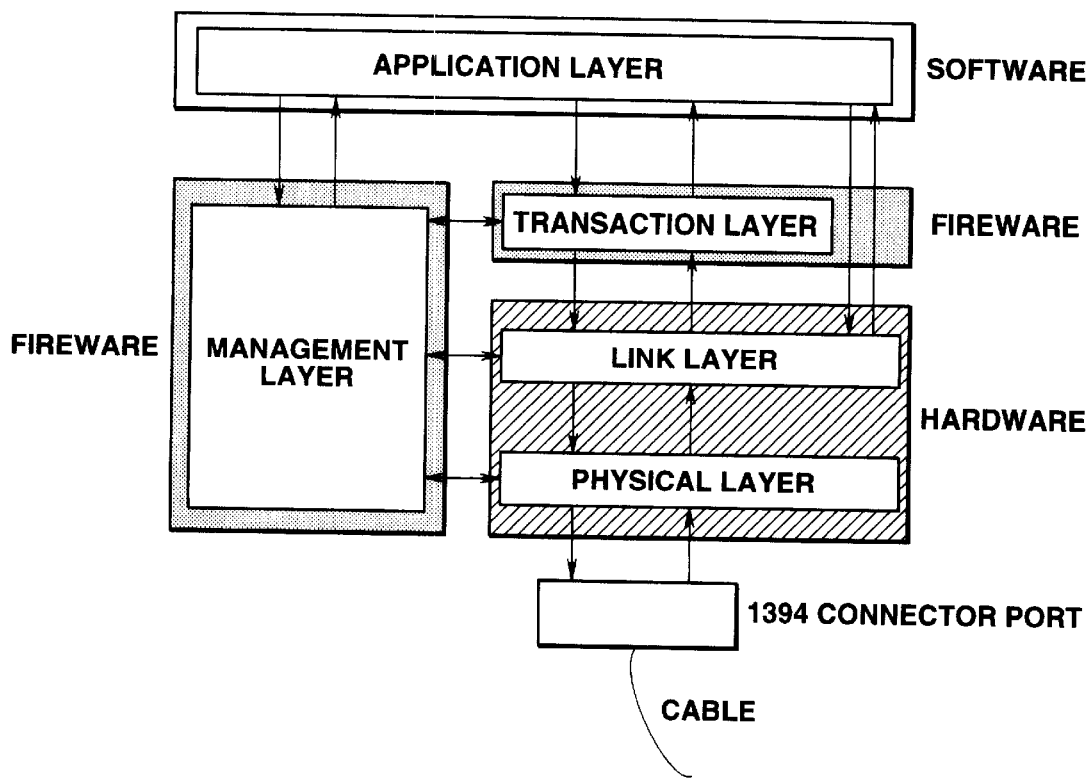
FIG. 84 is a diagram illustrating components of the IEEE 1394 serial bus.

FIG. 84 illustrates components of the 1394 serial bus. The 1394 serial bus is configured by a layer structure. As shown in FIG. 84, a 1394-serial-bus cable has a most hardwarelike structure. The connector of the cable is connected to a connector port, and a physical layer and a link layer constitute hardware above the connector port.

A hardware portion comprises an interface-chip portion, in which the physical layer controls encoding, the connector and the like, and the link layer controls packet transfer, a cycle time and the like.

A transaction layer in a farmware portion controls data to be transferred (transacted), and outputs instructions, such as Read, Write and the like. A management layer controls ID's and states of connection of connected apparatuses to control the configuration of the network. The portions of hardware and firmware consitute the essential configuration of the 1394 serial bus.

An application layer in a software portion differs depending on used software. This layer defines how to provide data on the interface according to a protocol, such as an AV protocol or the like. The configuration of the 1394 serial bus has been described.

Figure 85:
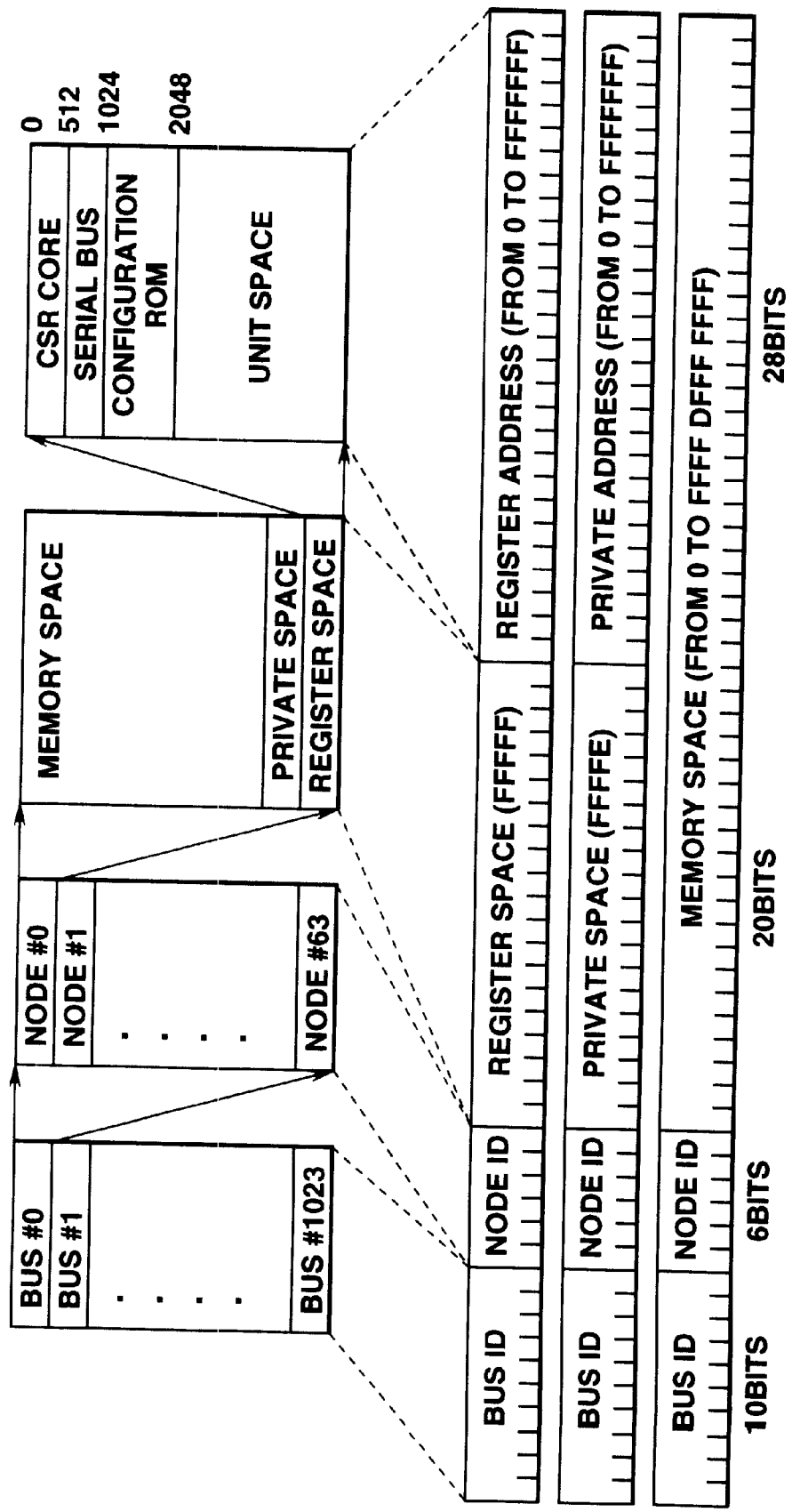
FIG. 85 is a diagram illustrating an address space in the IEEE 1394 serial bus.

FIG. 85 is a diagram illustrating an address space in a 1394 serial bus.

Each apparatus (node) connected to a 1394 serial bus has a 64-bit address peculiare to the apparatus. By storing this address in a ROM, the address of the user's own node or the communication partner can always been recognized, so that communication assigning a partner can be performed. Addressing of the 1394 serial bus is performed so as to conform to IEEE 1212 provision. For setting an address, the first 10 bits are used for assigning the number of the bus, and the succeeding 6 bits are used for assigning the node ID number. A 48-bit address which can be used within each of the apparatuses is divided into 20-bit and 28-bit portions, and are utilized with a structure in units of 256 M bytes.

The first 20-bit portion 0–0xFFFFD is called a memory space. A portion 0xFFFFE is called a private space, and is an address which can be freely utilized within each apparatus. A portion 0xFFFFF is called a register space, in which information common to apparatuses connected to the bus is stored and is used for communication between apparatuses. A register (CSR core), serving as a core of a CSR architecture, is present in the first 512 bytes in the register space. A serial-bus register is present in the subsequent 512 bytes. A configuration ROM is placed in the subsequent 1024 bytes. The remaining portion is a unit space in which a register peculiar to the apparatus is present. The outline of the technique of the 1394 serial bus has been described.

Figure 86:
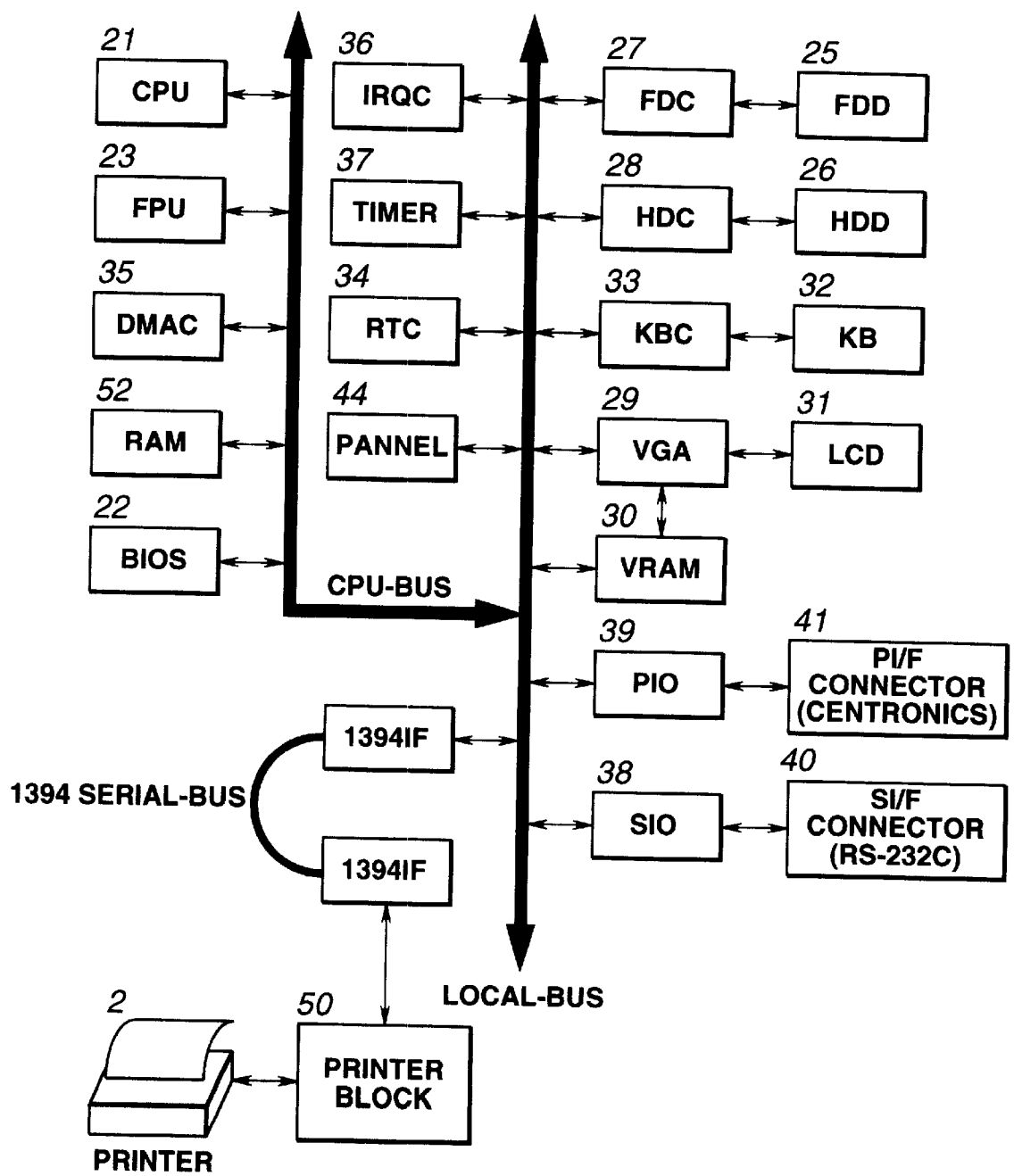
FIG. 86 is a block diagram of a system which uses the IEEE 1394 serial bus.

FIG. 86 is a block diagram illustrating a system in which interfaces of a host unit and a printer unit are connected to each other using a 1394 serial bus according to the fourth embodiment. The main configuration of the host unit and the printer unit is the same as that shown in the schematic block diagram shown in FIG. 2, and a further description thereof will be omitted. The configuration of the fourth embodiment differs in that a 1394 IF block is added to each of the host unit and the printer unit, and data is exchanged via a 1394-serial-bus cable via the 1394 IF blocks. The 1394 IF block, for example, performs serial/parallel conversion, and forms data packets in order to connect serial data transferred via the 1394 serial bus to an internal bus of each apparatus.

That is, the printer unit of the fourth embodiment is connected to the host unit via the 1394 serial bus, and can exchange data with the host unit via a register space on the 1394 serial bus.

Figure 87:
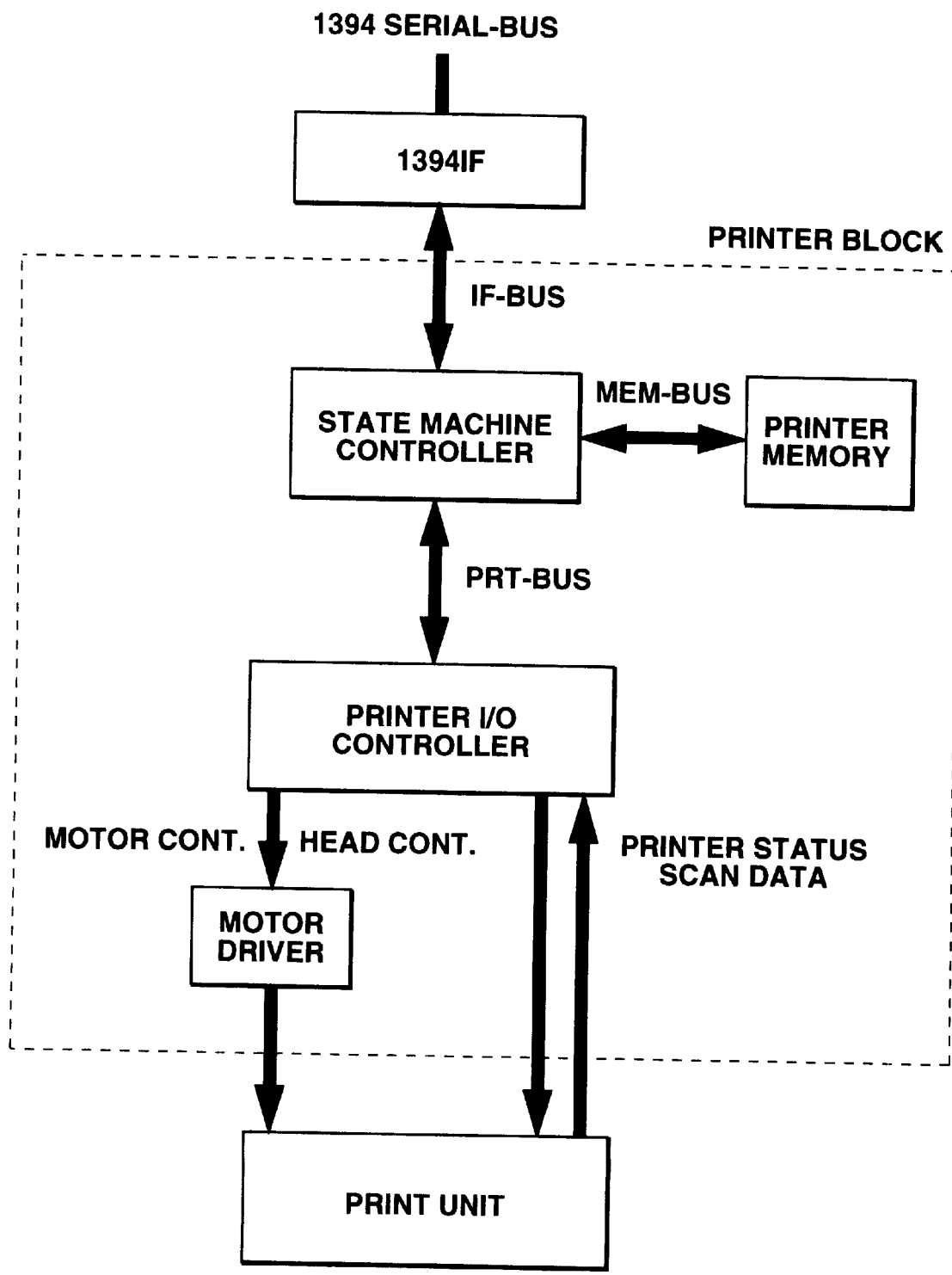
FIG. 87 is a block diagram illustrating the internal configuration of a printer unit.

FIG. 87 is a block diagram illustrating the internal configuration of the printer unit in the fourth embodiment.

Although the main logic is the same as that of the block diagram shown in FIG. 7, this configuration has a feature in that the portion of the ISA-bus connected to the state machine controller is replaced by an IF-bus from 1394 IF. Data transmitted from the 1394 serial bus is output to the IF-bus via the 1394 IF so as to perform register access to the printer unit. Hence, the host unit can provide an environment such that the CPU 21 of the host unit performs I/O access to the printer unit.

Figure 88:
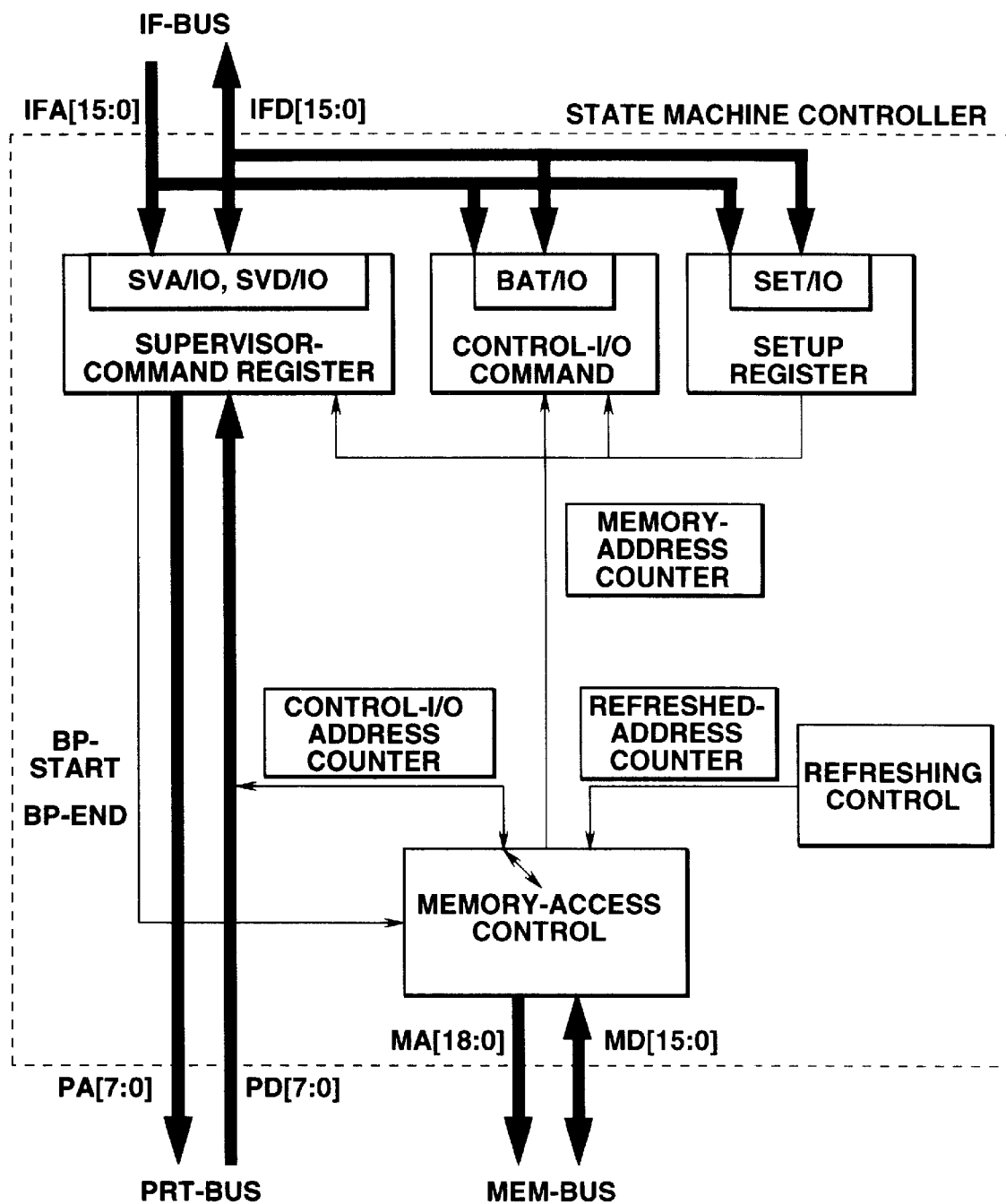
FIG. 88 is a block diagram illustrating the internal configuration of a state machine controller.

FIG. 88 is a block diagram illustrating the internal configuration of a state machine controller.

The state machine controller exchanges data with the host unit via the IF-bus from the 1394 IF to control the printer unit. Although the basic operation is the same as that of the block diagram shown in FIG. 8, the operation shown in FIG. 88 differs from that shown in FIG. 8 in that the I/O register directly accessed by the CPU 21 via the ISA-bus is indirectly addressed via the 1394 serial bus.

The basic operation will now be described. A supervisor command register is a register for performing I/O access to a printer I/O controller from the host unit via a PRT-bus, or providing starting/stopping commands of control I/O commands, and writes/reads data in/from addresses (PA) of the PRT-bus set by a supervisor command address register (SVA/IO) using a supervisor command data register (SVD/IO).

A control I/O command register (BAT/IO) has a function of performing direct access to the memory of the printer unit from the host unit via a MEM-bus. When a data writing operation is performed with a set of "address+data", 2-byte data (MD) is written in an address (MA) of the memory of the printer unit corresponding to a write address of a memory-address counter. After the data has been written, the write address is incremented by +2 at every time.

A data reading operation using the control-I/O-command data register is performed in the same manner. That is, 2-byte data stored in the memory of the printer unit corresponding to the read address is read. After the data has been read, the read address is incremented by +2 at every time.

Data written in the memory by the control-I/O-command data register is used for executing control I/O commands. By writing "1" in BP-start as a starting command of the control I/O commands by the supervisor command register, data indicated by a read address of the control-I/O-address counter is read from the memory of the printer unit in units of 2 bytes. Since the lower byte and the upper byte of the read data indicate the address and data, respectively, the control I/O commands are executed by performing a data write access operation to the register of the printer I/O controller by outputting the read address and data to the PRT-bus.

The read address read by the execution of the control I/O commands is incremented by +2 at every time, and the operation of executing the control I/O commands is repeated until BP-start becomes "0" by provision of a command to stop the control I/O commands (BP-end).

Refreshing control is a control block for performing an operation of refleshing a D-RAM. 512 refleshing accesses are performed in 8 ms. A refleshed-address counter increments the address at that time.

Memory-access control is a block for performing processing for the memory of the printer unit while giving a priority order for each access request. The execution of a control I/O command, refleshing and, memory access from the host unit have the first, second and third priority orders, respectively. These priority orders are provided in order to prevent variations in the time period for executing the control I/O command. The operation of the state machine controller has been described.

As described above, since the form of connection between the host unit and the printer unit is not limited to one form, and can be realized using a general-purpose interface. Hence, a common environment can always be used for the control method at that time, and an optimum configuration can be used for the hardware of the system in accordance with the situation.

According to the present invention, it is possible to provide a simplified and low-cost printer device in a host-unit-based printing system.

It is also possible to provide a printer control method in a host unit in a host-unit-based printing system.

Furthermore, it is possible to provide a simplified and low-cost scanner device in a host-unit-based scanning system.

In addition, it is possible to provide a scanner control method in a host unit in a host-unit-based scanning system.

Moreover, it is possible to provide a host-unit-based printing system in which existent printing system and printer driver are not changed.

The individual components shown in outline or designated by blocks are all well-known in the printing control system and scanner control system arts and their specific-construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printer comprising:
    a memory adapted to store a control I/O command received from a host computer, the host computer being separate from said printer, wherein the control I/O command, as received from the host computer, is directly executable by said printer; and
    a controller adapted to control a printing unit to print by reading out the control I/O command stored in said memory at a predetermined period and executing the thus read-out control I/O command,
    wherein an address that indicates an address of an I/O register and data that indicates data to be written in the I/O register are included in the I/O control command.

2. A printer according to claim 1, wherein the control I/O command includes a wait command for waiting until a predetermined time to execute the control I/O command.

3. A printer according to claim 1, further comprising:
    a memory controller adapted to control access to said memory, wherein said memory controller gives first priority to access said memory to execute the control I/O command, second priority to access said memory to execute a refresh operation, and third priority to access said memory to a host computer.

4. A printer according to claim 1, wherein the printing unit includes an ink jet printer.

5. A printer according to claim 1, wherein the printing unit includes a printing head, a motor for operating a carriage loaded with the printing head, and a paper feeding motor.

6. A printing system comprising:
    a host computer for analyzing a control command, preparing a control I/O command, and transmitting the control I/O command to a printer; and
    a printer, said printer comprising:
        a memory adapted to store the control I/O command received from said host computer, wherein the control I/O command, as received from said host computer, is directly executable by the printer; and
        a controller adapted to control a printing unit to print by reading out the control I/O command stored in the memory at a predetermined period and executing the thus read-out control I/O command,
    wherein said printer and said host computer are separate from each other, and
    wherein an address that indicates an address of an I/O register and data that indicates data to be written in the I/O register are included in the I/O control command.

7. A scanner comprising:
    a memory adapted to store a control I/O command received from a host computer, the host computer being separate from said scanner, wherein the control I/O command, as received from the host computer, is directly executable by the scanner; and
    a controller adapted to control a printing unit to print by reading out the control I/O command stored in said memory at a predetermined period and executing the thus read-out control I/O command,
    wherein an address that indicates an address of an I/O register and data that indicates data to be written in the I/O register are included in the I/O control command.

8. A printing method comprising:
    a storage step of storing a control I/O command received from a host computer, wherein the control I/O command, as received from the host computer, is directly executable by a printer; and
    a control step of controlling a printing unit of the printer to print by reading out the control I/O command from a memory at a predetermined period and executing the thus read-out control I/O command,
    wherein the printer is separate from the host computer, and
    wherein an address that indicates an address of an I/O register and data that indicates data to be written in the I/O register are included in the I/O control command.

9. A scanning method comprising:
    a storage step of storing a control I/O command received from a host computer, wherein the control I/O command, as received from the host computer, is directly executable by a scanner; and a control step of controlling a printing unit of the scanner to print by reading out the control I/O command from a memory at a predetermined period and executing the thus read-out control I/O command, wherein the scanner is separate from the host computer, and wherein an address that indicates an address of an I/O register and data that indicates data to be written in the I/O register are included in the I/O control command.

10. A printer comprising:

a state machine controller, which is connected via a first bus to a host that includes a CPU;

a memory, which is connected to said state machine controller via a second bus; and a printer I/O controller, which is connected to said state machine controller via a third bus, wherein said memory stores an I/O control command, which is generated by the CPU of the host by analyzing control codes, an address that indicates an address of an I/O register and data that indicates data to be written in the I/O register are included in the I/O control command, and said state machine control reads out the I/O control command from said memory in synchronization with a clock, and executes the read out I/O control command by writing data of the read out I/O control command in an I/O register of said printer I/O controller, which corresponds to the address of the read out I/O control command.

11. A scanner comprising:

a state machine controller, which is connected via a first bus to a host that includes a CPU;

a memory, which is connected to said state machine controller via a second bus; and a scanner I/O controller, which is connected to said state machine controller via a third bus, wherein said memory stores an I/O control command, which is generated by the CPU of the host by analyzing control codes, an address that indicates an address of an I/O register address and data that indicates data to be written in the I/O register, are included in the I/O control command, said state machine controller reads out the I/O control command from said memory in synchronization with a clock, and executes the read out I/O control command by writing data of the read out I/O control command in an I/O register of said scanner I/O controller, which corresponds to the address of the read out I/O control command, and said scanner I/O controller is connected to a printer unit.

12. A printing system comprising:

a host that includes a CPU;

a state machine controller, which is connected to said host via a first bus;

a memory, which is connected to said state machine controller via a second bus; and a printer I/O controller, which is connected to said state machine controller via a third bus, wherein the CPU of said host generates an I/O control command by analyzing control codes, and said memory stores the generated I/O control command, an address that indicates an address of an I/O register and data that indicate data to be written in the I/O register are included in the I/O control command, and said state machine controller reads out the I/O control command from said memory in synchronization with a clock, and executes the read out I/O control command by writing data of the read out I/O control command in an I/O register of said printer I/O controller, which corresponds to the address of the read out I/O control command.

13. A printer comprising:

a state machine controller, which is connected to a host that includes a CPU;

a memory, which is connected to said state machine controller; and a printer I/O controller, which is connected to said state machine controller, wherein said memory stores an I/O control command, which is generated by the CPU of the host by analyzing control codes, data that indicates data to be written in the I/O register is included in the I/O control command, and said state machine control reads out the I/O control command from said memory in synchronization with a clock, and writes data of the read out I/O control command in an I/O register of said printer I/O controller;

wherein an address that indicates an address of an I/O register and data that indicates data to be written in the I/O register are included in the I/O control command.

14. A scanner comprising:

a state machine controller, which is connected to a host that includes a CPU;

a memory, which is connected to said state machine controller; and a scanner I/O controller, which is connected to said state machine controller, wherein said memory stores an I/O control command, which is generated by the CPU of the host by analyzing control codes, data that indicates data to be written in the I/O register is included in the I/O control command, and said state machine controller reads out the I/O control command from said memory in synchronization with a clock, and writes data of the read out I/O control command in an I/O register of said scanner I/O controller;

wherein an address that indicates an address of an I/O register and data that indicates data to be written in the I/O register are included in the I/O control command.

15. A printing system comprising:

a host that includes a CPU;

a state machine controller connected to said host;

a memory connected to said state machine controller; and a printer I/O controller connected to said state machine controller, wherein the CPU of said host generates an I/O control command by analyzing control codes, and said memory stores the generated I/O control command, data that indicates data to be written in the I/O register is included in the I/O control command, and said state machine controller reads out the I/O control command from said memory in synchronization with a clock, and writes data of the read out I/O control command in an I/O register of said printer I/O controller;

wherein an address that indicates an address of an I/O register and data that indicates data to be written in the I/O register are included in the I/O control command.

* * * * *

UNITED STATES PATENT AND TRADEMARK OFFICE
CERTIFICATE OF CORRECTION

PATENT NO. : 6,559,962 B1
DATED : May 6, 2003
INVENTOR(S) : Koji Fukunaga et al.

It is certified that error appears in the above-identified patent and that said Letters Patent is hereby corrected as shown below:

Column 2,
Line 18, "image-ata" should read -- image-data --.

Column 3,
Line 50, "which-achieves" should read -- which achieves --.

Column 5,
Line 67, "dots-of" should read -- dots of --.

Column 9,
Line 21, "pritner" should read -- printer --.

Column 14,
Line 4, "cotrol" should read -- control --.

Column 17,
Line 20, "termined" should read -- terminated --.

Column 18,
Line 6, "512.5+$\mu$sec" should read -- 512.5+43$\mu$sec --.
Line 12, "wating-timer" should read -- waiting-timer --.
Line 13, "of" should be deleted.
Line 41, "sihft" should read -- shift --.

Column 27,
Line 4, "an" should read -- a --.

Column 30,
Line 15, "8+$\propto$inches." should read -- 8+$\propto$ inches. --.

Column 37,
Line 66, "carrige" should read -- carriage --.

Column 38,
Line 39, "is" should read -- of --.

UNITED STATES PATENT AND TRADEMARK OFFICE
CERTIFICATE OF CORRECTION

PATENT NO.    : 6,559,962 B1
DATED         : May 6, 2003
INVENTOR(S)   : Koji Fukunaga et al.

It is certified that error appears in the above-identified patent and that said Letters Patent is hereby corrected as shown below:

Column 39,
Line 28, "is" should read -- are --.

Column 47,
Line 26, "farmware" should read -- firmware --.
Line 41, "peculiare" should read -- peculiar --.

Column 49,
Line 6, "refleshing" (both occurrences) should read -- refreshing --.
Line 7, "refleshed-address" should read -- refreshed-address --.

Signed and Sealed this

Fourth Day of November, 2003

JAMES E. ROGAN
*Director of the United States Patent and Trademark Office*